(12) United States Patent
Yazami

(10) Patent No.: US 8,968,921 B2
(45) Date of Patent: *Mar. 3, 2015

(54) FLUORIDE ION ELECTROCHEMICAL CELL

(71) Applicant: Rachid Yazami, Singapore (SG)

(72) Inventor: Rachid Yazami, Singapore (SG)

(73) Assignees: California Institute of Technology, Pasadena, CA (US); Centre National de la Recherche Scientifique (C.N.R.S.), Paris (FR)

( * ) Notice: Subject to any disclaimer, the term of this patent is extended or adjusted under 35 U.S.C. 154(b) by 12 days.

This patent is subject to a terminal disclaimer.

(21) Appl. No.: 13/739,487

(22) Filed: Jan. 11, 2013

(65) Prior Publication Data

US 2013/0122361 A1 May 16, 2013

Related U.S. Application Data

(63) Continuation of application No. 11/681,493, filed on Mar. 2, 2007, now Pat. No. 8,377,586, which is a continuation-in-part of application No. 11/677,541, filed on Feb. 21, 2007, now Pat. No. 8,232,007, which (Continued)

(51) Int. Cl.
*H01M 4/58* (2010.01)
*H01M 6/50* (2006.01)
(Continued)

(52) U.S. Cl.
CPC ............. *H01M 10/04* (2013.01); *H01M 6/166* (2013.01); *H01M 4/608* (2013.01); *H01M 4/60* (2013.01); *H01M 4/582* (2013.01); *H01M 6/045* (2013.01); *Y02E 60/12* (2013.01); *H01M 4/583* (2013.01); H01M 2300/0002 (2013.01);

(Continued)

(58) Field of Classification Search
None
See application file for complete search history.

(56) References Cited

U.S. PATENT DOCUMENTS 3,536,532 A 10/1970 Watanabe et al.
3,642,538 A 2/1972 Zito, Jr.
(Continued)

FOREIGN PATENT DOCUMENTS

CN 1092742 9/1994
DE 2401497 7/1975
(Continued)

OTHER PUBLICATIONS

Abidi et al. (2003) "Alkali Metal Ion Complexes of Functionalized Calizarenes—Competition Between Pendent Arm and Anion Bond to Sodium," *Org. Biomol. Chem.* 1:3144-3146.
(Continued)

*Primary Examiner* — Barbara Gilliam
*Assistant Examiner* — Adam A Arciero
(74) *Attorney, Agent, or Firm* — Lathrop & Gage LLP

(57) ABSTRACT

Electrochemical cells of the present invention are versatile and include primary and secondary cells useful for a range of important applications including use in portable electronic devices. Electrochemical cells of the present invention also exhibit enhanced safety and stability relative to conventional state of the art primary lithium batteries and lithium ion secondary batteries. For example, electrochemical cells of the present invention include secondary electrochemical cells using anion charge carriers capable of accommodation by positive and negative electrodes comprising anion host materials, which entirely eliminate the need for metallic lithium or dissolved lithium ion in these systems.

29 Claims, 22 Drawing Sheets

Related U.S. Application Data is a continuation-in-part of application No. 11/422,564, filed on Jun. 6, 2006, now Pat. No. 7,563,542, which is a continuation-in-part of application No. 11/253,360, filed on Oct. 18, 2005, now abandoned, said application No. 11/677,541 is a continuation-in-part of application No. 11/675,308, filed on Feb. 15, 2007, now abandoned, and a continuation-in-part of application No. PCT/US2007/062243, filed on Feb. 15, 2007, said application No. 11/681,493 is a continuation-in-part of application No. 11/560,570, filed on Nov. 16, 2006, now Pat. No. 7,794,880, and a continuation-in-part of application No. PCT/US2007/063094, filed on Mar. 1, 2007.

(60) Provisional application No. 60/779,054, filed on Mar. 3, 2006, provisional application No. 60/897,310, filed on Jan. 25, 2007, provisional application No. 60/900,409, filed on Feb. 9, 2007, provisional application No. 60/724,084, filed on Oct. 5, 2005, provisional application No. 60/774,262, filed on Feb. 16, 2006, provisional application No. 60/784,957, filed on Mar. 21, 2006, provisional application No. 60/784,960, filed on Mar. 20, 2006, provisional application No. 60/775,110, filed on Feb. 21, 2006, provisional application No. 60/775,559, filed on Feb. 22, 2006, provisional application No. 60/737,186, filed on Nov. 16, 2005.

(51) Int. Cl.
*H01M 10/44* (2006.01)
*H01M 6/16* (2006.01)
*H01M 4/60* (2006.01)
*H01M 6/04* (2006.01)
*H01M 10/04* (2006.01)
*H01M 4/583* (2010.01)
*H01M 10/36* (2010.01)
*H01M 4/38* (2006.01)
*H01M 10/0568* (2010.01)

(52) U.S. Cl.
CPC ... *H01M 4/5835* (2013.01); *H01M 2300/0017* (2013.01); *H01M 10/36* (2013.01); *H01M 6/04* (2013.01); *H01M 4/38* (2013.01); *H01M 4/604* (2013.01); *H01M 4/606* (2013.01); *H01M 10/0568* (2013.01)
USPC ........ 429/188; 429/50; 429/218.1; 429/231.7

(56) References Cited

U.S. PATENT DOCUMENTS

| | | | |
|---|---|---|---|
| 3,660,164 A | 5/1972 | Hermann et al. | |
| 3,700,502 A | 10/1972 | Wantanabe et al. | |
| 3,796,604 A | 3/1974 | Gabano et al. | |
| 3,796,605 A | 3/1974 | Dechenaux et al. | |
| 3,956,018 A | 5/1976 | Kozawa | |
| 4,029,854 A | 6/1977 | Walsh et al. | |
| 4,052,539 A | 10/1977 | Shropshire et al. | |
| 4,119,655 A | 10/1978 | Hulme | |
| 4,211,832 A | 7/1980 | Mueller et al. | |
| 4,216,279 A | 8/1980 | Mellors | |
| 4,218,527 A | 8/1980 | Mellors | |
| 4,247,608 A | 1/1981 | Watanabe et al. | |
| 4,337,139 A | 6/1982 | Gestaut et al. | |
| 4,352,866 A | 10/1982 | Klinedinst et al. | |
| 4,431,567 A | 2/1984 | Gestaut et al. | |
| 4,438,086 A | 3/1984 | Aramaki et al. | |
| 4,442,187 A | 4/1984 | MacDiarmid et al. | |
| 4,609,598 A | 9/1986 | Tucholski et al. | |
| 4,681,823 A | 7/1987 | Tung | |
| 4,684,591 A | 8/1987 | Okamura et al. | |
| 4,686,161 A | 8/1987 | Shia et al. | |
| 4,753,786 A | 6/1988 | Watanabe et al. | |
| 4,761,355 A | 8/1988 | Skarstad et al. | |
| 4,765,968 A | 8/1988 | Shia et al. | |
| 4,830,938 A | 5/1989 | McCullough et al. | |
| 4,833,048 A | 5/1989 | Dejonghe et al. | |
| 4,837,096 A | 6/1989 | Kimura et al. | |
| 4,840,859 A | 6/1989 | Williams et al. | |
| 4,865,931 A | 9/1989 | McCullough et al. | |
| 4,935,319 A | 6/1990 | Ohsawa et al. | |
| 5,106,606 A | 4/1992 | Endo et al. | |
| 5,114,811 A | 5/1992 | Ebel et al. | |
| 5,116,592 A | 5/1992 | Weinberg | |
| 5,151,162 A | 9/1992 | Muller et al. | |
| 5,175,066 A | 12/1992 | Hamwi et al. | |
| 5,273,840 A | 12/1993 | Dominey | |
| 5,348,818 A * | 9/1994 | Asami et al. | 429/213 |
| 5,427,872 A | 6/1995 | Shen et al. | |
| 5,437,943 A | 8/1995 | Fujii et al. | |
| 5,443,930 A | 8/1995 | Shoji et al. | |
| 5,458,995 A * | 10/1995 | Behl et al. | 429/322 |
| 5,489,492 A | 2/1996 | Asami et al. | |
| 5,518,836 A | 5/1996 | McCullough | |
| 5,532,083 A | 7/1996 | McCullough | |
| 5,534,370 A | 7/1996 | Kita et al. | |
| 5,614,331 A | 3/1997 | Takeuchi et al. | |
| 5,639,577 A | 6/1997 | Takeuchi et al. | |
| 5,686,203 A | 11/1997 | Idota et al. | |
| 5,702,844 A | 12/1997 | Bernard et al. | |
| 5,705,689 A | 1/1998 | Lee et al. | |
| 5,712,062 A | 1/1998 | Yamana et al. | |
| 5,753,786 A | 5/1998 | Agapiou et al. | |
| 5,756,230 A | 5/1998 | Gao et al. | |
| 5,879,836 A | 3/1999 | Ikeda et al. | |
| 5,916,642 A | 6/1999 | Chang | |
| 5,968,683 A | 10/1999 | Kolb | |
| 6,001,585 A | 12/1999 | Gramer | |
| 6,022,643 A | 2/2000 | Lee et al. | |
| 6,068,921 A | 5/2000 | Yamana et al. | |
| 6,077,624 A | 6/2000 | Mitchell et al. | |
| 6,100,324 A | 8/2000 | Choi et al. | |
| 6,120,940 A | 9/2000 | Poehler et al. | |
| 6,120,941 A | 9/2000 | Lee et al. | |
| 6,187,477 B1 | 2/2001 | Watanabe et al. | |
| 6,203,814 B1 | 3/2001 | Fisher et al. | |
| 6,245,465 B1 | 6/2001 | Angell et al. | |
| 6,268,430 B1 | 7/2001 | Choi et al. | |
| 6,306,540 B1 | 10/2001 | Hiroi et al. | |
| 6,334,939 B1 | 1/2002 | Zhou et al. | |
| 6,352,798 B1 * | 3/2002 | Lee et al. | 429/324 |
| 6,358,649 B1 | 3/2002 | Yazami et al. | |
| 6,379,841 B1 * | 4/2002 | Potanin et al. | 429/218.1 |
| 6,451,483 B1 | 9/2002 | Probst et al. | |
| 6,479,192 B1 | 11/2002 | Chung et al. | |
| 6,482,550 B1 | 11/2002 | Imachi et al. | |
| 6,489,055 B1 | 12/2002 | Ichihashi et al. | |
| 6,503,660 B2 | 1/2003 | Baker et al. | |
| 6,509,116 B1 | 1/2003 | Kaneko et al. | |
| 6,528,208 B1 | 3/2003 | Thackeray et al. | |
| 6,586,133 B1 | 7/2003 | Teeteus et al. | |
| 6,589,299 B2 | 7/2003 | Missling et al. | |
| 6,620,899 B1 | 9/2003 | Morken et al. | |
| 6,638,662 B2 | 10/2003 | Kaneda et al. | |
| 6,641,955 B1 | 11/2003 | Matsubara et al. | |
| 6,649,033 B2 | 11/2003 | Yagi et al. | |
| 6,692,865 B2 | 2/2004 | Gan et al. | |
| 6,696,204 B2 | 2/2004 | Sato et al. | |
| 6,709,566 B2 | 3/2004 | Cumings et al. | |
| 6,713,214 B2 | 3/2004 | Koga et al. | |
| 6,743,547 B2 | 6/2004 | Gan et al. | |
| 6,743,549 B1 | 6/2004 | Doyle et al. | |
| 6,767,671 B2 | 7/2004 | Itagaki et al. | |
| 6,797,434 B1 | 9/2004 | Matsubara et al. | |
| 6,815,121 B2 | 11/2004 | Dasgupta et al. | |
| 6,841,610 B2 | 1/2005 | Yanagisawa | |
| 6,844,115 B2 | 1/2005 | Gan et al. | |
| 6,852,446 B2 | 2/2005 | Barbarich | |
| 6,852,449 B2 | 2/2005 | Nagata et al. | |

(56) References Cited

U.S. PATENT DOCUMENTS

| | | | |
|---|---|---|---|
| 6,896,706 B2 | 5/2005 | Lee et al. |
| 6,926,991 B2 | 8/2005 | Gan et al. |
| 6,939,383 B2 | 9/2005 | Eastin et al. |
| 6,956,018 B2 | 10/2005 | Itoh et al. |
| 6,958,198 B2 | 10/2005 | Iwamoto et al. |
| 6,986,967 B2 | 1/2006 | Barton et al. |
| 7,005,211 B2 | 2/2006 | Kim et al. |
| 7,018,738 B2 | 3/2006 | Morioka et al. |
| 7,052,802 B2 | 5/2006 | Tsukamoto et al. |
| 7,074,523 B2 | 7/2006 | Arai et al. |
| 7,087,348 B2 | 8/2006 | Holman et al. |
| 7,189,476 B1 | 3/2007 | Macklin et al. |
| 7,563,542 B2 | 7/2009 | Yazami et al. |
| 7,722,993 B2 | 5/2010 | Potanin |
| 7,794,880 B2 | 9/2010 | Yazami et al. |
| 7,858,238 B2 | 12/2010 | West et al. |
| 8,377,586 B2 * | 2/2013 | Yazami ................... 429/188 |
| 2001/0012193 A1 | 8/2001 | Watanabe et al. |
| 2002/0061441 A1 | 5/2002 | Ogura et al. |
| 2002/0081492 A1 | 6/2002 | Gan et al. |
| 2002/0106558 A1 | 8/2002 | Maske et al. |
| 2002/0119371 A1 | 8/2002 | Haug et al. |
| 2002/0127171 A1 | 9/2002 | Smalley et al. |
| 2002/0168569 A1 | 11/2002 | Barriere et al. |
| 2002/0177041 A1 | 11/2002 | Worle et al. |
| 2002/0182506 A1 | 12/2002 | Cagle |
| 2003/0003370 A1 | 1/2003 | Arai et al. |
| 2003/0044519 A1 | 3/2003 | Takai |
| 2003/0049535 A1 | 3/2003 | Ohta et al. |
| 2003/0096163 A1 | 5/2003 | Miyake et al. |
| 2003/0108799 A1 | 6/2003 | Lascaud et al. |
| 2003/0108800 A1 | 6/2003 | Barbarich |
| 2003/0138698 A1 | 7/2003 | Lee et al. |
| 2003/0158310 A1 | 8/2003 | Asano et al. |
| 2003/0224168 A1 | 12/2003 | Mack et al. |
| 2004/0013814 A1 | 1/2004 | Guerfi et al. |
| 2004/0013933 A1 | 1/2004 | Korshunov et al. |
| 2004/0018138 A1 | 1/2004 | Hirata |
| 2004/0018430 A1 | 1/2004 | Holman et al. |
| 2004/0048160 A1 | 3/2004 | Omaru |
| 2004/0058247 A1 | 3/2004 | Omaru |
| 2004/0091783 A1 | 5/2004 | Cagle |
| 2004/0106039 A1 | 6/2004 | Arai et al. |
| 2004/0106047 A1 | 6/2004 | Mie et al. |
| 2004/0131959 A1 | 7/2004 | Chen et al. |
| 2004/0241532 A1 | 12/2004 | Kim |
| 2004/0258986 A1 | 12/2004 | Shen et al. |
| 2005/0006623 A1 | 1/2005 | Wong et al. |
| 2005/0011710 A1 | 1/2005 | Hitchcock et al. |
| 2005/0026044 A1 | 2/2005 | Koike et al. |
| 2005/0048366 A1 | 3/2005 | Bowden et al. |
| 2005/0069778 A1 | 3/2005 | Bonnet et al. |
| 2005/0118512 A1 | 6/2005 | Onuki et al. |
| 2005/0123835 A1 | 6/2005 | Sun |
| 2005/0170251 A1 | 8/2005 | Jung et al. |
| 2005/0207966 A1 | 9/2005 | Zaghib |
| 2005/0227146 A1 | 10/2005 | Ghantous et al. |
| 2006/0269834 A1 | 11/2006 | West et al. |
| 2007/0037063 A1 | 2/2007 | Choi et al. |
| 2007/0077493 A1 | 4/2007 | Yazami et al. |
| 2007/0077495 A1 | 4/2007 | Yazami et al. |
| 2007/0111073 A1 * | 5/2007 | Fukushima et al. ........... 429/33 |
| 2007/0218364 A1 | 9/2007 | Whitacre et al. |
| 2007/0231696 A1 | 10/2007 | Yazami et al. |
| 2007/0231697 A1 | 10/2007 | Yazami et al. |
| 2007/0281213 A1 | 12/2007 | Pyszczek |
| 2008/0034579 A1 | 2/2008 | Potanin |
| 2008/0102373 A1 | 5/2008 | Potanin |
| 2008/0280191 A1 | 11/2008 | Yazami et al. |
| 2009/0029237 A1 | 1/2009 | Yazami et al. |
| 2009/0111021 A1 | 4/2009 | Yazami et al. |
| 2009/0258294 A1 | 10/2009 | Yazami et al. |
| 2010/0021800 A1 | 1/2010 | Yazami et al. |
| 2011/0003149 A1 | 1/2011 | Yazami et al. |

FOREIGN PATENT DOCUMENTS

| | | |
|---|---|---|
| EP | 0 169 407 | 1/1986 |
| EP | 0 558 255 | 9/1993 |
| EP | 0 776 053 | 5/1997 |
| EP | 1 019 975 | 7/2000 |
| EP | 1 028 476 | 8/2000 |
| EP | 1 087 453 | 3/2001 |
| EP | 1 205 003 | 5/2002 |
| EP | 1 230 708 | 8/2002 |
| EP | 1 236 239 | 9/2002 |
| EP | 1 415 711 | 5/2004 |
| EP | 1 520 318 | 4/2005 |
| EP | 1 551 069 | 7/2005 |
| EP | 1 873 850 | 1/2008 |
| FR | 2856674 | 12/2004 |
| GB | 1 357 286 | 6/1974 |
| JP | 56032675 | 4/1981 |
| JP | 57084570 | 5/1982 |
| JP | 57124865 | 8/1982 |
| JP | 58123663 | 7/1983 |
| JP | 59087763 A2 | 5/1984 |
| JP | 60195871 | 10/1985 |
| JP | 07-211344 | 11/1995 |
| JP | 11214037 | 8/1999 |
| JP | 11329434 | 11/1999 |
| JP | 2000030606 | 1/2000 |
| JP | 2000-77100 | 3/2000 |
| JP | 2000077100 | 3/2000 |
| JP | 2000106188 | 4/2000 |
| JP | 2000200604 | 7/2000 |
| JP | 2001006660 | 1/2001 |
| JP | 2003077544 | 3/2003 |
| JP | 2003187799 | 7/2003 |
| JP | 2003203674 | 7/2003 |
| JP | 2005113361 | 4/2005 |
| JP | 2005285440 | 10/2005 |
| JP | 2006236891 A2 | 9/2006 |
| JP | 2007087688 A2 | 4/2007 |
| JP | 2008-537312 | 9/2008 |
| JP | 2008-538649 | 10/2008 |
| KR | 20040096203 | 11/2004 |
| SU | 584369 | 12/1977 |
| WO | WO 97/02580 | 1/1997 |
| WO | WO 99/18624 | 4/1999 |
| WO | WO 99/34470 | 7/1999 |
| WO | WO 01/09972 | 2/2001 |
| WO | WO 01/33656 | 5/2001 |
| WO | WO 01/35662 | 5/2001 |
| WO | WO 01/41246 | 6/2001 |
| WO | WO 01/94260 | 12/2001 |
| WO | WO 02/03430 | 1/2002 |
| WO | WO 03/004410 | 1/2003 |
| WO | WO 03/031050 | 4/2003 |
| WO | WO 03/040446 | 5/2003 |
| WO | WO 2004/001888 | 12/2003 |
| WO | WO 2004/051784 | 6/2004 |
| WO | WO 2004/088769 | 10/2004 |
| WO | WO 2004/090921 | 10/2004 |
| WO | WO 2004/096704 | 11/2004 |
| WO | WO 2005/069412 | 7/2005 |
| WO | WO 2006/112756 | 10/2006 |
| WO | WO 2006/112757 | 10/2006 |
| WO | WO 2006/128174 | 11/2006 |
| WO | WO 2007/040547 | 4/2007 |
| WO | WO 2007/098369 | 8/2007 |
| WO | WO 2007/098478 | 8/2007 |
| WO | WO 2007/126436 | 11/2007 |
| WO | WO 2007/143240 | 12/2007 |
| WO | WO 2007/146453 | 12/2007 |
| WO | WO 2008/033827 | 3/2008 |
| WO | WO 2008/113023 | 9/2008 |
| WO | WO 2008/141200 | 11/2008 |
| WO | WO 2010/036448 | 4/2010 |

OTHER PUBLICATIONS

Amatucci et al. (2001) "An Asymmetric Hybrid Nonaqueous Energy Storage Cell," *J. Electrochem. Soc.* 148(8):A930-A939.

(56) References Cited

OTHER PUBLICATIONS

Arkema (2007) Arkema Product Literature, Kynar PVDF, Resins for Battery Manufacture.
Arnold et al. (1987) "Evidence for Cryptand-Like Behavior in Bibracchial Lariat Ether (BiBLE) Complexes Obtained from X-Ray Crystallography and Solution Thermodynamic Studies," *J. Am. Chem. Soc.* 109:3716-3721.
Arora et al. (2004) "Battery Separators," *Chem. Rev.*, 104:4419-4462.
Audier et al. (1981) "Crystallographic Orientations of Catalytic Particles in Filamentous Carbon; Case of Simple Conical Particles," *J. Cryst. Growth* 55:549-556.
Banerjee et al. (2003) "Rational Chemical Strategies for Carbon Nanotube Functionalization," *Chem. Eur. J.* 9:1898-1908.
Basire et al. (2000) "Evolution of the Lamellar Structure During Crystallization of a Semicrystalline-Amorphous Polymer Blend: Time-Resolved Hot-Stage SPM Study," *Phys. Rev. Lett.* 85:5587-5590.
Beer et al. (2003) "Transition Metal and Organometallic Anion Complexation Agents," *Coord. Chem. Rev.* 240:167-189.
Bertani et al. (1999) "$_{19}F/^{29}Si$ Distance Determination in Fluoride-Containing Octadecasil by Hartmann-Hahn Corss-Polarization Under Fast Magic-Angle Spinning," *Solid State Magn. Res.* 13:219-229.
Bethune et al. (1993) "Cobalt-Catalyzed Growth of Carbon Nanotubes with Single-Atomic0Layer Walls," *Nature* 363:605-607.
Bi et al., (1995) "Nanoscale carbon blacks produced by CO2 laser pyrolysis," *J. Mater. Res.*, vol. 10, No. 11, pp. 2875-2884.
Bitter et al. (1998) "Studies on Calix(aza)crowns, II. Synthesis of Novel Proximal Doubly Bridged Calix[4]arenes by Intramolecular Ring Closure of Syn 1,3- and 1,2- to ω-Chloraolkylamides," *Tetrahedron* 54:3857-3870.
Blesa et al. (2006) "Bis(calixcrown)tetrathiafuvalene Receptors," *Chem. Eur. J.* 12:1906-1914.
Blumberg, W.E. (1960) "Nuclear Spin Lattice Relaxation Caused by Paramagnetic Impurities," *Phys. Rev.* 119:79-84.
Bonnamy et al. (1999) "Carbonization of Various Precursors. Effect of Heating Rate: Part II: Transmission Electron Microscopy and Physicochemical Studies," *Carbon* 37:1707-1724.
Bonnamy et al. (1999) "Carbonizaion of Various Preursors. Effect of Heating Rate: Part I: Optical Microscopy Studies," *Carbon* 37:1691-1705.
Bourderau et al. (1999) "Amorphous Silicon as a Possile Anode Material for Li-ion Batteries," *J. Power Sources* 81:233-236.
Bruce, G. (2005) "Development of a CFx D Cell for Man Portable Apllications," In; Joint Service Power Expo, Power Point Presentation.
Bulusheva et al. (2002) "Atomic Arrangement and Electronic Structure of Graphite Fluoride C2F," *Phys. Low-Dim. Struct.* 7/8:1-14.
Cassell et al. (1999) "Large Scale CVD Synthesis of Single-Walled Carbon Nanotubes," *J. Phys. Chem. B* 103(31):6484-6492.
Chamssedine et al. (2007) "Reactivity of Carbon Nanofibers with Fluorine Gas," *Chem. Mater.* 19:161-172.
Charlier et al. (1993) "First Principles Study of Graphite Monofluoride $(CF)_n$," *Phys. Rev. B*, 47:16162-16168.
Chevalier et al. (1994) "Anionic Intercalation in $La_2CuO_4$ Oxide by Fluorine or Chlorine Treatment," *Mol. Cryst. Liq. Cryst.* 244:135-142.
Cheng et al. (1998) "Large-Scale and Low-Cost Synthesis of Single-Walled Carbon Nanotubes by the Catalytic Pyrolysis of Hydrocarbons," *Appl. Phys. Lett.* 72(25):3282-3284.
Chiang et al. (2001) "Purification and Characterization of Single-Walled Carbon Nanotubes (SWNTs) Obtained from the Gas-Phase Decomposition of CO (HiPco Process) *J. Phys. Chem. B* 105:8297-8301.
Chieu et al. (1982) "Raman Studies of Benzene-Derived Graphite Fibers," *Phys. Rev. B* 26:5867-.
Christensen et al. (1998) "Synthesis and Electrochemistry of a Tetrathiafulvalene $(TTF)_{21}$-glycol Dendrimer: Intradendrimer Aggregation of TTF Cation Radicals," *Chem. Commun.* 4:509-510.
Chung et al. (1995) "Electrochemical Behavior of Calix[4]arenediquinones and Their Cation Binding Properties," *J. Electroanalytical Chem.* 396:431-439.
Conway et al. (Sep. 2003) "Double-Layer and Pseudocapacitance Types of Electrochemical Capacitors and Their Applications to the Development of Hybrid Devices," *J. Solid State Electrochem.* 7(9):637-644.
Dahn et al. (2000) "Energy and Capacity Projections for Practical Dual-Graphite Cells," *J. Electrochem. Soc.* 147(3):899-901.
Davidson (2003) "Lithium Batteries, Molecular Expressions, Electricity and Magnetism," Florida State Univ., http://micro.magnet.fsu.edu/electromag/electricity/batteries/lithium.html , Downloaded Dec. 15, 2005.
De Jong et al. (2000) "Carbon Nanofibers: Catalytic Synthesis and Applications," *Catalysis Reviews-Science and Engineering* 42:481-510.
Derf et al. (2001) "Tetrathiafulvalene Crowns: Redox Switchable Ligands," *Chem. Eur. J.* 7(2):447-455.
Dietrich (1993) "Desgn of Anion Receptors: Applications," *Pure Apple. Chem.* 65(7):1457-1464.
Ding et al. (2001) "Change of Conductivity with Salt Content, Solvent Composition, and Temperature for Electrolytes of LiPF6 in Ethylene Carbonate-Ethyl Methyl Carbonate," *J. Electrochem. Soc.* 148(10):A1196-A1204.
Dresselhaus et al. (1981) "Intercalation Compounds of Graphite," *Adv. Phys.* 30(2):139-326.
Dubois et al. (2006) "EPR and Solid-State NMR Studies of Poly(dicarbon monofluoride) $(C_2F)_n$," *J. Phys. Chem. B.* 110:11800-11808.
Dubois et al. (2004) "NMR and EPR Studies of Room Temperature Highly Fluorinated Graphite Heat-Treated Under Fluorine Atmosphere," *Carbon* 42:1931-1940.
Duclaux, L. (2002) "Review of the Doping of Carbon Nanotubes (Multiwalled and Single-Walled)," *Carbon* 40:1751-1764.
Duesberg et al. (1998) "Chromatographic Size Separation of Single-Wall Carbon Nanotubes," *Appl. Phys. A* 67:117-119.
Duijvestjn et al. (1983) "$^{13}C$ NMR Spectroscopy in Diamonds Using Dynamic Nuclear Polarization," *Chem. Phys. Lett.* 102:25-28.
Ebert et al. (1974) "Carbon Monofluoride. Evidence for a Structure Containing an Infinite Array of Cyclohexane Boats," *J. Am. Chem Soc.*, 96:7841-7842.
Ehrlich, G.M. (2001) "Lithium-Ion Batteries," In; *Handbook of Batteries*, 3rd ed., Ch. 35, New York, McGraw Hill, pp. 35.1-35.90.
Endo, M. (1988) "Grow Carbon Fibers in the Varpor Phase," *Chemtech* :568-576.
Examination Report Corresponding to European Patent Application No. 07757061.2, issued Aug. 16, 2010.
Feng et al. (2003) "Removal of Some Impurities From Carbon Nanotubes," *Chem. Phys. Lett.* 375:645-648.
Frank et al. (1975) "Preparation and Crystal-Structure of $Li_3SN_5$ and Structural Relations Between Phases of Systems Li-SN and Li-PB," *Z. Naturforsch. B* 30:316-322.
Fujimoto (1997) "Structure Analysis of Graphite Fluoride by Rietveld Method," *Carbon*, 35:1061-1065.
Fukuda et al. (1983) "Lithium—Carbon Monofluoride Cells," Ch. 9, In; *Lithium Batteries*, Gabano ed., Academic press, New York, pp. 211-239.
Furdin, G. (1998) "Exfoliation Process and Elaboration of New Carbonaceous Materials," *Fuel* 77(6):479-485.
Giraudet et al. (2006) "Solid-State NMR Studies of Covalent Graphite Fluorides $(CF)_n$ and $(C_2F)_n$," *J. Phys. Chem. Solids* 67(5-6):1100-1105.
Giraudet et al. (2005) "Solid-State $^{19}F$ and $^{13}C$ NMR of Room Temperature Fluorinated Graphite and Samples Thermally Treated Under Fluorine: Low-Field and High-Resolution Studies," *J. Solid State Chem.* 118:1262-1268.
Giraudet et al. (Web Release Nov. 15, 2005) "Comparative Performances for Primary Lithium Batteries of Some Covalent and Semi-Covalent Graphite Fluorides," *J. Power Sources* 158:1365-1372.
Giraudet et al. (2005) "Solis-State NMR ($^{19}F$ and $^{13}C$) Study of Graphite Monofluoride $(CF)_n$: 19F Spin;Lattice Magnetic Relaxation and 19F/13C Distance Determination by Hartmann-Hahn Cross Polarization," *J. Phys. Chem. B* 109:175-181.

(56) References Cited

OTHER PUBLICATIONS

Gladyshevskii et al. (1964) "New Examples of the Structural Type $Li_{22}Pb_5$," *Sov. Phys. Crystallogr.* 9(3):269-271.

Gokel et al. (2000) "Experimental Evidence for Alkali Metal Cation—π Interactions," *Eur. J. Chem.* :2967-2978.

Graetz et al. (2003) "Highly Reversible Lithium Storage in Nanostructured Silicon," *Electrochemical and Solid-State Letters*, 6(9) A194-A197.

Guerin et al. (2004) "Hybrid-Type Graphite Fluoride as Cathode Material in Promary Lithium Batteries," *Electrochem. Solid-State Lett.* 7(6):A159-A162.

Gupta et al. (2001) "Raman Scattering Study of Highly Fluorinated Graphite," *J. Fluorine Chem.*, 110:145-151.

Gupta et al. (2003) "A Study on the Formation Mechanism of Graphite Fluorides by Raman Spectroscopy," *J. Fluorine Chem.* 120:143-150.

Guy et al. (Mar. 18, 2004) "New Composite Electrode Architecture and Improved Battery Performance from the Smart Use of Polymers and Their Properties," *Adv. Mater.* 16(6):553-557.

Hafner et al. (1998) "Catalytic Growth of Single-Wall Carbon Nanotubes From Metal Particles," *Chem. Phys. Lett.* 296(1-2):195-202.

Hagaman et al. (1998) "Solid-State $^{13}C$ and $^{19}F$ NMR Characterization of Fluorinated Charcoal," *Energy & Fuel* 12:399-408.

Hamwi et al. (1997) "Fluorination of Carbon Nanotubes," *Carbon* 35:723-728.

Hamwi et al. (1998) "Electrochemical Properties of Carbon Nanotube Fluorides in a Lithium Cell System," *Mol. Cryst. Liq. Cryst.* 310:185-190.

Hamwi, A. (1996) "Fluorine Reactivity with graphite and Fullerenes. Fluoride Derivatives and Some Practiccal Electrochemical Applications," *J. Phys. Chem. Solids* 57(6-8):677-688.

Hany et al. (1997) "Low-Temperature Carbon Fluoride for High Power Density Lithium Primary Batteries," *J. Power Sources* 68(2):708-710.

Harris, P. (1999) *Carbon Nanotubes and Related Structures*, Cambridge University Press, Cambridge, pp. 103.

Harutyunyuan et al. (2002) "Purification of Single-Wall Carbon Nanotubes by Selective Microwave Heating of Catallyst Particles," *J. Phys. Chem. B* 106:8671-8675.

Holzinger et al. (2000) "A New Purification Method for Single-Wall Carbon Nanotubes (SWNTs)," *Appl. Phys. A* 70:599-602.

Hopf et al. (1972) "Structure of the Lithium Germanide Phase $Li_7Ge_2$," *Z. Naturforsch. B* 22:1157-1160.

Hu et al. (Sep. 20, 2007) "A ($LiFePO_4$—C)/$Li_4Ti_5O_{12}$ Hybrid Battery Capacitor," *J. Electrochem. Soc.* 154(11):A1026-A1030.

Iijima, S. (1991) "Helical Microtubules of Graphite Carbon," *Nature* 354:56-58.

Iijima et al. (1993) "Single-Shell Carbon Nanotunbes 1-nm Diameter," *Nature* 363:603-605.

Inagaki et al. (2004) "Exfoliation Process of Graphite Via Intercalation Compounds with Sulfuric Acid," *J. Phys. Chem. Solids* 65:133-137.

Inagaki et al. (1994) "Graphite Exfoliation at Room Temperature and its Structural Annealing," *Carbon* 32(7):1253-1257.

International Search Report and Written Opinion, Corresponding to International Application No. PCT/US2009/051734, mailed Mar. 3, 2010.

International Search Report and Written Opinion, Corresponding to International Application No. PCT/US07/063094, mailed Aug. 18, 2008.

International Search Report and Written Opinion Corresponding to International Patent Application PCT/US07/63170, Mailed Aug. 12, 2008.

International Search Report and Written Opinion, Corresponding to International Application No. PCT/US08/63270, mailed Aug. 7, 2008.

International Search Report and Written Opinion Corresponding to International Patent Application PCT/US08/57092, Mailed Jul. 22, 2008.

International Search Report and Written Opinion Corresponding to International Application No. PCT/US2007/62243, Mailed Mar. 27, 2008.

International Search Report and Written Opinion Corresponding to International Application No. PCT/US07/62518, Mailed Sep. 27, 2007.

International Search Report and Written Opinion, Corresponding to International Application No. PCT/US06/20911, Mailed Aug. 22, 2007.

International Search Report Corresponding to International Application No. PCT/US06/60991, Mailed Nov. 15, 2007.

International Search Report and Written Opinion Corresponding to International Application No. PCT/US/05/37871, Mailed Apr. 19, 2006.

International Search Report Corresponding to International Application No. PCT/US05/08897, Mailed Aug. 28, 2006.

International Search Report corresponding to International Application No. PCT/US/03/28395, Mailed Feb. 8, 2005.

Ishaq et al. (2009) "Graphite-To-Amorphous Structural Transformation of Multiwalled Carbon Nanotubes Under Proton Beam Irradiation," *Mater. Lett.* 63(17):1505-1507.

Ishihara et al. (Web Release Jan. 8, 2007) "Electrochemical Intercalation of Hexafluorophosphate Anion into Various Carbons for Cathode of Dual-Carbon Rechargeable Battery," *Electrochem. Solid-State Lett.* 10(3):A74-A76.

Jacobs (2005) Lithium Battery Basics, Machine Design, www.machinedesign.com/ASP/strArticleID/55501/strSite/MDSite/view Selected Art.asp.

Jacobs (2005) "Long-lasting Lithiums," *Electron. Comm Technol.*, http://dataweek/co.za/Article.ASP?pklArticleID=1847&pklIssueID=455.

Johansson, P. (2006) "Intrinsic Anion Oxidation Potentials," *J. Phys. Chem.* 110:12077-12080.

Johnson et al. (1965) "The Crystal Structure of $Li_{15}Ge_4$," *Acta. Cryst.* 18:131-132.

Journet et al. (1997) "Large-Scale Production of Single-Walled Carbon Nanotubes by the Electric-Arc Technique," *Nature* 388:756-758.

Kavan (1997) "Electrochemical Carbon," *Chem. Rev.* 97:3061-3082.

Kelly et al. (1999) "Insight into the Mechanicsm of Sidewall Functionalization of Single-Walled Nanotubes: An STM Study," *Chem. Phys. Lett.* 313:445-450.

Kita et al. (1979) "Chemical Composition and Crystal Structure of Graphite Fluoride," *J. Am. Chem. Soc.*, 101:3832-3841.

Kitiyanan et al. (2000) "Controlled Production of Single-Wall Carbon Nanotubes by Catalytic Decomposition of CO on Bimetallic Co—Mo Catalysts," *Chem. Phys. Lett.* 317(3-5):497-503.

Knight et al. (1980) "Characterization of Diamond Films by Ranan Spectroscopy," *J. Mater Res.* 4:385-393.

Kostov et al. (Apr. 28, 2002) "New Approaches to the Synthesis of Functionalized Fluorine-Containing Polymers," *J. Fluorine Chem.* 114:171-176.

Kovtyukhova et al. (2003) "Individual Single-Walled Nanotubes and Hydrogels Made by Oxidative Exfoliation of Carbon Nanotube Ropes," *J. Am. Chem. Soc.* 125:9761-9769.

Krawietz et al. (1998) "Characterization of Poly(carbon monofluoride) by 19F and 19F to 13C Cross Polarization MAS NMR Spectroscopy," *Chem. Commun.* 19:2151-2151.

Kuga et al. (1993) "Laser-Assisted Exfoliation of Potassium-Ammonia-Graphite Intercalation Compounds," *Carbon* 31(1):201-204.

Kulikovsky et al. (Nov. 1999) "Modeling the Cathode Compartment of Polymer Electrolyte Fuel Cells: Dead and Active Reaction Zones," *J. Electrochem. Soc.* 146(11):3981-3991 including Errata Materials.

Kuriakose et al. (1965) "Kinetics of Reactions of Elemental Fluorine. IV. Fluorination of Graphite," *J. Phys. Chem.* 69:2272-2274.

Lagow et al. (1974) "Some new synthetic approaches to graphite-fluorine chemistry," *J. Chem. Soc., Dalton Trans.*, 1268-1273.

Lam et al. (Jun. 27, 2005) "Physical Characteristics and Rate Performance $(CF_x)_n$ (0.33<x<0.66) in Lithium Batteries," *J. Power Sci.* 153:354-359.

Le Derf et al. (2001) "Tetrathiafulvalene Crowns: Redox-Switchable Ligands," *Chem. Eur. J.* 7(2):447-455.

(56) References Cited

OTHER PUBLICATIONS

Lee et al. (2003) "The Physiochemical Characteristics of Modified Carbon Fibers by Fluorination," *Korean J. Chem. Eng.* 20(1):151-156.
Lee et al. (2004) "Synthesis of a Series of Fluorinated Boronate Compounds and Tehir Uses as Additives in Lithium Battery Electrolytes," *J. Electrochem. Soc.* 151(9):A1429-1435.
Lee et al. (Aug. 1998) "The Synthesis of a New Family of Boron-Based Anion Receptors and the Study of Their Effect on Ion Pair Dissociation and Conductivity of Lithium Salts in Nonaqueous Solutions," *J. Electrochem. Soc.* 145(8):2813-2818.
Li et al. (2000) "The Crystal Structural Evolution of Nano-Si Anode Caused by Lithium Insertion and Extraction at Room Temperature," *Solid State Ionics*, 135:181-191.
Li et al. (1999) "A High Capacity Nano-Si Composite Anode Material for Lithium Rechargeable Batteries," *Electrochemical and Solid-State Letters*, 2(11) 547-549.
Limthongkul et al. (2003) "Electorchemically-Driven Solid-State Amorphization in Lithium—Silicon Alloys and Implications for Lithium Storage," *Acta Materialia* 51:1103-1113.
Linden et al. (2001) "Lithium Batteries," In; *Handbook of Batteries*, $3^{rd}$ ed., Ch. 14, New York, McGraw Hill, pp. 14.1-14.99.
Liu et al. (1998) "Fullerene Pipes," *Science* 280:1253-1256.
Liu et al. (2005) "Versatile Self-Complexing Compounds Based on Covalently Linked Donoe-Acceptor Cyclophanes," *Chem. Eur. J.* 11:369-385.
Magasinski et al. (2002) "Graphitization, Intercalation, and Exfoliation of Cokes and Anthracites: A Comparative Study," *Fuel Processing Technol.* 79(3):259-264.
Maneckee et al. (1986) "Electron-Transfer Polymers," In; *Encyclopedia of Polymer Science and Engineering*, $2^{nd}$ ed., Kroshwitz, J.I. Ed., John Wiley, New York, vol. 5, pp. 725-755.
Mark et al. (1986) "Electron-Transfer Polymers," In; *Encyclopedia of Polymer Science and Engineering*, $2^{nd}$ ed., vol. 5, Wiley, pp. 725-755.
Matsuo et al., (1995) "Carbon—Fluorine Bondings of Fluorinated Fullerene and Graphite," *Zeitschrift für anorganische und allgemine Chemie*, 621:1943-1950.
Menges et al. (1969) "Crystal Structure of Lithium Germanide, A New Type of Three-Dimensional Bonding of Element(IV) Atoms," *Z Naturforsch. B* 24:1351-1352.
Messaoudi et al. (1991) "Chemical-Reduction of $FeCl_3$-Graphite Intercalation Compounds with Potassium Naphalene Complex in Tetrahydrofuran," *J. Mater. Chem.* 1(5):735-738.
Mickelson et al. (1998) "Fluorination of Single-Wall Carbon Nanotubes," *Chem. Phys. Lett.* 296:188-194.
Mitkin et al. (2002) "X-ray Electron- and Auger-Spectroscopic Study of Superstoichiometric Fluorographite-Like Materials," *J. Struct. Chem.*, 43:843-855.
Mittkin et al. (2003) "Types of Inorganic Fluorocarbon Polymer Materials and Structure-+roperty Correlation Problems," *J. Struct. Chem.* 44:82-115 (Translated from *Zhurnal Structunoi Khimii* 44:99-138).
Mochida et al. (2000) "Chemistry of Synthesis, Structure, Preparation and Application of Aromatic-Derived Mesophase Pitch," *Carbon* 38:305-328.
Morita et al. (1980) "Evaluation of Cathode Materials for the Lithium/Carbonmonofluride Battery," *J. Power Sources* 5:111-125.
Nakajima et al. (1999) "Electrochemical Behavior of Surface-Fluorinated Graphite," *Electrochem. Acta*, 44:2879-2888.
Nakajima et al. (1991) "Synthesis and Structures of Graphite Fluorides," In; *Graphite Fluorides and Carbon-Fluorine Compounds*, CRC Press, Boca Raton, FL, , Ch. 2, pp. 11-41.
Nakajima et al. (1991) "Lithium-Graphite Fluoride Battery," In; *Graphite Fluorides and Carbon—Fluorine Compounds*, CRC Press, Boca Raton, FL, , Ch. 4, pp. 77-109.
Nakajima et al. (1991) "Structure of Fluorine-Graphite Intercalation Compounds," *Carbon* 29(3):429-437.

Nakajima, T. (1995) "Synthesis, Structure, and Physicochemical Properties of Fluorine-Graphite Intercalation Compounds," In; *Fluorine—Carbon and Fluoride-Carbon Materials*, Marcel Dekker, New York, pp. 1-31.
Nakamizo et al. (1974) "Laser Raman Studies on Carbons," *Carbon* 12:259-267.
Nanse et al. (1997) "Fluorination of Carbon Blacks: An X-Ray Photoelectron Spectroscopy Study: I. A literature Review of XPS Studies of Fluorinated Carbons. XPS investigation of some reference compounds," *Carbon*, 35:175-194.
Nanse et al., (1997) "Fluorination of carbon blacks, an X-ray photoelectron spectroscopy study. Part II. XPS study of a furnace carbon black treated with gaseous fluorine at temperatures below 100° C. Influence of the reaction parameters and of the activation of the carbon black on the fluorine fixation," *Carbon*, vol. 35, No. 3, pp. 371-388.
Nasimbulin eet al. (2005) "Synthesis of Nanoparticles Using Vapor-Phase Decomposition of Copper(II) Acetylacetonate," *Colloid J.* 67(1):1-20.
Nazri, M. (2004) "Liquid Electrolytes: Some Theoretical and Practical Aspects," In; *Lithium Batteries Science and Technology*, Ch. 17, Kluer Academic Publisherss, pp. 509-573.
Nemanich et al. (1977) "Raman Scattering from Intercalated Donor Compounds of Graphite," *Phys. Rev. B* 16(6):2965-2972.
Nesper (1990) "Structure and Chemical Bonding in Zintl-Phases Containing Lithium," *Prog. Solid-State Chem.* 20:1-45.
Nishide et al. (2005) "Organic Radical Battery," *The Electrochm. Soc. Interface* Winter 2005.
Notice of Reasons for Rejection corresponding to Japanese Patent Application No. P2008-558474; dispatched Oct. 16, 2012 (English translation and Japanese).
Notice of Reasons for Rejection corresponding to Japanese Patent Application No. P2008-534512; dispatched Mar. 6, 2012.
Notice of Reasons for Rejection corresponding to Japanese Patent Application No. P2008-534512; dispatched Mar. 6, 2012—English translation.
Novak, P. (Web Release Feb. 5, 1997) "Electrochemically Active Polymers for Rechargeable Batteries," *Chem. Rev.* 97(1):207-282.
Oberlin et al. (1989) "High-Resolution TEM Studies of Carbonization and Graphitization," *Chemistry and Physics of Carbon*, Thrower, P.A. ed., vol. 22, New York, Marcel Dekker, pp. 1-143.
Office Action Corresponding to U.S. Appl. No. 11/681,493 Mailed Feb. 1, 2011.
Office Action and English Translation Corresponding to Chinese Patent Application 200780005815.7 issued Jun. 13, 2010.
Office Action and English Translation Corresponding to Chinese Patent Application 200680042706.8 issued Apr. 26, 2010.
Office Action Corresponding to Chinese Patent Application No. 200780006081.4, issued Aug. 28, 2009.
Office Action Corresponding to Chinese Patent Application No. 200780007682.7, issued May 25, 2010.
Office Actions and Responses Corresponding to U.S. Appl. No. 11/253,360, Filed Oct. 18, 2005.
Office Actions and Responses Corresponding to U.S. Appl. No. 11/420,653, Filed May 26, 2006.
Office Actions and Responses Corresponding to U.S. Appl. No. 11/422,564, Filed Jun. 6, 2006.
Office Actions and Responses Corresponding to U.S. Appl. No. 11/560,570, Filed Nov. 16, 2006.
Office Actions and Responses Corresponding to U.S. Appl. No. 11/675,308, Filed Feb. 15, 2007.
Office Actions and Responses Corresponding to U.S. Appl. No. 11/677,541, Filed Feb. 21, 2007.
Office Actions and Responses Corresponding to U.S. Appl. No. 12/049,147, Filed Mar. 14, 2008.
Office Actions and Responses Corresponding to U.S. Appl. No. 12/489,565, Filed Jun. 23, 2009.
Ohara et al. (2003) "Li Insertion/Extraction Reaction at a Si Film Evaporated on a Ni Foil," *Journal of Power Sources*, 119-121.
Okotrub et al. (2000) "Fluorinated Cage Multiwall Carbon Nanoparticles," *Chem. Phys. Lett.* 323:231-236.
Olah et al. (2006) "Fluorinated Superacidic Systems," *l'actualité chimique*, 301-302:68-72.

(56) References Cited

OTHER PUBLICATIONS

Osswald et al. (2005) "Elimination of D-Band in Raman Spectra of Double-Wall Carbon Nanotubes by Oxidation," *Chem. Phys. Lett.* 402:422-427.
Panich A.M. (1999) "Nuclear Magnetic Resonance Study of Fluorine-Graphite Intercalation Compounds and Graphite Fluorides," *Synth. Matals* 100:169-185.
Panich et al. (2001) "On Paramagnetism in Fluorinated Graphite: EPR and Solid-State NMR Study," *J. Phys. Chem. Solids* 62:959-964.
Pelikan et al. (2003) "On the Structural and Electronic Properties of Poly(dicarbon monofluoride): Solid-State Semi-Empirical INDO Study," *J. Solid State Chem.*, 174:233-240.
Petitjean et al. (1994) "Exothermic Exfoliation of Graphite-Intercalation Compounds Containing Perchloric-Acid," *Carbon* 32(3):461-467.
Pilarzyk "Lithium Carbon Monofluoride Coin Cells in Real-Time Clock and Memory Backup Applications," *Rayovac, White Papers*, http://www.rayovac.com/technical/wp_lithium.htm.m Downloaded Oct. 17, 2005.
Piotrowski et al. (2001) "Self-Assembled Organometallic [12]Metallacrown-3 Complexes," *Chem. Eur. J.* 7(15):3197-3207.
Press et al. (1988) *Numerical Recipes in C, The Art of Scientific Computing*, Plenum Press, New York.
Rao et al. (1992) "Raman-Scattering and Transmission-Electron-Microscopy Studies of Fluorine-Intercalated Graphite Fibers CxF ($7.8 \geq x \geq 2.9$)," *Phys. Rev. B* 45:6883-6892.
Rinzler et al. (1998) "Large-Scale Purification of Single-Wall Carbon Nanotubes: Process, Product, and Characterization," *Appl. Phys. A* 67:29-37.
Rudorf et al. (1947) "Zur Konstitution des Kohlenstoff-Monofluorides," *Z. Anorg. Allg. Chem.* 253:281-296.
Ruff et al. (1934) "Die Reaktionsprodukte der verschiedenen Kohlenstoffformen mit Fluor II (Kohlenstoff-monofluoride)," *Z Anorg. Allg. Chem.* 217:1-18.
Sano et al. (2002) "Properties of Carbon Onions Produced by an Arc Discharge in Water," *J. Appl. Phys.* 92(5):2783-2788.
Sato et al. (2004) "On the So-Called 'Semi-Ionic' C-F Bond Character in Fluorine-GIC," *Carbon* 42:3243-3249.
Sayama et al. (2002) "New Active Material Structure in Si Thin Film Electrode for Rechargable Lithium Batteries," The 11th International Meeting on Lithium Batteries, Abstract 52, Monterey, CA, Jun. 23-28, 2002.
Seel et al. (2000) "Electrochemical Intercalation of $PF_6$ into Graphite," *J. Electrochem. Soc.* 147(3):892-898.
Seki et al. (Web Release Jan. 10, 2007) "Imidazoleium-Based Room-Temperature Ionic Liquid for Lithium Secondary Batteries," *J. Electrochem. Soc.* 154(3):A173-A177.
Shneyder "Two-Dimensional Oxidation of SiGe," 69-71, http://www.nnf.cornell.edu/1999REU/ra/Schneyder.pdf.
Shundrin et al. (2004) "The Electrochemical Oxidation of Polyfluorophenyltrifluoroborate Anions in Acetonitrile," *Z. Anorg. Allg. Chem.* 630:1253-1257.
Singh et al. (2006) "Study of Interactions of Various Ionic Species with Solvents Toward the Design of Receptors," *Theor. Chem. Acc.* 115:127-135.
Skowronski et al. (2004) "Electrochemical Intercalation of $ZnCl_2$—$CrO_3$—GIC (Graphite Intercalation Compound) with Sulfuric Acid," *Polish J. Chem.* 78:1339-1344.
Steed, J.W. (2001) "First- and Second Sphere Coordination Chemistry of Alkali Metal Crown Ether Complexes," *Coord. Chem. Rev.* 215:171-221.
Stein et al. (1987) "π-Electron Properties of Large Condensed Polyaromatic Hydrocarbons," *J. Am. Chem. Soc.* 109:3721-3729.
Su et al. (2000) "A Scalable CVD Method for the Synthesis of Single-Walled Carbon Nanotubes with High Catalyst Productivity," *Chem. Phys. Lett.* 322(5):321-326.
Sun et al. (2003) "The Compatibility of a Boron-Based Anion Receptor with the Carbon Anode in Lithium-Ion Bateries," *Electorchem. Solid-State Lett.* 6(2):A43-A46.

Sun et al. (1998) "A Novel Lithium Battery Electrolyte Based on Lithium Fluoride and a Tris(pentafluorophenyl) Borane Anion Receptor in DME," *Electrochem. Solid-State Lett.* 1(6):239-240.
Supplementary European Search Report, Corresponding to European Application No. EP07757061, completed Feb. 10, 2010.
Takai et al. (2000) "Fluorine-Introduced sp3-Carbon Sites in a Nano-Sized pi-Electron System and Their Effects on the Electronic Properties," *Mol. Cryst. Liq. Cryst.* 340:289-294.
Takamura et al. (2002) "Li Insertion/Extraction Reaction of a Si Film Evaporated on Ni Foil," The 11th International Meeting on Lithium Batteries, Abstract 257, Monterey, CA, Jun. 23-28, 2002.
Takenobu et al. (2003) "Hydrogen Storage in $C_{70}$ Encapsulated Single-Walled Carbon Nanotube," *Synthetic Metals* 135-136:787-788.
Thess et al. (1996) "Crystalline Ropes of Metallic Carbon Nanotubes," *Science* 273:483-487.
Touhara et al. (1987) "On the Structure of Graphite Fluoride," *Anorg. All. Chem.*, 544:7-20.
Touhara et al. (2000) "Property Control of Carbon Materials by Fluorination," *Carbon* 38:241-267.
Touhara et al. (2002) "Property Control of New Forms of Carbon Materials by Fluorination," *J. Fluorine Chem.* 114:181-188.
Touhara et al. (1987) "Electrochemical Characteristics of Fluorine Intercalated Graphite Fiber-Lithium Cells," *Electrochemica Acta* 32(2):293-298.
Touhara et al. (2004) "Fluorination of Cup-Stacked Carbon Nanotubes, Structure and Properties," Materials Research Society Fall Meeting Proceedings, MRS Proceedings vol. 858E, Abstract No. HH12.3.
Toyoda et al. (2004) "Exfoliation of Carbon Fibers," *J. Phys. Chem. Solids* 65:109-117.
Tuinstra et al. (1970) "Raman Spectrum of Graphite," *J. Chem. Phys.* 53(3):1126-1130.
Ue et al. (2002) "Anodic Stability of Several Anions Examined by AB Initio Molecular Orbital and Density Functional Theories," *J. Electrochem. Soc.* 149(12):A1572-A1577.
Ue et al. (2006) "Electrochemical Properties of $Li[C_nF2_{n+1}BF_3]$ as Electrolyte Salts for Lithium-Ion Cells," *Solid State Ionics* 177:323-331.
Watanabe et al. (1974) "Vapor Phase Amination Reaction of Phenol Over Solid Acid Catalysts," *Nippon Kagaku Kaishi*, 3:540-544.
Watanabe et al. (1988) "Graphite Intercalation Compound of Fluorine," In; *Graphite Fluorides*, Elsevier, Amsterdam, Ch. 8, pp. 240-261.
Wantanabe et al. (1988) "Lithium-Graphite Fluoride Battery," In; *Graphite Fluorides*, Elsevier, Amsterdam, Ch. 5, pp. 148-203.
Wantanabe et al. (1988) "Preparation, Stoichiometry and Structure of Graphite Fluoride," In; *Graphite Fluorides*, Elsevier, Amsterdam, Ch. 2, pp. 23-89.
Watanabe, N. (1981) "Characteristics and Applications of Graphite Fluoride," *Physica B* 105:17-21.
West et al. (2007) "Reversible Intercalation of Fluoride-Anion Receptor Complexes in Graphite," *J. Electrochem. Soc.* 154(10)A929-A936.
Whitacre et al. (Web Release May 2007) "Enhanced Low-Temperature Performance of $Li-CF_x$ Batteries," *Electrochem. Solid State Lett.* 10:A166-A170.
Whitacre et al. (Sep. 2006) "Low Operational Temperature Li—CFx Batteries Using Cathodes Containing Sub'Fluorinated GraphiteMaterials," *J. Power Sources* 160:577-584.
Whittingham (1975) "Mechanism of Reduction of Fluorographite Cathode," *J. Electrochem. Soc.*, 122:526-527.
Wilkie et al. (1979) "The Solid-State $^{13}$C-NMR and $^{19}$F-NMR Spectra of Some Graphite Fluorides," *J. Solid State Chem.* 30:197-201.
Winter et al. (2004) "Carbonaceous and Graphitic Anodes," In; *Lithium Batteries Science and Technology*, Ch. 5, Kluer Academic Publisherss, pp. 144-194.
Woo et al. (2003) "Structural Characteristics of Carbon Nanorods and Nanotubes Grown Using Electron Cyclotron Resonance Chemical Vapor Deposition," *J. Appl. Phys.* 94(10):6789-6795.
Wood et al. (1973) "Thermodynamic, electrochemical, and synthetic studies of the graphite-fluorine compounds fluoromethylidyne and carbon fluoride ($C_4F$)," *Chemical Abstracts*, vol. 78, p. 366.

(56) References Cited

OTHER PUBLICATIONS

Xu et al. (2004) "Nonaqueous Liquid Electrolytes for Lithium-Based Rechanrgeable Batteries," *Chem. Rev.* 104:4303-4417.

Yan, Wei, and M.M. Lerner (2003) "Preparation of a Graphite Bis(perfluoropinacolato)borate Intercalation Compound," *J. Electrochem. Soc.* 150(9)D169-D173.

Yang et al. (2002) "Characteristics and Carbonization Behaviors of Coal Extracts," *Fuel Processing Technol.* 70:207-215.

Yazami et al. (2007) "The Kinetics of Sub-Fluorinated Carbon Fluoride Cathodes for Lithium Batteries," *ECS Trans.* 3(36): 199-211.

Yazami et al. et al.(Web Release Apr. 2007) "Fluorinated Carbon Nanofibres for High Energy and High Power Densities Primary Lithium Batteries," *Electrochem. Commun.* 9:1850-1855.

Yazami et al. (2006) "The Kinetics of Sub-Fluorinated Carbon Fluoride Cathods for Lithium Battereis," Meeting Abstracts, Electrochem Soc., 210$^{th}$ ECS Meeting, Oct. 29-Nov. 3, Cancun Mexico Abstract #235.

Yokomichi et al. (2000) "Temperature Dependence of Electron Spin Resonance in Fluorinated Amorphous Carbon Films," *J. Non-Cryst. Solids* 266:797-802.

Yokomichi et al. (1998) "Preparation of Fluorinated Amorphous Carbon Thin Films," *J. Non-Cryst. Solids* 227:641-644.

Yoshida et al. (1991) "Exfoliated Graphite from Various Intercalation Compounds," *Carbon* 29(8):1227-1231.

Zajac et al. (2000) "The Structure and Properties of Graphite Monofluoride Using the Three-Dimensional Cyclic Cluster Approach," *J. Solid State Chem.,* 150:286-293.

Zhao et al. (2005) "A Calixarene-Amide-tetrathiafulvalene Assembly for the Electrochemical Detection of Anions," *New J. Chem.* 29:1164-1167.

Zheng et al. (2002) "CVD Synthesis and Purification of Single-Walled Carbon Nanotubes on Aerogel-Supported Catalyst," *Appl. Phys. A* 74:345-348.

Zhou et al. (2005) "Li[$C_2F_5BF_3$] as an Electrolyte Salt for 4 V Class Lithium-Ion Cells," *J. Electrochem. Soc.* 152(2):A351-A356.

Zhou et al. (1999) "Controlled Li Doping of Si Nanowires by Electrochemical Insertion Method," Applied Physics Letters, 75(16):2447-2449.

Author (Unknown), 2004, "Meeting the Energy Need of Future Warriors," *National Academic Press,* www.nap.edu/openbook/0309092612/html/91.html, Downloaded Oct. 14, 2005.

Author (Unknown), 2004, "Meeting the Energy Need of Future Warriors," National Academic Press, www.nap.edu/openbook/0309092612/html/88.html, Downloaded Oct. 14, 2005.

Author (Unknown), "Lithium Batteries," Panasonic Ideas for Life, Product brochure, www.panasonic.com/industrial/battery/oem/chem/lith/index.html, Downloaded Oct. 14, 2005.

Author (Unknown), 2000-2005, PowerStream Battery Chemistry FAQ, PowerStream Technology, www.powerstream.com/BatteryFAQ.html, Last Updated Aug. 17, 2003.

Isihara et al., Jan. 8, 2007, "Electrochemical Intercalation of Hexafluorophosphate Anion into Various Carbons for Cathode of Dual-Carbon Rechargeable Battery," *Electrochemical and Solid-State Letters*, 10(3), A74-A76.

Notice of Non-Final Rejection corresponding to Korean Patent Application No. 10-2008-7024135, issued Apr. 30, 2014 (includes English translation).

Notice of Reasons for Rejection corresponding to Japanese Patent Application No. P2013-055321 dispatched Jun. 3, 2014 (includes English translation).

Notice of Reasons for Rejection corresponding to Japanese Patent Application No. P2008-558474 dispatched Jun. 3, 2014 (includes English translation).

\* cited by examiner

| Crystal class | P$\bar{6}$m2 |
|---|---|
| Crystal system | hexagonal |
| Parameter observed | a = b = 2.53 ~ 2.57 Å<br>c = 11.8 Å |
| Parameter calculated<br>(Commercial CF) | a = b = 2.50 Å<br>c = 12.1 Å |
| Stacking | A/A'/A/A' |

Image of CF by SEM 21A　　　　　　　　　　　21B

FLUORIDE ION ELECTROCHEMICAL CELL

CROSS-REFERENCE TO RELATED APPLICATIONS

This application is a continuation of U.S. application Ser. No. 11/681,493, filed on Mar. 2, 2007 which claims priority under 35 U.S.C. 119(e) to U.S. provisional Patent Application 60/779,054 filed Mar. 3, 2006, U.S. provisional Patent Application No. 60/897,310, filed Jan. 25, 2007, and U.S. Provisional Application No. 60/900,409, filed Feb. 9, 2007. Each of these applications is incorporated by reference in its entirety to the extent not inconsi with the disclosure herein.

U.S. application Ser. No. 11/681,493 is also a continuation-in-part of U.S. application Ser. No. 11/677,541, filed Feb. 21, 2007, which is a continuation in part of U.S. application Ser. No. 11/422,564, filed Jun. 6, 2006, which claims the benefit of U.S. Provisional Application 60/724,084, filed Oct. 5, 2005 and is a continuation in part of U.S. application Ser. No. 11/253,360 filed Oct. 18, 2005, which also claims the benefit of U.S. Provisional Application 60/724,084, filed Oct. 5, 2005. Ser. No. 11/677,541 is also a continuation in part of U.S. application Ser. No. 11/675,308 and International Application PCT/US2007/62243, both filed Feb. 15, 2007, both of which claim the benefit of U.S. Provisional Applications 60/774,262, filed Feb. 16, 2006, 60/784,957, filed Mar. 21, 2006 and 60/784,960, filed Mar. 20, 2006. Ser. No. 11/677,541 also claims the benefit of U.S. Provisional Applications No. 60/775,110, filed Feb. 21, 2006, 60/775,559, filed Feb. 22, 2006, and U.S. Provisional Application No. 60/900,409 filed Feb. 9, 2007. Each of these applications is incorporated by reference in its entirety to the extent not inconsistent with the disclosure herein.

U.S. application Ser. No. 11/681,493 is also a continuation-in-part of U.S. application Ser. No. 11/560,570, filed Nov. 16, 2006, which claims priority from U.S. Provisional Application Nos. 60/737,186, 60/775,110, 60/775,559 filed Nov. 16, 2005, Feb. 21, 2006 and Feb. 22, 2006, respectively. Each of these applications is incorporated by reference in its entirety to the extent not inconsistent with the disclosure herein.

U.S. application Ser. No. 11/681,493 is also a continuation-in-part of PCT International Application No. PCT/US2007/063094, filed on Mar. 1, 2007.

BACKGROUND OF INVENTION

Over the last few decades revolutionary advances have been made in electrochemical storage and conversion devices expanding the capabilities of these systems in a variety of fields including portable electronic devices, air and space craft technologies, and biomedical instrumentation. Current state of the art electrochemical storage and conversion devices have designs and performance attributes that are specifically engineered to provide compatibility with a diverse range of application requirements and operating environments. For example, advanced electrochemical storage systems have been developed spanning the range from high energy density batteries exhibiting very low self discharge rates and high discharge reliability for implanted medical devices to inexpensive, light weight rechargeable batteries providing long runtimes for a wide range of portable electronic devices to high capacity batteries for military and aerospace applications capable of providing extremely high discharge rates over short time periods.

Despite the development and widespread adoption of this diverse suite of advanced electrochemical storage and conversion systems, significant pressure continues to stimulate research to expand the functionality of these systems, thereby enabling an even wider range of device applications. Large growth in the demand for high power portable electronic products, for example, has created enormous interest in developing safe, light weight primary and secondary batteries providing higher energy densities. In addition, the demand for miniaturization in the field of consumer electronics and instrumentation continues to stimulate research into novel design and material strategies for reducing the sizes, masses and form factors of high performance batteries. Further, continued development in the fields of electric vehicles and aerospace engineering has also created a need for mechanically robust, high reliability, high energy density and high power density batteries capable of good device performance in a useful range of operating environments.

Many recent advances in electrochemical storage and conversion technology are directly attributable to discovery and integration of new materials for battery components. Lithium battery technology, for example, continues to rapidly develop, at least in part, due to the discovery of novel electrode and electrolyte materials for these systems. From the pioneering discovery and optimization of intercalation host materials for positive electrodes, such as fluorinated carbon materials and nanostructured transition metal oxides, to the development of high performance non-aqueous electrolytes, the implementation of novel materials strategies for lithium battery systems have revolutionized their design and performance capabilities. Furthermore, development of intercalation host materials for negative electrodes has led to the discovery and commercial implementation of lithium ion based secondary batteries exhibiting high capacity, good stability and useful cycle life. As a result of these advances, lithium based battery technology is currently widely adopted for use in a range of important applications including primary and secondary electrochemical cells for portable electronic systems.

Commercial primary lithium battery systems typically utilize a lithium metal negative electrode for generating lithium ions which during discharge are transported through a liquid phase or solid phase electrolyte and undergo intercalation reaction at a positive electrode comprising an intercalation host material. Dual intercalation lithium ion secondary batteries have also been developed, wherein lithium metal is replaced with a lithium ion intercalation host material for the negative electrode, such as carbons (e.g., graphite, cokes etc.), metal oxides, metal nitrides and metal phosphides. Simultaneous lithium ion insertion and de-insertion reactions allow lithium ions to migrate between the positive and negative intercalation electrodes during discharge and charging. Incorporation of a lithium ion intercalation host material for the negative electrode has the significant advantage of avoiding the use of metallic lithium which is susceptible to safety problems upon recharging attributable to the highly reactive nature and non-epitaxial deposition properties of lithium.

The element lithium has a unique combination of properties that make it attractive for use in an electrochemical cell. First, it is the lightest metal in the periodic table having an atomic mass of 6.94 AMU. Second, lithium has a very low electrochemical oxidation/reduction potential (i.e., −3.045 V vs. NHE (normal hydrogen reference electrode). This unique combination of properties enables lithium based electrochemical cells to have very high specific capacities. Advances in materials strategies and electrochemical cell designs for lithium battery technology have realized electrochemical cells capable of providing useful device performance including: (i) high cell voltages (e.g. up to about 3.8 V), (ii) substantially constant (e.g., flat) discharge profiles, (iii) long shelf-life (e.g., up to 10 years), and (iv) compatibility with a range of operating temperatures (e.g., −20 to 60 degrees Celsius). As a result of these beneficial characteristics, primary lithium-batteries are widely used as power sources in a range of portable electronic devices and in other important device applications including, electronics, information technology, communication, biomedical engineering, sensing, military, and lighting.

State of the art lithium ion secondary batteries provide excellent charge-discharge characteristics, and thus, have also been widely adopted as power sources in portable electronic devices, such as cellular telephones and portable computers. U.S. Pat. Nos. 6,852,446, 6,306,540, 6,489,055, and "Lithium Batteries Science and Technology" edited by Gholam-Abbas Nazri and Gianfranceo Pistoia, Kluer Academic Publishers, 2004, are directed to lithium and lithium ion battery systems which are hereby incorporated by reference in their entireties.

As noted above, lithium metal is extremely reactive, particularly with water and many organic solvents, and this attribute necessitates use of an intercalation host material for the negative electrode in secondary lithium based electrochemical cells. Substantial research in this field has resulted in a range of useful intercalation host materials for these systems, such as $LiC_6$, $Li_xSi$, $Li_xSn$ and $Li_x(CoSnTi)$. Use of an intercalation host material for the negative electrode, however, inevitably results in a cell voltage that is lower by an amount corresponding to the free energy of insertion/dissolution of lithium in the intercalation electrode. As a result, conventional state of the art dual intercalation lithium ion electrochemical cells are currently limited to providing average operating voltages less than or equal to about 4 Volts. This requirement on the composition of the negative electrode also results in substantial loss in the specific energies achievable in these systems. Further, incorporation of an intercalation host material for the negative electrode does not entirely eliminate safety risks. Charging these lithium ion battery systems, for example, must be carried out under very controlled conditions to avoid overcharging or heating that can result in decomposition of the positive electrode. Further, unwanted side reactions involving lithium ion can occur in these systems resulting in the formation of reactive metallic lithium that implicate significant safety concerns. During charging at high rates or at low temperatures, lithium deposition results in dendrides formation that may grow across the separator and cause an internal short-circuit within the cell, generating heat, pressure and possible fire from combustion of the organic electrolyte and reaction of metallic lithium with air oxygen and moisture.

Dual-carbon cells have also been developed that utilize lithium insertion reactions for electrochemical storage, wherein anions and cations generated by dissolution of an appropriate electrolyte salt provide the source of charge stored in the electrodes. During charging of these systems, cations of the electrolyte, such as lithium ion ($Li^+$), undergo insertion reaction at a negative electrode comprising a carbonaceous cation host material, and anions of the electrolyte, such as $PF_6^-$, undergo insertion reaction at a positive electrode carbonaceous anion host material. During discharge, the insertion reactions are reversed resulting in release of cations and anions from positive and negative electrodes, respectively. State of the art dual-carbon cells are unable to provide energy densities as large as those provided by lithium ion cells, however, due to practical limitations on the salt concentrations obtainable in these systems. In addition, some dual-carbon cells are susceptible to significant losses in capacity after cycling due to stresses imparted by insertion and de-insertion of polyatomic anion charge carriers such as $PF_6^-$. Further, dual-carbon cells are limited with respect to the discharge and charging rates attainable, and many of these system utilize electrolytes comprises lithium salts, which can raise safety issues under some operating conditions. Dual carbon cells are described in U.S. Pat. Nos. 4,830,938; 4,865,931; 5,518,836; and 5,532,083, and in "Energy and Capacity Projections for Practical Dual-Graphite Cells", J. R. Dahn and J. A. Seel, Journal of the Electrochemical Society, 147 (3) 899-901 (2000), which are hereby incorporated by reference to the extent not inconsistent with the present disclosure.

A battery consists of a positive electrode (cathode during discharge), a negative electrode (anode during discharge) and an electrolyte. The electrolyte contains ionic species that are the charge carriers. Electrolytes in batteries can be of several different types: (1) pure cation conductors (e.g., beta Alumina conducts with $Na^+$ only); (2) pure anion conductors (e.g., high temperature ceramics conduct with $O^-$ or $O^{2-}$ anions only); and (3) mixed ionic conductors: (e.g., some Alkaline batteries use a KOH aqueous solution that conducts with both $OH^-$ and $K^+$, whereas some lithium ion batteries use an organic solution of $LiPF_6$ that conducts with both $Li^+$ and $PF_6^-$). During charge and discharge electrodes exchange ions with electrolyte and electrons with an external circuit (a load or a charger).

There are two types of electrode reactions.

1. Cation based electrode reactions: In these reactions, the electrode captures or releases a cation $Y^+$ from electrolyte and an electron from the external circuit:

Electrode+$Y^+$+$e^-$→Electrode(Y).

Examples of cation based electrode reactions include: (i) carbon anode in a lithium ion battery: $6C+Li^++e^-→LiC_6$ (charge); (ii) lithium cobalt oxide cathode in a lithium ion battery: 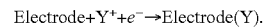 (discharge); (iii) $Ni(OH)_2$ cathode in rechargeable alkaline batteries: $Ni(OH)_2→NiOOH+H^++e^-$ (charge); (iv) $MnO_2$ in saline $Zn/MnO_2$ primary batteries: $MnO_2+H^++e^-→HMnO_2$ (discharge).

2. Anion based electrode reactions: In these reactions, the electrode captures or releases an anion $X^-$ from electrolyte and an electron from the external circuit:

Electrode+$X^-$→Electrode(X)+$e^-$

Examples of anion based electrode reactions include: (i) Cadmium anode in the Nickel-Cadmium alkaline battery: $Cd(OH)_2+2e^-→Cd+2OH^-$ (charge); and (ii) Magnesium alloy anode in the magnesium primary batteries: $Mg+2OH^-→Mg(OH)_2+2e^-$ (discharge).

Existing batteries are either of pure cation-type or mixed ion-type chemistries. To Applicants knowledge there are currently no known batteries having pure anion-type chemistry. Example of pure cation-type and mixed ion-type batteries are provided below:

1. Pure cation-type of battery: Lithium ion batteries are an example of pure cation-type chemistry. The electrode half reactions and cell reactions for lithium ion batteries are:
    Carbon anode:

$6C+Li^++e^-→LiC_6$ (charge)

lithium cobalt oxide cathode:

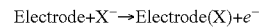 (discharge)

cell reaction:

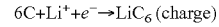 (charge)

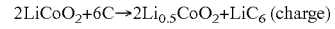 (discharge)

2. Mixed ion-type of battery: A Nickel/cadmium alkaline battery is an example of a mixed ion-type of battery. The electrode half reactions and cell reactions for a Nickel/cadmium alkaline battery are provided below:

Ni(OH)$_2$ cathode (cation-type):

$$Ni(OH)_2 \rightarrow NiOOH + H^+ + e^- \text{ (charge)}$$

Cadmium anode (anion-type):

$$Cd(OH)_2 + 2e^- \rightarrow Cd + 2OH^- \text{ (charge)}$$

Cell reaction:

$$Cd(OH)_2 + 2Ni(OH)_2 \rightarrow Cd + 2NiOOH + 2H_2O \text{ (charge)}$$

$$Cd + 2NiOOH + 2H_2O \rightarrow Cd(OH)_2 + 2Ni(OH)_2 \text{ (discharge)}$$

A Zn/MnO$_2$ battery is an example of a mixed ion-type of battery. The electrode half reactions and cell reactions for a Zn/MnO$_2$ battery are provided below:

Zn anode (anion-type):

$$Zn + 2OH^- \rightarrow ZnO + H_2O + 2e^- \text{ (discharge)}$$

MnO$_2$ cathode (cation-type)

$$MnO_2 + H^+ + e^- \rightarrow HMnO_2 \text{ (discharge)}$$

Cell reaction:

$$Zn + 2MnO_2 + H_2O \rightarrow ZnO + 2HMnO_2 \text{ (discharge)}$$

As will be clear from the foregoing, there exists a need in the art for secondary electrochemical cells for a range of important device application including the rapidly increasing demand for high performance portable electronics. Specifically, secondary electrochemical cells are needed that are capable of providing useful cell voltages, specific capacities and cycle life, while at the same time exhibiting good stability and safety. A need exists for alternative insertion/intercalation based electrochemical cells that eliminate or reduce safety issues inherent to the use of lithium in primary and secondary battery systems.

SUMMARY OF THE INVENTION

The present invention provides electrochemical cells capable of good electrical power source performance, particularly high specific energies, useful discharge rate capabilities and good cycle life. Electrochemical cells of the present invention are versatile and include primary and secondary cells useful for a range of important applications including use in portable electronic devices. Electrochemical cells of the present invention also exhibit enhanced safety and stability relative to conventional state of the art primary lithium batteries and lithium ion secondary batteries. For example, electrochemical cells of the present invention include secondary anionic electrochemical cells using anion charge carriers capable of accommodation by positive and negative electrodes comprising anion host materials, which entirely eliminate the need for metallic lithium or dissolved lithium ion in these systems.

The present invention provides novel active electrode materials strategies, electrolyte compositions and electrochemical cell designs enabling a fundamentally new class of primary and secondary electrochemical cells. Anion charge carrier host materials for positive and negative electrodes and high performance electrolytes are provided that enable a new electrochemical cell platform capable of achieving useful performance attributes, such as specific energies higher than that in conventional state of the art lithium ion batteries. In an embodiment, for example, the present invention provides combinations of different anion charge carrier host materials for positive and negative electrodes that enable secondary electrochemical cells capable of exhibiting cell voltages greater than or equal to about 3.5 V. In addition, positive and negative electrode materials combinations of the present invention enable secondary electrochemical cells having a large cycle life and exhibiting good discharge stability upon cycling. Further, aqueous and nonaqueous electrolyte compositions are provided that provide synergistic performance enhancements important for improving device performance, stability and safety at high cell voltages. For example, the present invention provides high performance electrolytes having anion receptors and/or cation receptors compatible with anion charge carrier active electrode host materials that provide secondary cells capable of stable discharge rates at high cell voltages.

In an aspect, the present invention provides an anionic electrochemical cell utilizing an anion charge carrier capable of accommodation by positive and negative electrodes comprising anion host materials. This aspect of the present invention includes both primary and secondary electrochemical cells. In an embodiment, an electrochemical cell of this aspect of the present invention comprises a positive electrode; a negative electrode; and an electrolyte provided between the positive electrode and the negative electrode, wherein the electrolyte is capable of conducting anion charge carriers. The positive electrode and negative electrode of this embodiment comprise different anion host materials that reversibly exchange anion charge carriers with the electrolyte during charging or discharging of the electrochemical cell. In the context of this description, the term "exchange" refers to release or accommodation of anion charge carriers at the electrodes via oxidation and reduction reactions during discharge or charging of the electrochemical cell. In this context, "accommodation" of anion charge carriers includes capture of anion charge carriers by the host material, insertion of anion charge carriers into the host material, intercalation of anion charge carriers into the host material and/or chemical reaction of anion charge carriers with the host material. Accommodation includes alloy formation chemical reactions, surface chemical reactions with the host material and/or bulk chemical reactions with the host material.

During discharge, reduction half reactions occurring at the positive electrode result in release of anion charge carriers from the positive electrode to the electrolyte, and oxidation half reactions occurring at the negative electrode result in accommodation of anion charge carriers by the negative electrode. In these embodiments, therefore, anion charge carriers are released from the positive electrode, migrate through the electrolyte and are accommodated by the negative electrode during discharge of the electrochemical cell. This kinetic process is reversed during charging in secondary electrochemical cells of the present invention. During charging in these embodiments, therefore, reduction half reactions occurring at the negative electrode result in release of anion charge carriers to the electrolyte, and oxidation half reactions occurring at the positive electrode result in accommodation of anion charge carriers from the electrolyte to the positive electrode. Accordingly, simultaneous release and accommodation of anion charge carriers during discharge and charging of the electrochemical cell occurs as anion charge carriers are transported through the electrolyte and electrons are transported through an external circuit connecting positive and negative electrodes.

Choice of the composition and phase of electrode host materials, electrolyte and anion charge carriers in this aspect of the invention is important in the present invention for accessing useful electrochemical cell configurations. First, selection of the compositions of the anion host materials for positive and negative electrodes and the anion charge carrier determines, at least in part, the cell voltage of the electrochemical cell. It is beneficial in some embodiments, therefore, to select an anion host material providing a sufficiently low standard electrode potential at the negative electrode and to select an anion host material providing a sufficiently high standard electrode potential at the positive electrode so as to result in a cell voltage useful for a given application. Second, selection of the compositions of the anion host materials for positive and negative electrodes, electrolyte and the anion charge carrier establishes the kinetics at the electrode, and thus determines the discharge rate capabilities of the electrochemical cell. Third, use of electrode host materials, electrolyte and anion charge carriers that do not result in fundamental structural changes or degradation at the positive and negative electrodes during charging and discharge is beneficial for secondary electrochemical cells exhibiting good cycling performance.

In an embodiment of this aspect, the present invention provides fluoride ion primary and secondary electrochemical cells having fluoride ions ($F^{-1}$) as the anion charge carriers. Electrochemical cell utilizing fluoride ion charge carriers of the present invention are referred to as fluoride ion electrochemical cells. Use of fluoride ion charge carriers in electrochemical cells of the present invention provides a number of benefits. First, the low atomic mass (18.998 AMU), high electron affinity ($-328$ kJ $mol^{-1}$) of fluorine and about 6V redox voltage stability window (from $-3.03$V vs. NHE to $+2.87$V vs. NHE) of the fluoride ion ($F^-$) results in electrochemical cells having high voltage, high energy densities and high specific capacities. Second, fluoride ion has a small atomic radius and, thus, can participate in reversible insertion and/or intercalation reactions in many electrode host materials that do not result in significant degradation or significant structural deformation of the electrode host material upon cycling in secondary electrochemical cells. This property results in secondary fluoride ion electrochemical cells having a large cycle life (e.g., greater than or equal to about 500 cycles). Third, fluoride ion is stable with respect to decomposition at electrode surfaces for a useful range of voltages ($-3.03$V vs. NHE to $+2.87$V vs. NHE), thereby providing enhanced performance stability and safety of electrochemical cells. Fourth, a significant number of fluoride ion host materials are available for positive electrodes and negative electrodes that provide electrochemical cells having large specific capacities and cell voltages.

As will be evident to one of skill in the art, the present invention includes, however, a wide range of anionic electrochemical cell configurations having anion charge carriers other than fluoride ions, including but not limited to:

$BF_4^-$, $PF_6^-$, $AsF_6^-$, $SbF_6^-$, $BiF_6^-$, $AlF_4^-$, $GaF_4^-$, $InF_4^-$, $TlF_4^-$, $SiF_5^-$, $GeF_5^-$, $SnF_5^-$, $PbF_5^-$, $SF_7^-$, $IF_6^-$, $ClO_4^-$, $CF_3SO_3^-$, $(CF_3SO_2)_2N^-$ and $C_4F_9SO_3^-$ Other anion charge carriers useful in electrochemical cells of the present invention include those having the formula: $C_nF_{2n+1}BF_3^{-1}$; wherein n is an integer greater than 1. Use of anion charge carriers other than fluoride ion requires incorporation of suitable host materials for positive and negative electrodes capable of accommodation of the anion charge carrier during discharge and charging, and providing a desired cell voltage and specific capacity. In an embodiment, the anion charge carrier is an anion other than $OH^-$ and $HSO_4^-$, or $SO_4^{2-}$.

In an embodiment, an electrolyte of a fluoride ion electrochemical cell of the present invention comprises a solvent and a fluoride salt, wherein the fluoride salt is at least partially present in a dissolved state in the electrolyte so as to generate fluoride ions in the electrolyte. Electrolytes in electrochemical cells of the present invention include fluoride salts having the formula: $MF_n$, wherein M is a metal, and n is an integer greater than 0. In some embodiments, for example, M is an alkali metal, such as Na, K or Rb, or M is an alkaline earth metal, such as Mg, Ca or Sr. In embodiments, M is a metal other than lithium so as to provide enhanced safety and stability relative to conventional state of the art lithium batteries and lithium ion batteries. In some embodiments, the concentration of the fluoride salt in the electrolyte is selected from the range of about 0.1M to about 2.0M.

Electrolytes for anionic electrochemical cells of the present invention, including fluoride ion electrochemical cells, include aqueous electrolytes and nonaqueous electrolytes. Useful electrolyte compositions for anionic electrochemical cells preferably have one or more of the following properties. First, electrolytes for some applications preferably have a high ionic conductivity with respect to the anion charge carrier, for example for fluoride ions. For example, some electrolytes useful in the present invention comprise solvents, solvent mixtures and/or additives providing conductivity for an anion charge carrier, such as a fluoride ion anion charge carrier, greater than or equal to 0.0001 S $cm^{-1}$, greater than or equal to 0.001 S $cm^{-1}$, or greater than or equal to 0.005 S $cm^{-1}$. Second, electrolytes for some embodiments are capable of dissolving an electrolyte salt, such as a fluoride salt, so as to provide a source of anion charge carriers at a useful concentration in the electrolyte. Third, electrolytes of the present invention are preferably stable with respect to decomposition at the electrodes. For example, electrolytes of an embodiment of the present invention comprises solvents, electrolyte salts, additives and anion charge carriers that are stable at high electrode voltages, such as a difference between positive and negative electrode voltages equal to or greater than about 4.5V. Fourth, electrolytes of the present invention preferable for some applications exhibit good safety characteristics, such as flame retardance.

Optionally, electrolytes of the present electrochemical cells include one or more additives. In an embodiment, the electrolyte comprises an anion receptor, such as fluoride ion anion receptors capable of coordinating fluoride ions of a fluoride salt, and/or a cation receptor, for example a cation receptor capable of coordinating metal ions of a fluoride salt. Useful anion receptors in the present invention include, but are not limited to, fluorinated boron-based anion receptors having electron withdrawing ligands, such as fluorinated boranes, fluorinated boronates, fluorinated borates, phenyl boron-based compounds and aza-ether boron-based compounds. Useful cation receptors for electrolytes of electrochemical cells of the present invention include, but are not limited to, crown ethers, lariat ethers, metallacrown ethers, calixcrowns (e.g., calyx(aza)crowns), tetrathiafulvalene crowns, calixarenes, calix[4]arenediquinoes, tetrathiafulvalenes, bis(calixcrown)tetrathiafulvalenes, and derivatives thereof. In some embodiments, electrolytes of the present invention comprise other inorganic, organic or gaseous additives. Additives in electrolytes of the present invention are useful for: (i) enhancing conductivity of the anion charge carrier, (ii) decreasing flammability, (iii) enhancing electrode wetting, (iv) decreasing electronic conductivity, and (v) enhancing the kinetics of anion charge carriers at the electrodes, for example by enhancing formation of a solid electrolyte interface (SEI) or by reducing the buildup of discharge products. In an embodiment, the electrolyte comprises a Lewis acid or a Lewis base such as, but not limited to:

$BF_4^-$, $PF_6^-$, $AsF_6^-$, $SbF_6^-$, $BiF_6^-$, $AlF_4^-$, $GaF_4^-$, $InF_4^-$, $TlF_4^-$, $SiF_5^-$, $GeF_5^-$, $SnF_5^-$, $PbF_5^-$, $SF_7^-$, $IF_6^-$, $ClO_4^-$, $CF_3SO_3^-$, $(CF_3SO_2)_2N^-$, $C_4F_9SO_3^-$ and $NR_4^+$ (R=H or an alkyl group $C_nH_{2n+1}$ n=integer).

Active materials for positive and negative electrodes of fluoride ion electrochemical cells of the present invention include fluoride ion host materials capable of accommodating fluoride ions from the electrolyte during discharge and charging of the electrochemical cell. In this context, accommodation of fluoride ions includes insertion of fluoride ions into the host material, intercalation of fluoride ions into the host material and/or reaction of fluoride ions with the host material. Accommodation includes alloy formation reactions, surface reaction and/or bulk reactions with the host material. Use of fluoride ion host materials that are capable of reversibly exchanging fluoride ions with the electrolyte without significant degradation of the fluoride ion host material upon cycling is preferred for secondary fluoride ion batteries of the present invention.

In an embodiment, a negative electrode of a fluoride ion electrochemical cell of the present invention comprises a fluoride ion host material, such as a fluoride compound, having a low standard reduction potential, preferably less than or equal to about −1V for some applications, and more preferably less than or equal to about −2 V for some applications. Useful fluoride ion host materials for negative electrodes of electrochemical cells of the present invention include, but are not limited to: $LaF_x$, $CaF_x$, $AlF_x$, $EuF_x$, $LiC_6$, $Li_xSi$, $Li_xGe$, $Li_x(CoTiSn)$, $SnF_x$, $InF_x$, $VF_x$, $CdF_x$, $CrF_x$, $FeF_x$, $ZnF_x$, $GaF_x$, $TiF_x$, $NbF_x$, $MnF_x$, $YbF_x$, $ZrF_x$, $SmF_x$, $LaF_x$ and $CeF_x$. Preferred fluoride host materials for negative electrodes of electrochemical cell are element fluorides $MF_x$, where M is an alkali-earth metal (Mg, Ca, Ba), M is a transition metal, M belongs to column 13 group (B, Al, Ga, In, Tl), or M is a rare-earth element (atomic number Z between 57 and 71). The present invention also includes negative electrode fluoride ion host materials comprising a polymer(s) capable of reversibly exchanging fluoride ions comprising the anion ion charge carriers. Examples of such a conjugated polymers are, but not limited to: polyacetylene, polyaniline, polypyrrol, polythiophene and polyparaphenylene. Polymer materials useful for negative electrodes in the present invention are further set forth and described in Manecke, G. and Strock, W., in "Encyclopedia of Polymer Science and Engineering", 2$^{nd}$ Edition, Kroschwitz, J., I., Editor. John Wiley, New York, 1986, vol. 5, pp. 725-755, which is hereby incorporated by reference to the extent not inconsistent with the disclosure herein.

In an embodiment, a positive electrode of a fluoride ion electrochemical cell of the present invention comprises a fluoride ion host material, such as a fluoride compound, having a high standard reduction potential, preferably for some applications greater than or equal to about 1V, and more preferably for some applications greater than or equal to about 2 V. In an embodiment, the fluoride ion host material of the positive electrode is an intercalation host material capable of accommodating fluoride ions so as to generate a fluoride ion intercalation compound. "Intercalation" refers to refers to the process wherein an ion inserts into a host material to generate an intercalation compound via a host/guest solid state redox reaction involving electrochemical charge transfer processes coupled with insertion of mobile guest ions, such as fluoride ions. Major structural features of the host material are preserved after insertion of the guest ions via intercalation. In some host materials, intercalation refers to a process wherein guest ions are taken up with interlayer gaps (e.g., galleries) of a layered host material.

Useful fluoride ion host materials for positive electrodes of electrochemical cells of the present invention include, but are not limited to, CFx, AgFx, CuFx, NiFx, CoFx, PbFx, CeFx, MnFx, AuFx, PtFx, RhFx, VFx, OsFx, RuFx and FeFx. In an embodiment, the fluoride ion host material of the positive electrode is a subfluorinated carbonaceous material having a formula CFx, wherein x is the average atomic ratio of fluorine atoms to carbon atoms and is selected from the range of about 0.3 to about 1.0. Carbonaceous materials useful for positive electrodes of this embodiment are selected from the group consisting of graphite, coke, multiwalled carbon nanotubes, multi-layered carbon nanofibers, multi-layered carbon nanoparticles, carbon nanowhiskers and carbon nanorods. The present invention also includes positive electrode fluoride ion host materials comprising a polymer(s) capable of reversibly exchanging fluoride ions comprising the anion ion charge carriers. Examples of conjugated polymers for positive electrodes include, but not limited to: polyacetylene, polyaniline, polypyrrol, polythiophene and polyparaphenylene.

In an aspect, the present invention provides fluoride ion electrochemical cells exhibiting enhanced device performance relative to state of the art electrochemical cells such as lithium ion batteries. Certain fluoride ion host material-combinations for positive and negative electrodes in fluoride ion electrochemical cells are particularly beneficial for accessing useful device performance. For example, use of a subfluorinated $CF_x$ positive electrode, wherein x is selected over the range of about 0.3 to 1, and a negative electrode comprising $LiC_6$ or $LaF_x$ is useful for accessing average operating cell voltages greater than or equal to about 4 V, and in some embodiments greater than or equal to about 4.5 V. Other useful positive electrode host material/negative electrode host material combinations of the present invention providing good device performance include CuFx/LaFx, AgFx/LaFx, CoFx/LaFx, NiFx/LaFx, MnFx/LaFx, CuFx/AlFx, AgFx/AlFx, NiFx/AlFx, NiFx/ZnFx, AgFx/ZnFx and MnFx/ZnFx (wherein the convention is used corresponding to: [positive electrode host material]/[negative electrode host material] to set for the electrode combination).

In an embodiment, a fluoride ion electrochemical cell of the present invention has an average operating cell voltage equal to or greater than about 3.5 V, and preferably for some applications an average operating cell voltage equal to or greater than about 4.5 V. In an embodiment, a fluoride ion electrochemical cell of the present invention has a specific energy greater than or equal to about 300 Wh kg$^{-1}$, preferably greater than or equal to about 400 Wh kg$^{-1}$. In an embodiment, the present invention provides a fluoride ion secondary electrochemical cell having a cycle life greater than or equal to about 500 cycles.

Useful solvents for electrolytes of the present invention are capable of at least partially dissolving electrolyte salts, such as fluoride salts, and include, but are not limited to one or more solvent selected from the group consisting of propylene carbonate, nitromethane, Toluene (tol); ethylmethyl carbonate (EMC); Propylmethyl carbonate (PMC); Diethyl carbonate (DEC); Dimethyl carbonate (DMC); Methyl butyrate (MB, 20° C.); n-Propyl acetate (PA); Ethyl acetate (EA); Methyl propionate (MP); Methyl acetate (MA); 4-Methyl-1, 3-dioxolane (4MeDOL)($C_4H_8O_2$); 2-Methyltetrahydrofuran (2MeTHF)($C_5H_{10}O$); 1,2 Dimethoxyethane (DME); Methyl formate (MF)($C_2H_4O_2$); Dichloromethane (DCM); γ-Butyrolactone (γ-BL)($C_4H_6O_2$); Propylene carbonate (PC) ($C_4H_6O_3$); Ethylene carbonate (EC, 40° C.)($C_3H_4O_3$). Electrolytes, and components thereof, comprising full or partially fluorinated analogs of solvents, electrolyte salts and anion charge carriers are beneficial for some applications because fluorination of these materials imparts enhanced stability with respect to decomposition at high electrode voltages and provides beneficial safety characteristics, such as flame retardance. In the context of this description, fluorine analogs include: (i) fully fluorinated analogs wherein each hydrogen atom of the solvent, salt or anion charge carrier molecule is replaced by a fluorine atom, and (ii) partially fluorinated analogs wherein at least one hydrogen atom of the solvent, salt or anion charge carrier molecule is replaced by a fluorine atom. Preferred anion charge carrier in the electrolyte include, but not limited to:

$F^-$, $BF_4^-$, $PF_6^-$, $AsF_6^-$, $SbF_6^-$, $BiF_6^-$, $AlF_4^-$, $GaF_4^-$, $InF_4^-$, $TlF_4^-$, $SiF_5^-$, $GeF_5^-$, $SnF_5^-$, $PbF_5^-$, $SF_7^-$, $IF_6^-$, $ClO_4^-$, $CF_3SO_3^-$, $(CF_3SO_2)_2N^-$ and $C_4F_9SO_3^-$.

The following references describe electrolyte compositions useful in embodiments of the present invention, including fully fluorinated and partially fluorinated solvents, salts and anion charge carriers, and are hereby incorporated by reference in their entireties to the extent not inconsistent with the present disclosure: (1) Li[$C_2F_5BF_3$] as an Electrolyte Salt for 4 V Class Lithium-Ion Cells, Zhi-Bin Zhou, Masayuki takeda, Takashi Fujii, Makoto Ue, Journal of Electrochemical Society, 152(2):A351-A356, 2005; (2) Fluorinated Superacidic Systems, George A. Olah, Surya G. K. Prakash, Alain Goeppert, Actualite Chimique, 68-72 Suppl. 301-302, October-November 2006; (3) Electrochemical properties of Li[$C_nF_{2n+1}BF_3$] as Electrolyte Salts for Lithium-ion Cells, Makoto Ue, Takashi Fujii, Zhi-Bin Zhou, Masayuki Takeda, Shinichi Kinoshita, Solid State Ionics, 177:323-331, 2006; (4) Anodic Stability of Several Anions Examined by AB Initio Molecular Orbital and Density Functional Theories, Makoto Ue, Akinori Murakami, Shinichiro Nakamura, Journal of Electrochemical Society, 149(12):A1572-A1577, 2002; (5) Intrinsic Anion Oxidation Potentials, Patrik Johansson, Journal of Physical Chemistry, 110 12077-12080, 2006; (6) Non-aqueous Liquid Electrolytes for Lithium-based Rechargeable Batteries, Kang Xu, Chem. Rev., 104:4303-4417, 2004; (7) The Electrochemical Oxidation of Polyfluorophenyltrifluoroborate Anions in Acetonitrile, Leonid A. Shundrin, Vadim V. Bardin, Hermann-Josef Frohn, Z. Anorg. Allg. Chem. 630: 1253-1257, 2004.

In another aspect, the present invention provides a method for making an electrochemical cell comprising the steps of: (i) providing a positive electrode; (ii) providing a negative electrode; and (iii) providing an electrolyte between the positive electrode and the negative electrode; the electrolyte capable of conducting anion charge carriers; wherein the positive electrode and negative electrode are capable of reversibly exchanging the anion charge carriers with the electrolyte during charging or discharging of the electrochemical cell.

In another aspect, the present invention provides a method for generating an electrical current, the method comprising the steps of: (i) providing an electrochemical cell; the electrochemical comprising: a positive electrode; a negative electrode; and an electrolyte provided between the positive electrode and the negative electrode; the electrolyte capable of conducting anion charge carriers; wherein the positive electrode and negative electrode are capable of reversibly exchanging the anion charge carriers with the electrolyte during charging or discharging of the electrochemical cell; and (ii) discharging the electrochemical cell. The method of this aspect of the present invention may further comprise the step of charging the electrochemical cell. In some embodiments of this aspect of the present invention the anion charge carrier is fluoride ion ($F^-$).

In another aspect, the present invention provides a fluoride ion secondary electrochemical cell comprising: (i) a positive electrode comprising a first fluoride ion host material; said positive electrode having a first standard electrode potential; (ii) a negative electrode comprising a second fluoride ion host material, said negative electrode having a second standard electrode potential, wherein the difference between said first standard electrode potential and said second standard electrode potential is greater than or equal to about 3.5 V; and (iii) an electrolyte provided between said positive electrode and said negative electrode; said electrolyte capable of capable of conducting fluoride ion charge carriers, said electrolyte comprising a fluoride salt and a solvent; wherein at least a portion of said fluoride salt is present in a dissolved state, thereby generating said fluoride ion charge carriers in said electrolyte; wherein said positive electrode and negative electrode are capable of reversibly exchanging said fluoride ion charge carriers with said electrolyte during charging or discharging of said electrochemical cell. In some embodiments of this aspect of the present invention the anion charge carrier is fluoride ion ($F^-$).

BRIEF DESCRIPTION OF THE DRAWINGS

FIG. 1A provides a schematic diagram illustrating a lithium ion battery during charging and FIG. 1B provides a schematic diagram illustrating a lithium ion battery during discharge.

FIG. 3.

FIG. 4 provides crystal structure of carbon fluoride.

FIG. 5 provides -ray diffraction patterns ($CuK_\alpha$ □radiation) from various positive electrode materials evaluated. Diffraction patterns for carbon nanofiber, KS15 and commercial $CF_1$ are shown in FIG. 5.

FIG. 6 provides discharge profiles for $CF_1$ positive electrodes at room temperature for a variety of discharge rates ranging from C/20 to C.

FIG. 7 provides discharge profiles for $CF_{0.530}$, KS15 positive electrodes at room temperature for a variety of discharge rates ranging from C/20 to C.

FIG. 8 provides discharge profiles for $CF_{0.647}$, KS15 positive electrodes at room temperature for a variety of discharge rates ranging from C/20 to 6 C.

FIG. 9 provides discharge profiles for $CF_{0.21}$, carbon nanofiber positive electrodes at room temperature for a variety of discharge rates ranging from C/20 to 6 C.

FIG. 10 provides discharge profiles for $CF_{0.59}$, carbon nanofiber positive electrodes at room temperature for a variety of discharge rates ranging from C/20 to 6 C.

FIG. 11 provides discharge profiles for $CF_{0.76}$, carbon nanofiber positive electrodes at room temperature for a variety of discharge rates ranging from C/20 to 6 C.

FIG. 12 provides discharge profiles for $CF_{0.82}$, carbon nanofiber positive electrodes at room temperature for a variety of discharge rates ranging from C/20 to 4 C.

FIG. 13 provides charge-discharge profiles for $CF_{0.82}$, multiwalled nanotubes positive electrodes for a voltage range 1.5V to 4.6V. Voltage is plotted on the Y axis (left side), Current is plotted on the Y axis (right side) and time is plotted on the X axis.

FIG. 14 provides charge-discharge profiles for $CF_{0.82}$, multiwalled nanotubes positive electrodes for a voltage range 1.5V to 4.8V. Voltage is plotted on the Y axis (left side), Current is plotted on the Y axis (right side) and time is plotted on the X axis.

FIG. 15 provides charge-discharge profiles for $CF_1$ positive electrodes for a voltage range 1.5V to 4.8V. Voltage is plotted on the Y axis (left side), Current is plotted on the Y axis (right side) and time is plotted on the X axis.

FIG. 16 provides plots of voltage (V) vs. time (hours) for a Li/$CF_x$ half cell configuration for 4.6V and 4.8V. An increase in discharge capacity of 0.25% is observed at 4.8V.

FIG. 17 provides plots of voltage (V) vs relative capacity (%) for a Li/$CF_x$ half cell configuration with a $CF_{0.647}$ KS15 positive electrode for voltages ranging from 4.8V and 5.4V. As shown in FIG. 17, the $CF_{0.647}$ KS15 positive electrode capacity increased with higher charge cutoff voltage over the range of 4.8V to 5.4V.

FIG. 18 provides cycle capacity curves of discharge capacity (mAh/g-C) verse cycle number for various positive electrode materials evaluated. This data demonstrates that 120 mAh/g-C rechargeable capacity has been achieved in a Li/$CF_x$ half cell configuration charged to 4.8 V at a 2 C-rate.

FIG. 19 provides plots of discharge cycle vs. cycle number for $CF_{0.82}$, multiwalled nanotubes positive electrodes for voltages equal to 14.6V to 4.8V FIG. 20.

FIG. 21A provides a plot of discharge voltage vs time indicating two time points (1) and (2) for which x-ray diffraction patterns were taken. Thin graphite electrodes were used (50 microns thick 3-4 mg). FIG. 21B shows x-ray diffraction patterns acquired at two time points (1) and (2) shown in FIG. 21A.

DETAILED DESCRIPTION OF THE INVENTION

Figure 1:
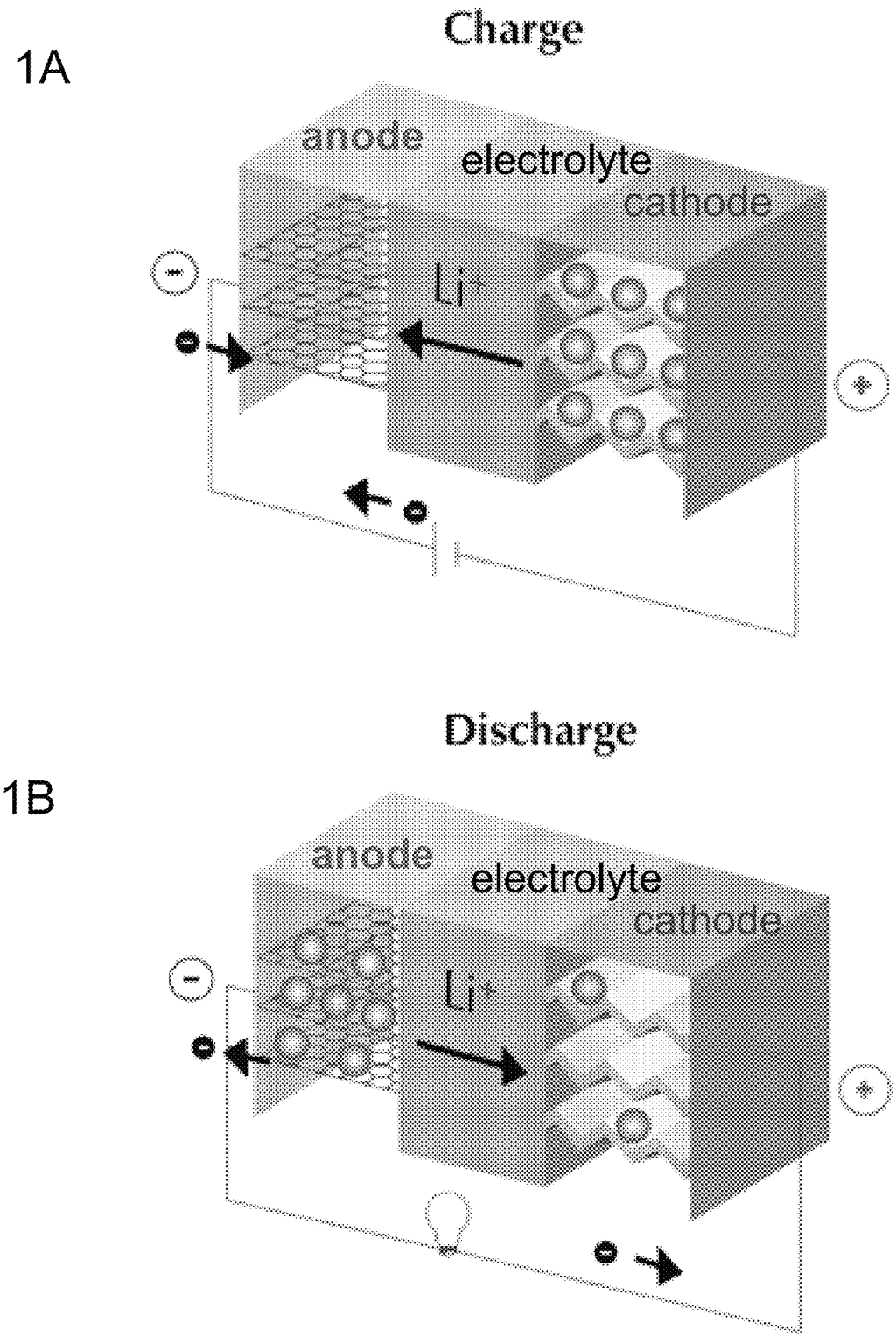
FIG. 1.

Referring to the drawings, like numerals indicate like elements and the same number appearing in more than one drawing refers to the same element. In addition, hereinafter, the following definitions apply:

"Standard electrode potential" (E°) refers to the electrode potential when concentrations of solutes are 1M, the gas pressures are 1 atm and the temperature is 25 degrees Celsius. As used herein standard electrode potentials are measured relative to a standard hydrogen electrode.

"Anion charge carrier" refers to a negatively charge ion provided in an electrolyte of an electrochemical cell that migrates between positive and negative electrodes during discharge and charging of the electrochemical cell. Anion charge carriers useful in electrochemical cells of the present invention include, but are not limited to, fluoride ions (F), and the following other anions:
$BF_4^-$, $PF_6^-$, $AsF_6^-$, $SbF_6^-$, $BiF_6^-$, $AlF_4^-$, $GaF_4^-$, $InF_4^-$, $TlF_4^-$, $SiF_5^-$, $GeF_5^-$, $SnF_5^-$, $PbF_5^-$, $SF_7^-$, $IF_6^-$, $ClO_4^-$, $CF_3SO_3^-$, $(CF_3SO_2)_2N^-$ and $C_4F_9SO_3^-$ "Fluoride ion host material" refers to a material capable of accommodating fluoride ions. In this context, accommodating includes insertion of fluoride ions into the host material, intercalation of fluoride ions into the host material and/or reaction of fluoride ions with the host material. Fluoride ion host materials useful for positive or negative electrodes in electrochemical cells of the present invention include, but are not limited to, $LaF_x$, $CaF_x$, $AlF_x$, $EuF_x$, $LiC_6$, $Li_xSi$, $Li_xGe$, $Li_x(CoTiSn)$, $SnF_x$, $InF_x$, $VF_x$, $CdF_x$, $CrF_x$, $FeF_x$, $ZnF_x$, $GaF_x$, $TiF_x$, $NbF_x$, $MnF_x$, $YbF_x$, $ZrF_x$, $SmF_x$, $LaF_x$ and $CeF_x$, CFx, AgFx, CuFx, NiFx, CoFx, PbFx, CeFx, MnFx, AuFx, PtFx, RhFx, VFx, OsFx, RuFx and FeFx. Preferred fluoride host materials for negative electrodes of electrochemical cell are element fluorides $MF_x$, where M is an alkali-earth metal (Mg, Ca, Ba), M is a transition metal, M belongs to column 13 group (B, Al, Ga, In, Tl) or M is a rare-earth element (atomic number Z between 57 and 71).

"Intercalation" refers to refers to the process wherein an ion inserts into a host material to generate an intercalation compound via a host/guest solid state redox reaction involving electrochemical charge transfer processes coupled with insertion of mobile guest ions, such as fluoride ions. Major structural features of the host material are preserved after insertion of the guest ions via intercalation. In some host materials, intercalation refers to a process wherein guest ions are taken up with interlayer gaps (e.g., galleries) of a layered host material. Examples of intercalation compounds include fluoride ion intercalation compounds wherein fluoride ions are inserted into a host material, such as a layered fluoride host material or carbon host material. Host materials useful for forming intercalation compounds for electrodes of the present invention include, but are not limited to, $CF_x$, FeFx, MnFx, NiFx, CoFx, LiC6, LixSi, and LixGe.

The term "electrochemical cell" refers to devices and/or device components that convert chemical energy into electrical energy or electrical energy into chemical energy. Electrochemical cells have two or more electrodes (e.g., positive and negative electrodes) and an electrolyte, wherein electrode reactions occurring at the electrode surfaces result in charge transfer processes. Electrochemical cells include, but are not limited to, primary batteries, secondary batteries and electrolysis systems. General cell and/or battery construction is known in the art, see e.g., U.S. Pat. Nos. 6,489,055, 4,052, 539, 6,306,540, Seel and Dahn J. Electrochem. Soc. 147(3) 892-898 (2000).

The term "capacity" is a characteristic of an electrochemical cell that refers to the total amount of electrical charge an electrochemical cell, such as a battery, is able to hold. Capacity is typically expressed in units of ampere-hours. The term "specific capacity" refers to the capacity output of an electrochemical cell, such as a battery, per unit weight. Specific capacity is typically expressed in units of ampere-hours $kg^{-1}$.

The term "discharge rate" refers to the current at which an electrochemical cell is discharged. Discharge current can be expressed in units of ampere-hours. Alternatively, discharge current can be normalized to the rated capacity of the electrochemical cell, and expressed as C/(X t), wherein C is the capacity of the electrochemical cell, X is a variable and t is a specified unit of time, as used herein, equal to 1 hour.

"Current density" refers to the current flowing per unit electrode area. In some embodiments, the positive electrode, negative electrode or both are nanostructured materials. The term "nanostructured" refers materials and/or structures have a plurality of discrete structural domains with at least one physical dimension (e.g., height, width, length, cross sectional dimension) that is less than about 1 micron. In this context, structural domains refer to features, components or portions of a material or structure having a characteristic composition, morphology and/or phase. Nanostructured materials useful as positive electrode active materials include nanostructured composite particles having a plurality of fluorinated carbon domains and unfluorinated carbon domains. In some embodiments, nanostructured materials of the present invention comprise a plurality of structural domains having different compositions, morphologies and/or phase intermixed on a very fine scale (e.g., at least smaller than 10's of nanometers). Nanostructured materials useful as negative electrode active materials include nanostructured composite particles having a plurality of fluorinated metal domains and unfluorinated metal domains. Preferred nanostrctured fluorinated metal host materials for negative electrodes of electrochemical includes but not limited to alkali-earth metals (Mg, Ca, Ba), transition metals, column 13 group elements (B, Al, Ga, In, TI) and rare-earth metals (atomic number Z between 57 and 71). In some embodiments, nanostructured materials for negative electrodes of the present invention comprise a plurality of structural domains having different compositions, morphologies and/or phase intermixed on a very fine scale (e.g., at least smaller than 10's of nanometers).

"Active material" refers to the material in an electrode that takes part in electrochemical reactions which store and/or delivery energy in an electrochemical cell.

As used herein, the expression "subfluorinated carbonaceous material" refers to a multiphase carbonaceous material having an unfluorinated carbonaceous component. As used herein an "unfluorinated carbonaceous component" includes unfluorinated carbon compositions and/or phases, such as graphite, coke, multiwalled carbon nanotubes, carbon nanofibers, carbon nanowhiskers, multi-layered carbon nanoparticles, carbon nanowhiskers, and carbon nanorods, and also includes slightly fluorinated carbon compositions and/or phases. Slightly fluorinated, in this context, refers to carbon that is weakly bound to fluorine, as opposed to compositions wherein carbon is covalently bonded to fluorine, as in $CF_1$ and $C_2F$ phases. Multiphase subfluorinated carbonaceous materials may comprises a mixture of carbonaceous phases including, one or more unfluorinated carbonaceous phases, and one or more fluorinated phase (e.g., poly(carbon monofluoride ($CF_1$); poly(dicarbon monofluoride) etc.). Subfluorinated carbonaceous materials include nanostructured materials having fluorinated and unfluorinated domains. Subfluorinated carbonaceous materials include carbonaceous materials exposed to a fluorine source under conditions resulting in incomplete or partial fluorination of a carbonaceous starting material. Subfluorinated carbonaceous materials useful in the present invention and related methods of making subfluorinated carbonaceous materials are described in U.S. patent application Ser. Nos. 11/253,360, 11/422,564 and 11/560,570 filed Oct. 18, 2005, Jun. 6, 2006, and Nov. 16, 2006, respectively, which are hereby incorporated by reference in their entirety to the extent not inconsistent with the present description. A range of carbonaceous materials are useful for subfluorinated active materials in positive electrodes of the present invention including graphite, coke, and carbonaceous nanomaterials, such as multiwalled carbon nanotubes, carbon nanofibers, multi-layered carbon nanoparticles, carbon nanowhiskers and carbon nanorods.

As used herein, a carbon nanomaterial has at least one dimension that is between one nanometer and one micron. In an embodiment, at least one dimension of the nanomaterial is between 2 nm and 1000 nm. For carbon nanotubes, nanofibers, nanowhiskers or nanorods the diameter of the tube, fiber, nanowhiskers or nanorod falls within this size range. For carbon nanoparticles, the diameter of the nanoparticle falls within this size range. Carbon nanomaterials suitable for use with the invention include materials which have total impurity levels less than 10% and carbon materials doped with elements such as boron, nitrogen, silicon, tin and phosphorous.

As used herein, the term "nanotube" refers to a tube-shaped discrete fibril typically characterized by a diameter of typically about 1 nm to about 20 nm. In addition, the nanotube typically exhibits a length greater than about 10 times the diameter, preferably greater than about 100 times the diameter. The term "multi-wall" as used to describe nanotubes refers to nanotubes having a layered structure, so that the nanotube comprises an outer region of multiple continuous layers of ordered atoms and a distinct inner core region or lumen. The layers are disposed substantially concentrically about the longitudinal axis of the fibril. For carbon nanotubes, the layers are graphene layers. Carbon nanotubes have been synthesized in different forms as Single-, Double- and Multi-Walled Carbon Nanotubes noted SWCNT, DWCNT and MWCNT respectively. The diameter size ranges between about 2 nm in SWCNTs and DWCNTs to about 20 nm in MWCNTs. In an embodiment, the MWNT used in the invention have a diameter greater than 5 nm, greater than 10 nm, between 10 and 20 nm, or about 20 nm.

Electrode refers to an electrical conductor where ions and electrons are exchanged with electrolyte and an outer circuit. "Positive electrode" and "cathode" are used synonymously in the present description and refer to the electrode having the higher electrode potential in an electrochemical cell (i.e. higher than the negative electrode). "Negative electrode" and "anode" are used synonymously in the present description and refer to the electrode having the lower electrode potential in an electrochemical cell (i.e. lower than the positive electrode). Cathodic reduction refers to a gain of electron(s) of a chemical species, and anodic oxidation refers to the loss of electron(s) of a chemical species. Positive electrodes and negative electrodes of the present electrochemical cell may further comprises a conductive diluent, such as acetylene black, carbon black, powdered graphite, coke, Carbon fiber, and metallic powder, and/or may further comprises a binder, such polymer binder. Useful binders for positive electrodes in some embodiments comprise a fluoropolymer such as polyvinylidene fluoride (PVDF). Positive and negative electrodes of the present invention may be provided in a range of useful configurations and form factors as known in the art of electrochemistry and battery science, including thin electrode designs, such as thin film electrode configurations. Electrodes are manufactured as disclosed herein and as known in the art, including as disclosed in, for example, U.S. Pat. Nos. 4,052, 539, 6,306,540, 6,852,446. For some embodiments, the electrode is typically fabricated by depositing a slurry of the electrode material, an electrically conductive inert material, the binder, and a liquid carrier on the electrode current collector, and then evaporating the carrier to leave a coherent mass in electrical contact with the current collector.

"Electrode potential" refers to a voltage, usually measured against a reference electrode, due to the presence within or in contact with the electrode of chemical species at different oxidation (valence) states.

"Electrolyte" refers to an ionic conductor which can be in the solid state, the liquid state (most common) or more rarely a gas (e.g., plasma).

"Cation" refers to a positively charged ion, and "anion" refers to a negatively charged ion.

The present invention provides primary and secondary anionic electrochemical cells utilizing fluoride ion charge carriers and active electrode materials comprising fluoride ion host materials that provides an alternative to conventional state of the art lithium batteries and lithium ion batteries. Advantages of the present electrochemical cells over lithium based systems include accessing higher specific capacities, larger average operating voltages and improving safety.

Anionic electrochemical cells of the present invention, including fluoride ion electrochemical cells, operate on the principle of simultaneous oxidation and reduction reactions that involve accommodation and release of anion charge carriers by positive and negative electrodes comprising different anion charge carrier host materials. In these systems, anion charge carriers shuttle back and forth between positive and negative electrodes during discharge and charging of the anionic electrochemical cell.

The following electrode half reactions, cells reactions and electrolyte reactions are provided to set forth and describe the fundamental principles by which anionic electrochemical cells of the present invention operate.

1. Electrode Reactions $A^-$ is the anion charge carrier, $PA_n$ is the positive electrode anion host material and $NA_m$ is the negative electrode anion host material.

In a primary battery, only discharge reactions occur:
At the positive electrode, $A^-$ is released:

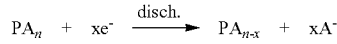

At the negative electrode, $A^-$ is occluded

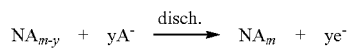

Accordingly, the cell overall reaction is:

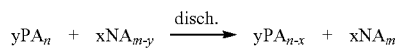

In a rechargeable battery, equations (1) and (2) are reversed during charge, therefore the overall cell reaction is:

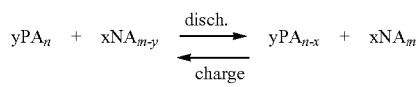

2. Electrolyte Formation Reactions:

The present invention includes several sources of dissolved $A^-$ anion in an electrolyte provide between positive and negative electrodes:

(i) A soluble compound such as a salt $C_qA_p$: where C is a monovalent, divalent, a trivalent, multivalent cation ($C^{n+}$, $1 \leq n \leq 6$). For example, if C is monovalent cation the salt dissolution equilibrium is written as:

Here the use of a cation receptor R and/or an anion receptor R' may enhance the solubility:

     (6)

     (7)

(ii) A soluble anion $XA_p^-$ that releases $A^-$:

     (8)

Optionally a cation receptor R and/or an anion receptor R' may be provide in the electrolyte to enhance the solubility of $A^-$.

As an example of these concepts, provided below are the half reactions, cell reaction and electrolyte reactions for discharge of a fluoride ion electrochemical cell of the present invention comprising a $LiC_6$ negative electrode, a CFx positive electrode and a $F^-$ conductive electrolyte.

Discharge Reactions:

negative electrode: $LiC_6 + F^- \rightarrow 6C + LiF + e^-$ (negative electrode accommodates F during discharge)

positive electrode: $CFx + xe^- \rightarrow C + xF^-$ (positive electrode releases F during discharge)

cell reaction: $xLiC_6 + CFx \rightarrow (1+6x)C + xLiF$ ($F^-$ is transferred between positive electrode and negative electrode during discharge)

Electrolyte: Optionally, two types of reactions can enhance the $F^-$ dissolution:

$LiF + yLA \rightarrow Li^+ + (LA)_yF^-$, or $LiF + zLB \rightarrow Li(LB)_z^+ + F^-$ (LA=Lewis acid such as $PF_5$, $BF_3$ or an anion receptor, LB=Lewis base such as $PF_6^-$, $BF_4^-$ or a cation receptor: i.e. crown ether).

To further describe and set forth the anionic electrochemical cells of the present invention, the discussion below draws a comparison of the present systems with conventional lithium ion battery technology. A typical lithium ion battery (LIB) comprises three fundamental elements: (1) a carbon-based negative electrode (anode), (2) lithium cation (Li+) conducting electrolyte, and (3) a transition metal oxide positive electrode (cathode) (e.g., $LiCoO_2$). Lithium cation (Li+) is the charge carrier in these systems, and these electrochemical cells function via simultaneous insertion and de-insertion reactions occurring at positive and negative electrodes in concert with electron transport between electrodes. During charge and discharge of a lithium ion battery, Li+ ions are shuttled between the negative and positive electrode. The reversible dual intercalation mechanism of these batteries gives rise to the term "rocking chair" or "shuttle-cock" batteries.

FIG. 1A provides a schematic diagram illustrating a lithium ion battery during charging. During charging lithium ions are released from the positive electrode (i.e., designated as cathode in FIG. 1A), migrate through the electrolyte and are accommodated by the negative electrode (i.e., designated as anode in FIG. 1A). As shown in FIG. 1A, the direction of the flow of electrons during charging is from the positive electrode to the negative electrode. FIG. 1B provides a schematic diagram illustrating a lithium ion battery during discharge. During discharge, lithium ions are released from the negative electrode (i.e., designated as anode in FIG. 1B), migrate through the electrolyte and are accommodated by the positive electrode (i.e., designated as cathode in FIG. 1B). As shown in FIG. 1B, the direction of the flow of electrons during charging is from the negative electrode to the positive electrode.

Figure 2:
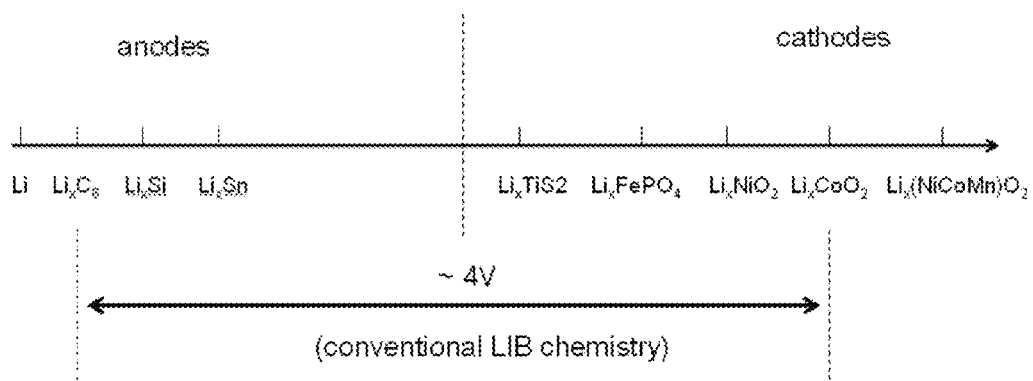
FIG. 2. A schematic diagram showing the average working potential of different negative electrode and positive electrode materials and cell voltage for a conventional lithium ion battery.

FIG. 2 provides schematic diagram showing the average working potential of different negative electrode and positive electrode materials and cell voltage for a conventional lithium ion battery. The average operating voltage of the electrochemical cell arises, in part, from the difference between the chemical potential of $Li^+$ ion in the negative and positive electrodes. In the example shown in FIG. 2, the difference in the electrode potentials of $Li_xC_6$ and $Li_xCoO_2$ is approximately 4V. The LIB cell extended reaction for this example is:

$$2LiCoO_2 + 6C \Leftrightarrow 2Li_{0.5}CoO_2 + LiC_6$$

The theoretical energy density of this example LIB system can be calculated as follows:

$$E(LIB) = \frac{F(OCV)}{3.6[(2M(LiCoO_2) + 6M(C)]} = \frac{96500 \times 4.2}{3.6 \times (196 + 72)} = 420 \text{ Wh/kg}$$

In electrochemical cells of the present invention the charge carrier is a negatively charged anion. In fluoride ion electrochemical cells, for example, the anion charge carrier is fluoride ion ($F^{-1}$). Similar to lithium ion batteries, fluoride ion electrochemical cells of the present invention operate on the principle of simultaneous fluoride ion insertion and de-insertion reactions occurring at positive and negative electrodes in concert with electron transport between electrodes. During charge and discharge of a fluoride ion electrochemical cell, F ions are shuttled between the negative and positive electrodes.

Figure 3A:
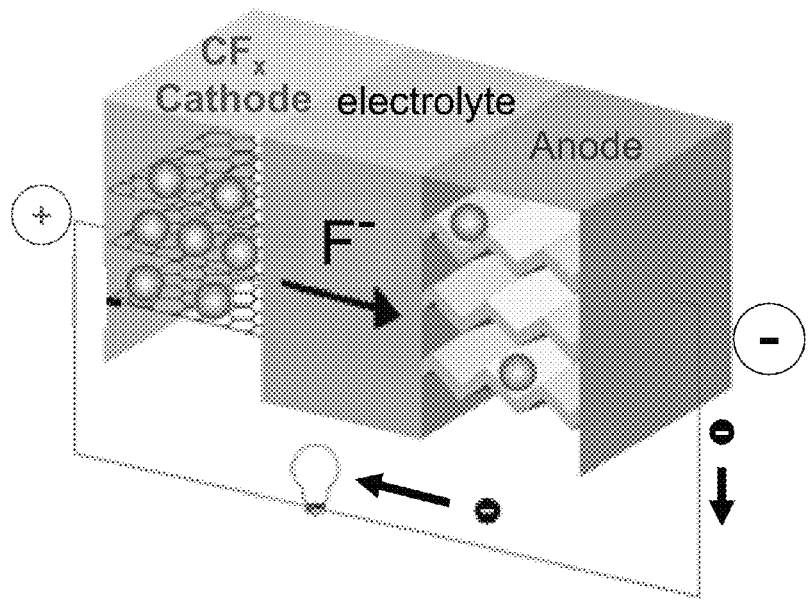
FIG. 3A provides a schematic diagram illustrating a fluoride ion battery (FIB) of the present invention during discharge.

FIG. 3A provides a schematic diagram illustrating a fluoride ion electrochemical cell during discharge. During discharge fluoride anions are released from the positive electrode (i.e., designated as cathode in FIG. 3A), migrate through the electrolyte and are accommodated by the negative electrode (i.e., designated as anode in FIG. 3A). As shown in FIG. 3A, the direction of the flow of electrons during discharge is from the negative electrode to the positive electrode. During charging of a fluoride ion electrochemical cell, fluoride anions are released from the negative electrode migrate through the electrolyte and are accommodated by the positive electrode. The direction of the flow of electrons during charging is from the positive electrode to the negative electrode. Release and accommodation of fluoride ions during discharge and charging results from oxidation and reduction reactions occurring at the electrodes.

Similar to the description above relating to lithium ion batteries, the open-circuit voltage in a fluoride ion electrochemical cell results, at least in part, from differences in the chemical potential of the fluoride ions in the negative electrode and the positive electrode. The positive electrode and negative electrode are respectively a high voltage and a low voltage fluorides, able to reversible exchange F_ with electrolyte, for example:

Positive electrode: $CF_x$, $AgF_{2-x}$, $CuF_{3-x}$, $NiF_{3-x}$

Negative electrode: $LaF_{3-x}$, $CaF_{2-x}$, $AlF_{3-x}$, $EuF_{3-x}$

Figure 3B:
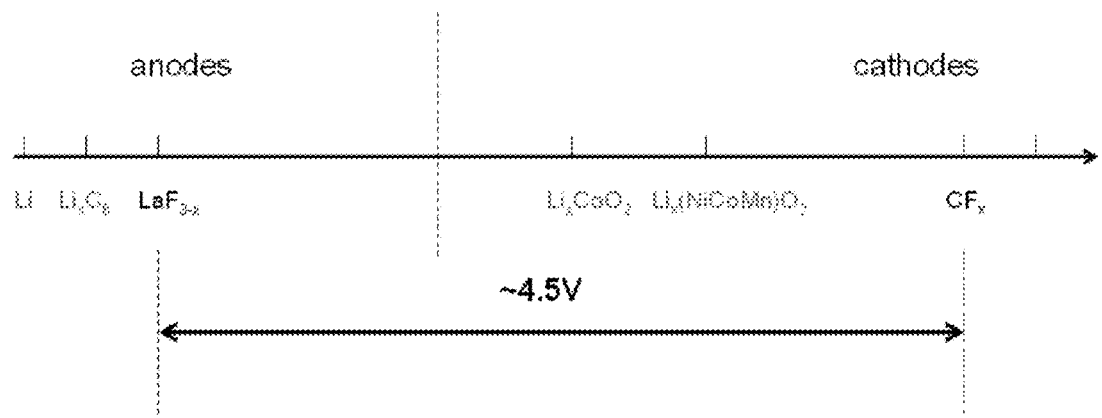
FIG. 3B provides a schematic diagram showing the average working potential for an example embodiment corresponding to a $LaF_{3-x}$ negative electrode, a $CF_x$ positive electrode, and an electrolyte comprising MF provided in an organic electrolyte, wherein M is a metal such as K or Rb.

FIG. 3B provides a schematic diagram showing the average working potential for an example embodiment corresponding to a $LaF_{3-x}$ negative electrode, a $CF_x$ positive electrode, and an electrolyte comprising MF provided in an organic electrolyte, wherein M is a metal such as K or Rb. The relevant parameters, half reactions and cell reaction are summarized below for this example:

Negative electrode: $LaF_3$.

Positive electrode: $CF_y$.

Electrolyte: MF in organic electrolyte (M=K, Rb, . . . )

Electrode Reactions

Negative electrode: $LaF_3 + 3xe^- \leftrightarrow LaF_{3(1-x)} + 3xF^-$ ($x \leq 1$) (9)

Positive electrode: $3CF_y + 3xF^- \leftrightarrow 3CF_{x+y} + 3xe^-$ ($y \leq 1-x$) (10)

Cell Reaction $$LaF_3 + 3CF_y \leftrightarrow LaF_{3(1-x)} + 3CF_{x+y} \quad (11)$$

As shown in FIG. 3B, the difference in the electrode potentials for this example is about 4.5 V. The theoretical cell voltage takes into account the $La^{3+}/La$ and the $CF_x/F^-$ redox couples and the open circuit voltage OCV at the end of charge is expected to be approximately 4.5V, which is larger than that of a conventional lithium ion battery (see calculation above). The theoretical energy density for this example fluoride ion battery (FIB) system can be calculated as follows:

The FIB Energy Density:
With cell reaction (3) and x=1, y=0; ($LaF_3 + 3CF_y \leftrightarrow LaF_{3(1-x)} + 3CF_{x+y}$),
The theoretical energy density is:

$$E(FIB) = \frac{2F(OCV)}{3.6[M(LaF_3) + 3M(C)]} = \frac{3 \times 96500 \times 4.5}{3.6 \times (196 + 36)} = 1560 \text{ Wh/kg}$$

This calculation give rise of a ratio of the theoretical energy density for the example fluoride ion electrochemical cell and the example lithium ion battery described above equal to 3.7:

$$\frac{E(FIB)}{E(LIB)} = \frac{1560}{420} = 3.7x$$

Table 1 provides a comparison of the performance attributes and compositions of lithium ion batteries and the fluoride ion electrochemical cells described above. Benefits of the present fluoride ion batteries (FIBs) include: (i) enhanced safety of the fluoride ion electrochemical cell, (ii) higher operating voltage of the fluoride ion electrochemical cell; (iii) larger energy density in the fluoride ion electrochemical cell; and (iv) lower costs of the fluoride ion electrochemical cell.

TABLE 1

Comparison of the performance attributes and compositions of lithium ion batteries and the fluoride ion electrochemical cells

| | LIB | FIB | Comments |
| --- | --- | --- | --- |
| Positive electrode | LiCoO2, Li(NiCoMn)O₂, LiFePO₄ | $CF_x$, $AgF_x$, $CuF_x$, $NiF_x$ | Solid fluorides are more stable than oxides |

TABLE 1-continued

Comparison of the performance attributes and compositions of
lithium ion batteries and the fluoride ion electrochemical cells

| | LIB | FIB | Comments |
|---|---|---|---|
| Negative electrode | $LiC_6$, $Li_xSi$, $Li_xSn$, $Li_x(CoSnTi)$ | $LaF_x$, $EuF_x$, $LiC_6$ | High capacity negative electrodes in FIBs |
| Electrolyte | $LiPF_6$ in EC-DME-DMC | MF in PC or nitromethane (M = Li, K, Rb) | Cheap and more stable electrolyte in FIB |
| Voltage (V) | 3-5 V | 3.5-5.5 V | Higher operating voltage. High stability at high voltages |
| Energy | 340 Wh/kh (Theor.) | 1560 (Theor.) of the $LaF_3/CF_x$ couple | 3.7x energy density in FIBs |
| Safety | Lithium is unstable | Fluorides are very stable. No soluble metal used | Increased safety due to more robust chemistry |
| Cost | High when Co is used | Except for Ag, most positive electrodes and negative electrodes are cheap | FIB should be 4-5x cheaper in $/Wh |

Fluoride Ion batteries (FIBs) are pure anion-type batteries where the anode and the cathode reactions involve fluoride anion F− accommodation and release. FIBs can be primary batteries and rechargeable batteries depending on the reversibility of the electrode reactions. However, both primary and rechargeable FIBs require a F− anion conductive electrolyte. Fluoride ion batteries can be further categorized into two classes.

In the first class, both positive and negative electrodes contain fluoride anions. A fluoride ion electrochemical cell having a $LaF_3$ anode and a $CF_x$ cathode is an example of this first class. The electrode half reactions and cell reactions for the ($LaF_3/CF_x$) system are:

$LaF_3$ anode:

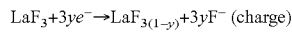
$$LaF_3 + 3ye^- \rightarrow LaF_{3(1-y)} + 3yF^- \text{ (charge)}$$

$CF_x$ cathode:

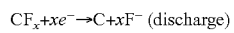
$$CF_x + xe^- \rightarrow C + xF^- \text{ (discharge)}$$

Cell reaction:

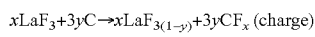
$$xLaF_3 + 3yC \rightarrow xLaF_{3(1-y)} + 3yCF_x \text{ (charge)}$$

$$xLaF_{3(1-y)} + 3yCF_x \rightarrow xLaF_3 + 3yC$$

Other examples of this first class of the fluoride ion electrochemical cell include, but are not limited to, (anode/cathode) couples: ($LaF_3/AgF_x$), ($LaF_3/NiF_x$), ($EuF_3/CF_x$), ($EuF_3/CuF_x$)

In the second class, only one electrode contains fluoride anions. A fluoride ion electrochemical cell having a $LiC_6$ anode and a $CF_x$ cathode is an example of this second class. The electrode half reactions and cell reactions for the ($LiC_6/CF_x$) system are:

$LiC_6$ anode:

$$LiC_6 + F^- \rightarrow 6C + LiF + e^- \text{ (discharge)}$$

$CF_x$ cathode:

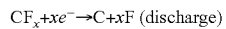
$$CF_x + xe^- \rightarrow C + xF \text{ (discharge)}$$

Cell reaction:

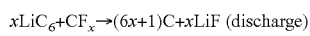
$$xLiC_6 + CF_x \rightarrow (6x+1)C + xLiF \text{ (discharge)}$$

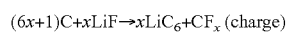
$$(6x+1)C + xLiF \rightarrow xLiC_6 + CF_x \text{ (charge)}$$

Other examples of this first class of the fluoride ion electrochemical cell include, but are not limited to, (anode/cathode) couples: ($LiC_6/AgF_x$), ($LiC_6/NiF_x$), ($Li_xSi/CF_x$), and ($Li)_nSi/CuF_x$).

Aspects of the present invention are further set forth and described in the following Examples.

Example 1

Fluoride Ion Secondary Electrochemical Cell with Li/CFx Half Cell Configurations 1.a. Introduction.

To demonstrate the benefits of the present fluoride ion electrochemical cells, cells comprising a $CF_x$ positive electrode and metallic lithium negative electrode were constructed and evaluated with respect to electrochemical performance. The results shown here demonstrate that fluoride ion electrochemical cells exhibit useful rechargeable capacities under reasonable charge-discharge rates at room temperatures.

1.b. Experimental.

Two types of carbon fluorides $CF_x$ were synthesized and used as positive electrodes in lithium cells in this example; 1) stoichiometric (commercial) $CF_1$ based on coke and, 2) subfluorinated $CF_x$ (x<1) based on graphite and multi-walled carbon nanotubes (MWNTs). Carbon fluoride is obtained from high temperature fluorination of coke graphite or MWNT carbon powders, following reaction:

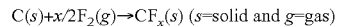
$$C(s) + x/2 F_2(g) \rightarrow CF_x(s) \text{ (s=solid and g=gas)}$$

Several kinds of fully fluorinated and subfluorinated carbon, referred to as $CF_x$, were investigated in the present example for use as the active material for the positive electrode:

(1) Commercial CFx (wherein x=1.0); This subfluorinated carbonanceous material was obtained from Lodestar, NY, USA, and corresponds to their PC10 product which is a fully fluorinated coke material. This subfluorinated carbonanceous material is synonymously referred to as "commercial", "commercial CFx", and "CFx (x=1)" in the Figures and throughout this example;

(2) Subfluorinated carbon synthesized by fluorination of synthetic graphite (CFx wherein x=0.530, 0.647). This subfluorinated material was synthesized via partial fluorination of synthetic graphite produced by Timcal, Switzerland. These subfluorinated graphite materials are referred to as "KS15" in the figures and throughout this example. The compositions of these materials are further characterized by reference to the atomic ratio of fluorine to carbon (i.e., the variable x in the formula CFx); and (3) Subfluorinated carbons synthesized by fluorination of multiwalled carbon nanotubes (MWNTs), (CFx wherein x=0.21, 0.59, 0.76, 0.82). This subfluorinated material was synthesized via partial fluorination of MWNTS obtained from MER, Tucson, Ariz., USA. This subfluorinated material is synonymously referred to as "carbon nanofiber", "MWNT" and "multiwalled carbon nanotubes" in the figures and throughout this example. The compositions of these subfluorinated carbonaceous materials are further characterized by reference to the atomic ratio of fluorine to carbon (i.e., the variable x in the formula CFx)

The positive electrode consisted of a selected $CF_x$ material with the addition of Acetylene Black Graphite (ABG) and PVDF as a binder, with respective percentages of 75 wt %, 10 wt % and 15 wt %. These three materials were mixed together in Acetone solution with dibutyl phthalate DBP (20 wt %).

The solution was then evaporated and finally, a thin film of $CF_x$ positive electrode was obtained (100-120 μm thick). The film was cut to diameter (15.2 mm) and washed in Methanol and dried at 80° C. overnight in vacuum. The electrode weight is 10~20 mg. Structure of coin type $Li/CF_x$ test batteries; $Li/PC-DME-LiBF_4/CF_x$, 2016 coin cells. (Separator; Sanyo Celgard, diameter (19 mm), thickness (25 μm), strong, low electrical resistivity and high porosity (55%).)

1.c. Experimental Results

Figure 4:
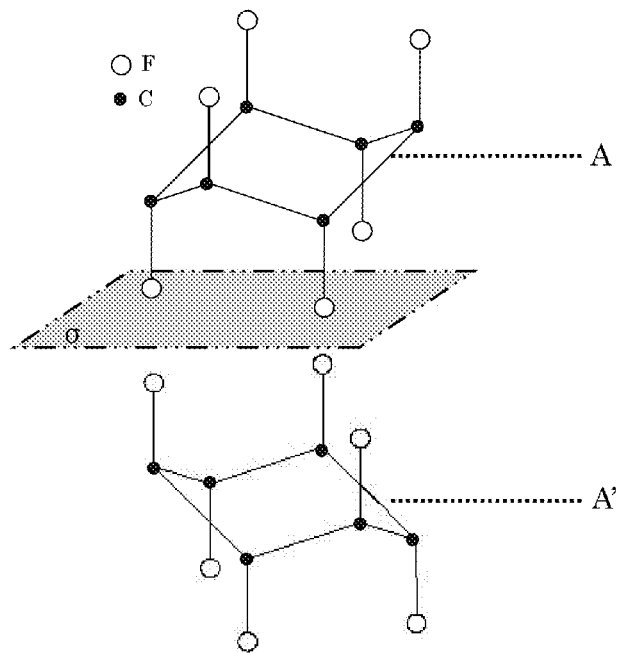
FIG. 4.
Figure 4:
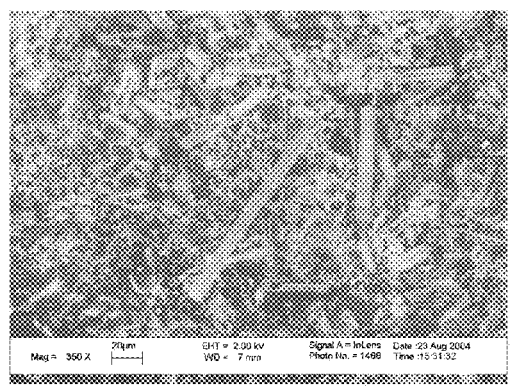
Figure 5:
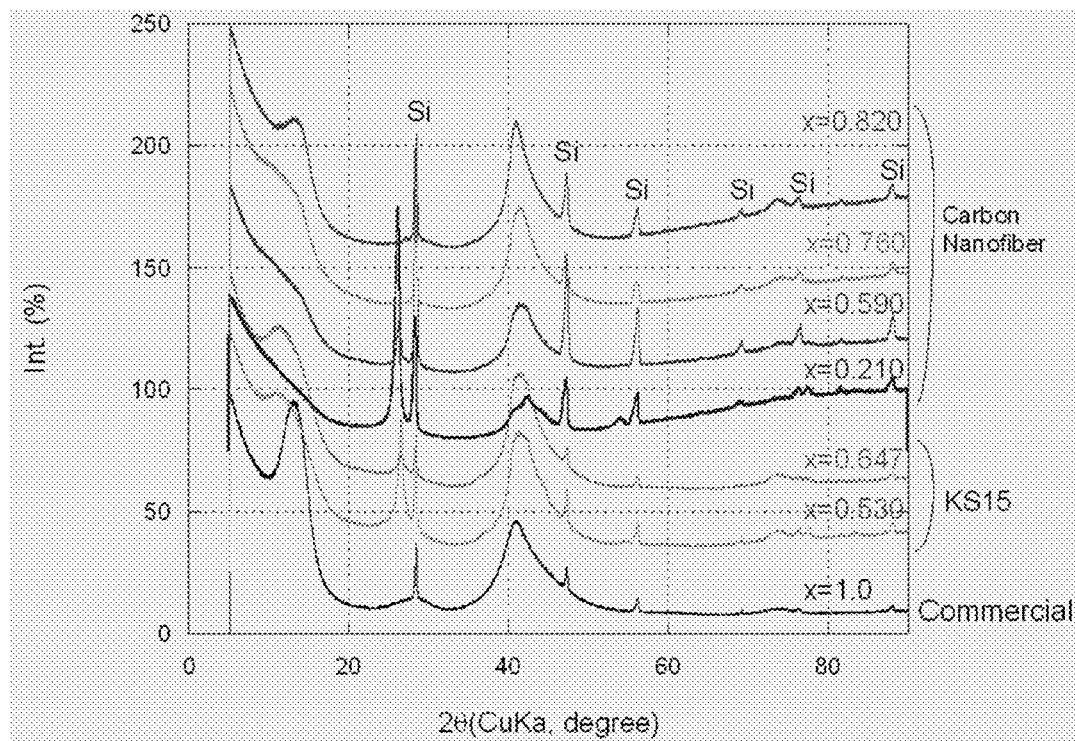
FIG. 5.

FIG. 4 provides crystal structure of carbon fluoride. FIG. 5 provides -ray diffraction patterns ($CuK_α$ radiation) from various positive electrode materials evaluated comprising commercial $CF_1$ and various subfluorinated carbonaceous materials. Diffraction patterns for a variety of subfluorinated carbon nanofiber samples (i.e., MWNTs, CFx; x=0.210, 0.590, 0.760 and 0.820), a variety of subfluorinated KS15 graphite samples (i.e., CFx; x=0.53 and 0.647); and commercial $CF_1$ sample (i.e.; CFx, x=1) are shown in FIG. 5.

The various fluorinated carbon active materials were also characterized via electrochemical methods. In these experiments, Cyclic Chronopotentiometry (constant current) is used to follow the discharge and charge of cells. The applied current calculated from the theoretical capacity. Thus, for different fixed C/n rate (C/10~1 C), one can determine the current I:

$$I = \frac{C}{n} = \frac{m_{CFx} \times Q_{th}(x)}{n}$$

$$Q_{th}(x) = \frac{96500x}{3.6(12 + 19x)} (mAh/g)$$

$m_{CFx}$=mass of active material (g), $Q_{th}$=theoretical capacity in mAh/g

Note: $Q_{th}$ is expressed in mAh/g of $CF_x$ during the first discharge and in mAh/g of C during cycling In these measurements, the first discharge and subsequent cycling reactions were as follows:

First Discharge

$CF_x+Li^++xe^- \rightarrow C+xLiF$ (3.2V-1.5V vs. Li)

Cycling Reaction

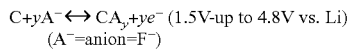
$C+yA^- \leftrightarrow CA_y+ye^-$ (1.5V-up to 4.8V vs. Li)
($A^-$=anion=$F^-$)

Figure 6:
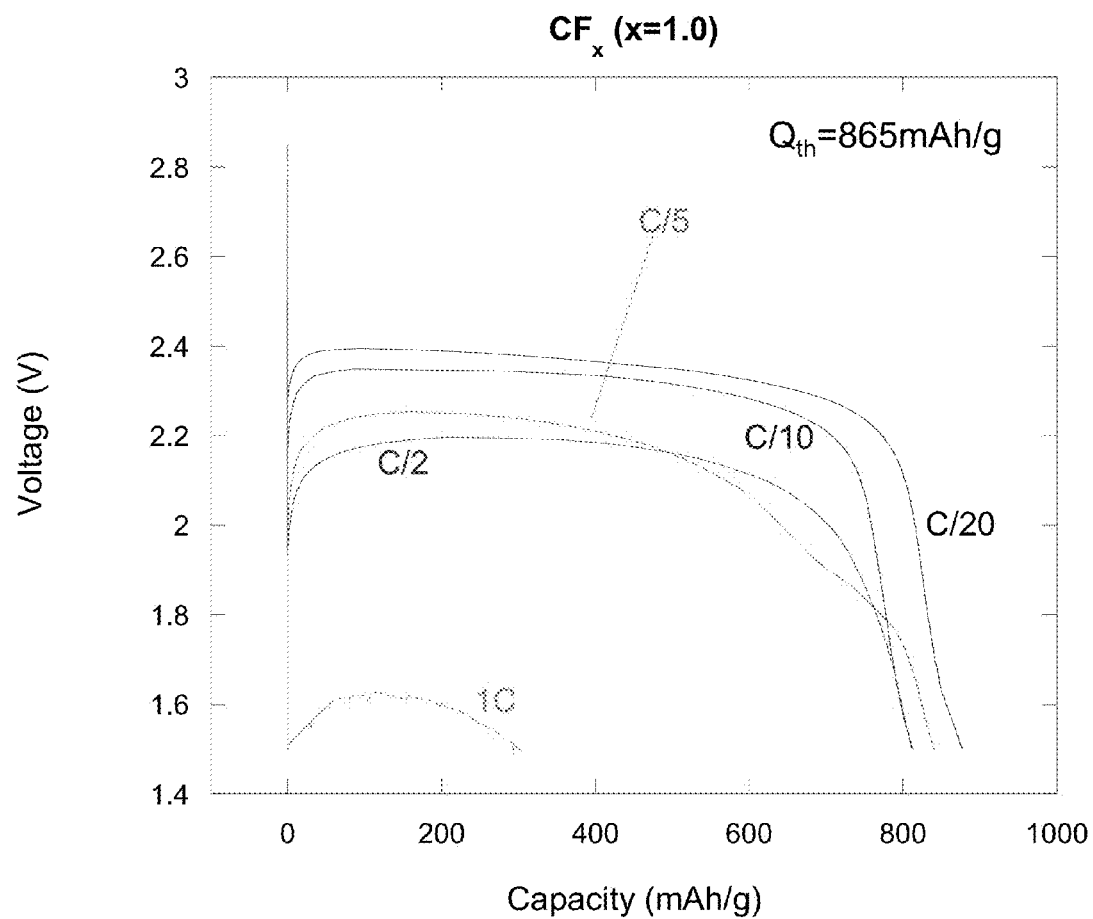
FIG. 6.
Figure 7:
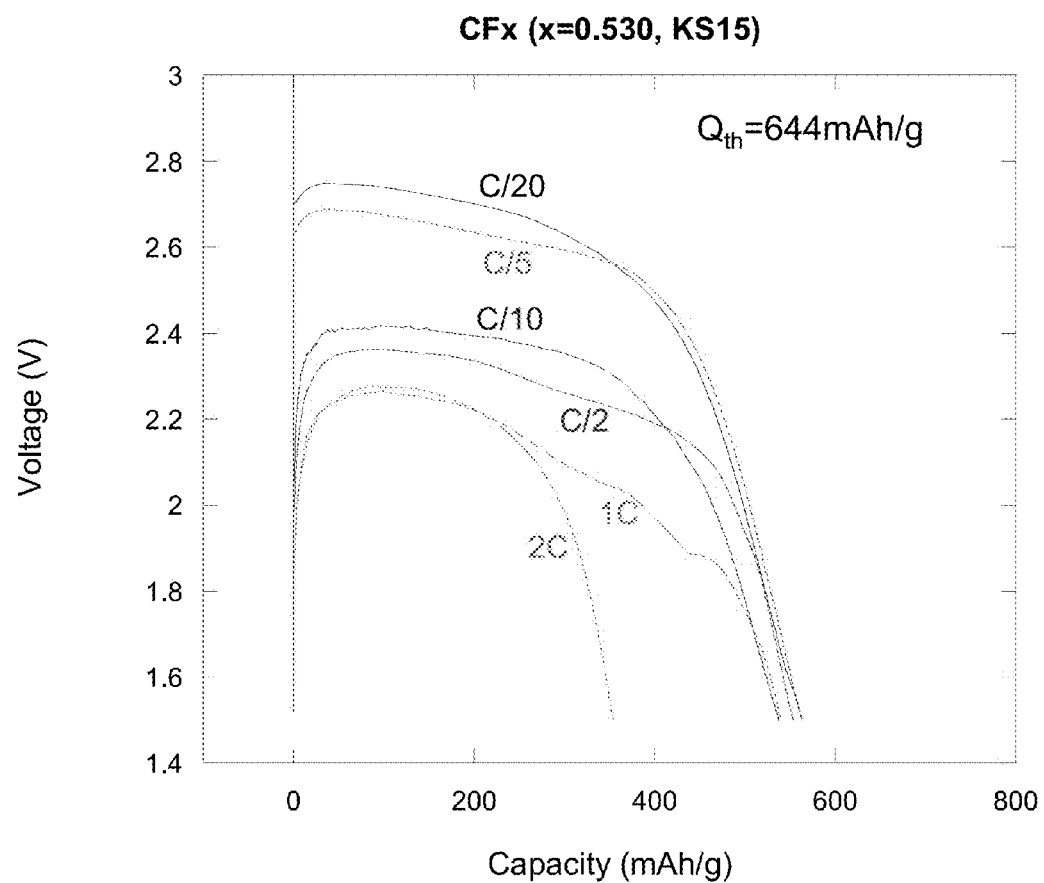
FIG. 7.
Figure 8:
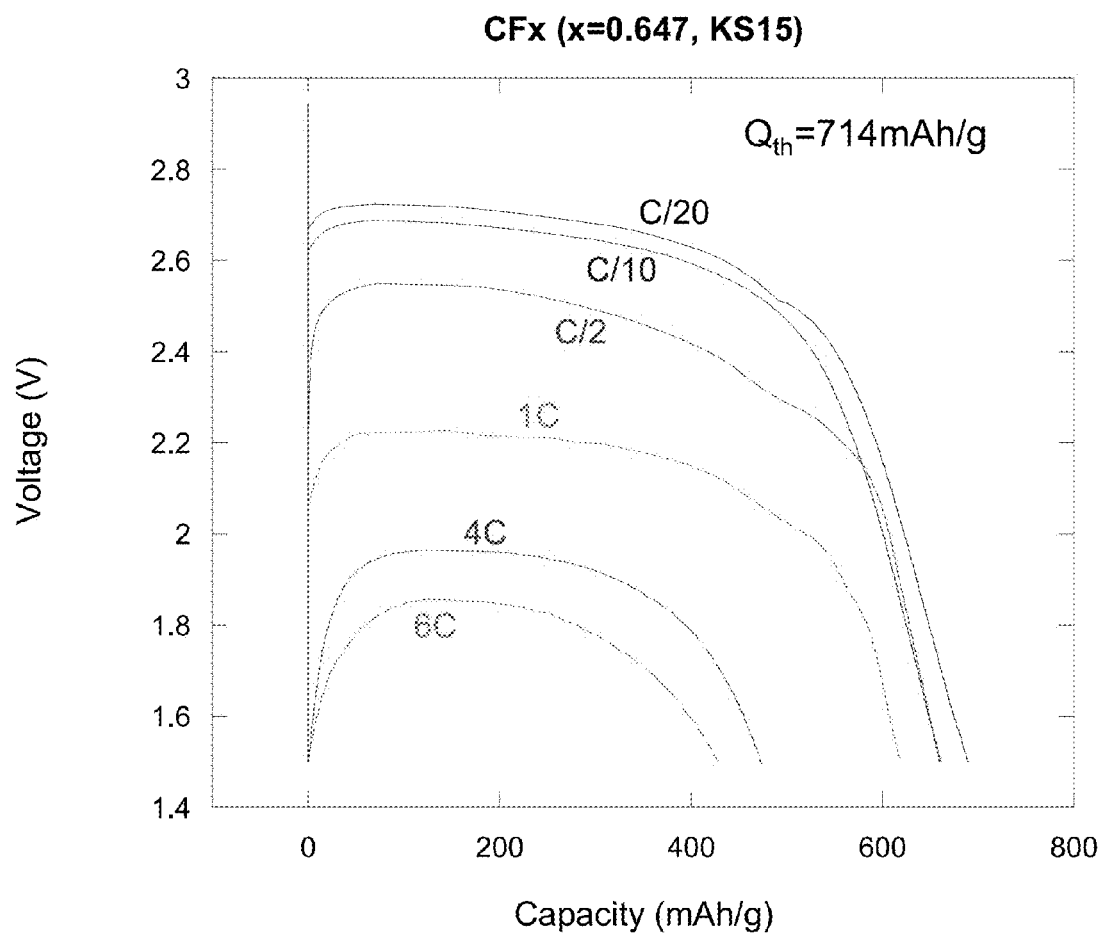
FIG. 8.
Figure 9:
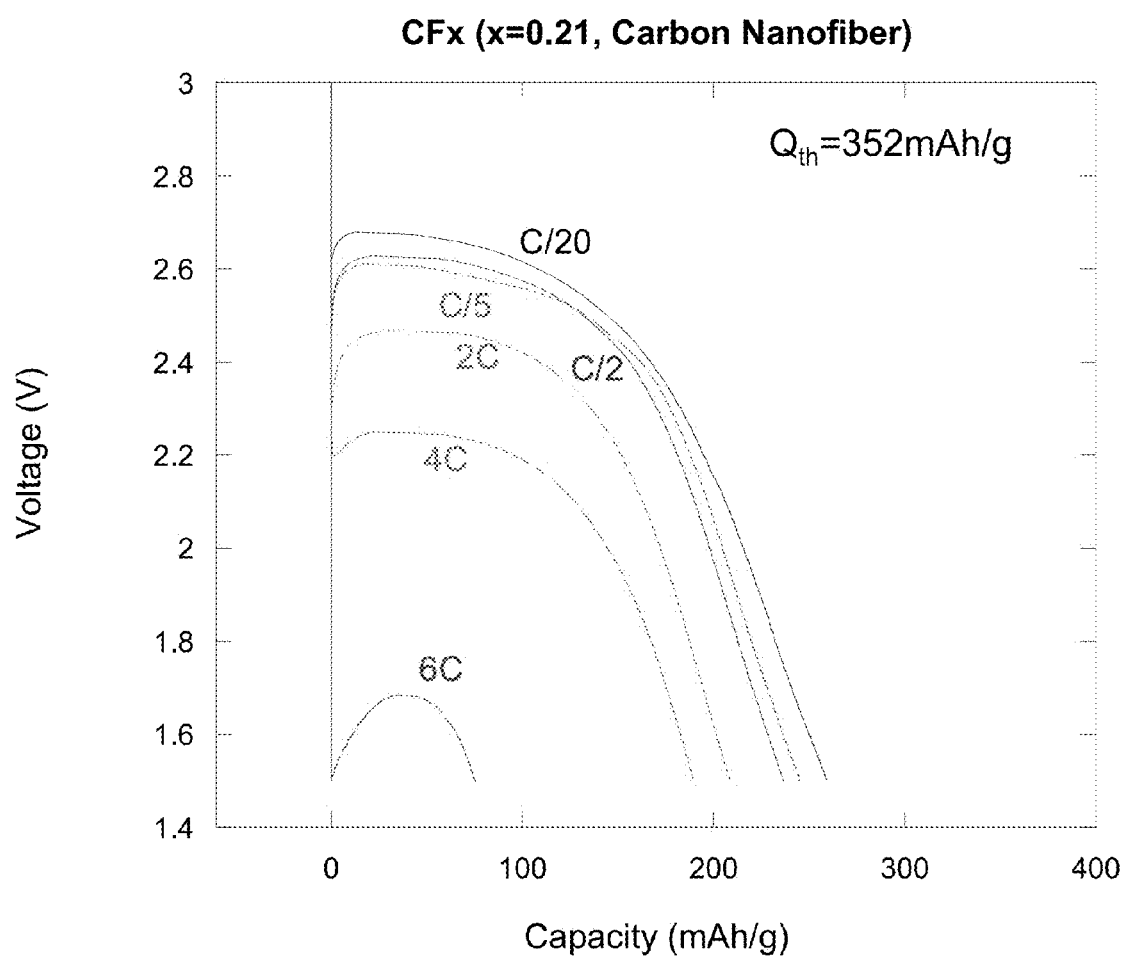
FIG. 9.
Figure 10:
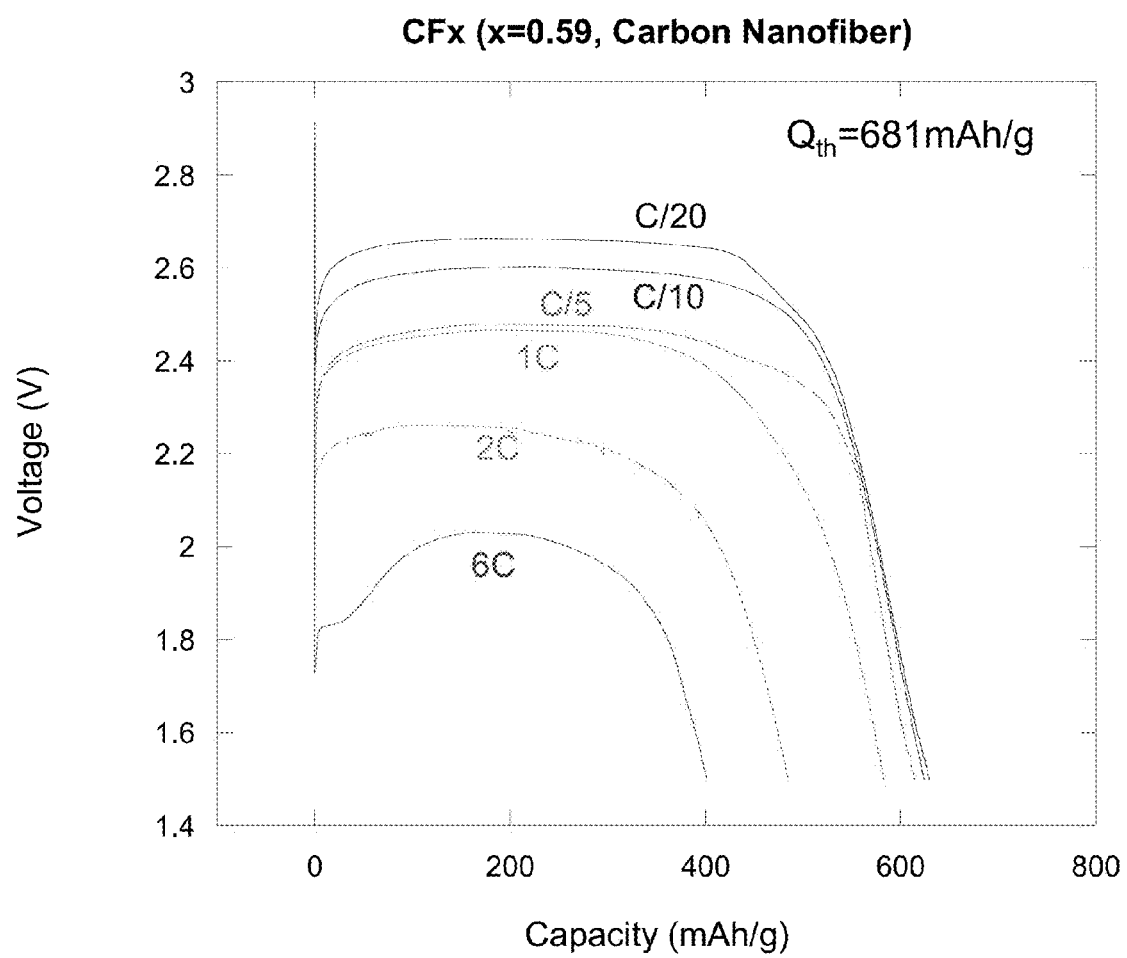
FIG. 10.
Figure 11:
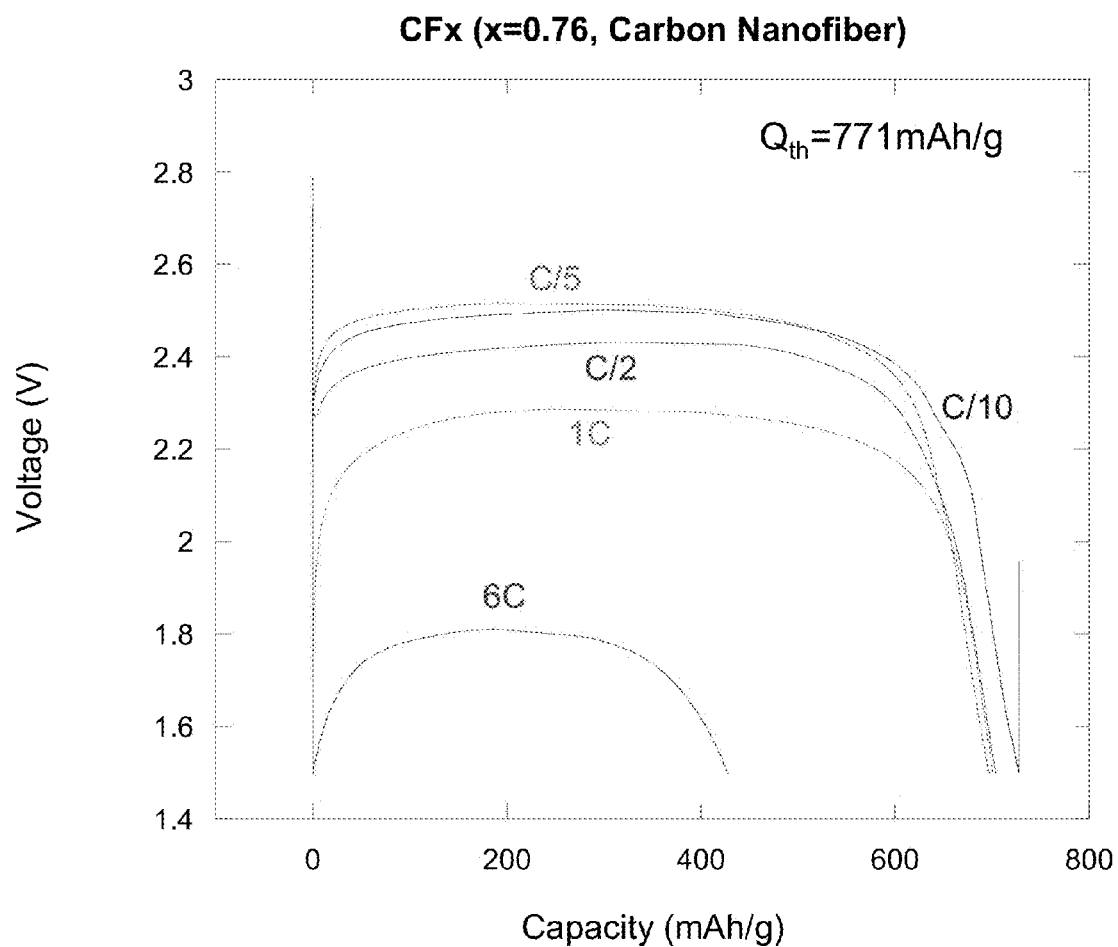
FIG. 11.
Figure 12:
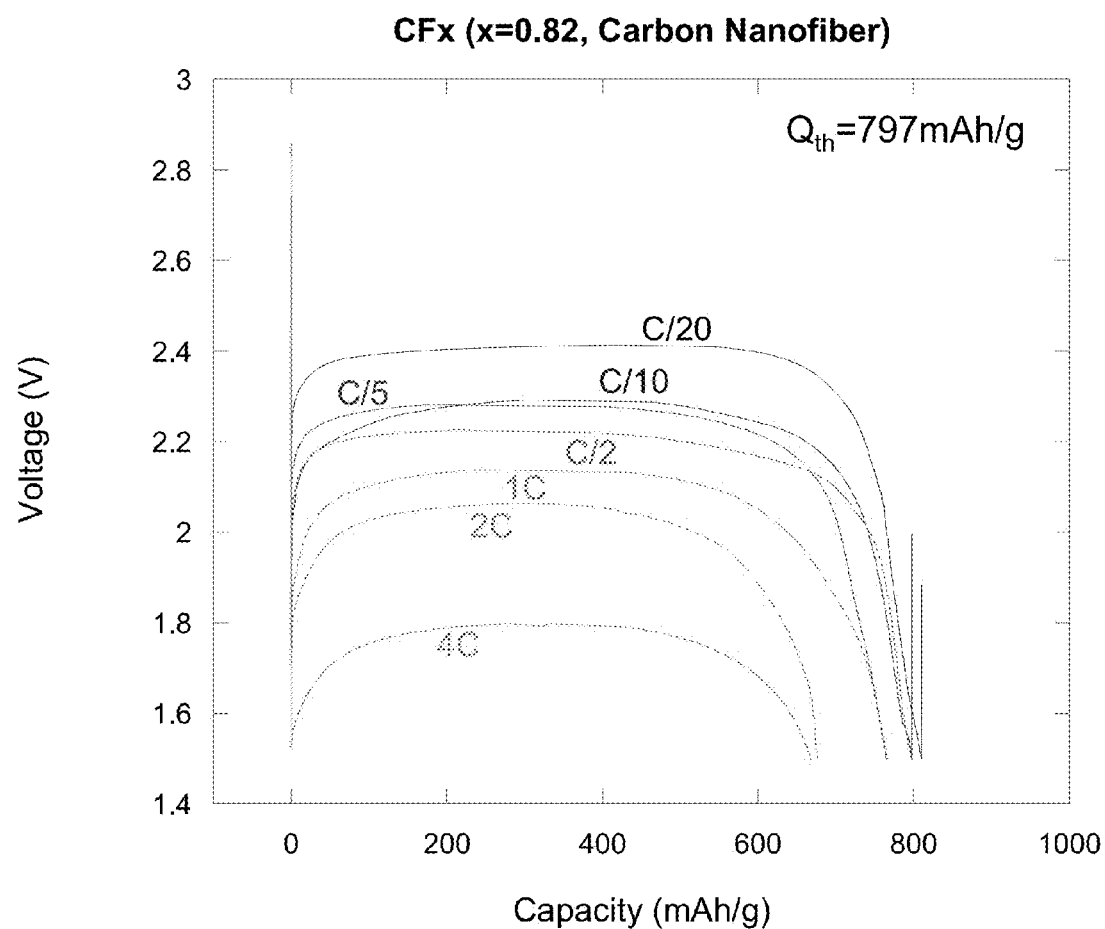
FIG. 12.

FIGS. 6-12 provides first discharge curves for a number of positive electrode carbonaceous active materials. FIG. 6 provides discharge profiles for commercial $CF_1$ positive electrodes at room temperature for a variety of discharge rates ranging from C/20 to C. FIG. 7 provides discharge profiles for $CF_{0.530}$, KS15 positive electrodes at room temperature for a variety of discharge rates ranging from C/20 to C. FIG. 8 provides discharge profiles for $CF_{0.647}$, KS15 positive electrodes at room temperature for a variety of discharge rates ranging from C/20 to 6 C. FIG. 9 provides discharge profiles for $CF_{0.21}$, carbon nanofiber positive electrodes at room temperature for a variety of discharge rates ranging from C/20 to 6 C. FIG. 10 provides discharge profiles for $CF_{0.59}$, carbon nanofiber positive electrodes at room temperature for a variety of discharge rates ranging from C/20 to 6 C. FIG. 11 provides discharge profiles for $CF_{0.76}$, carbon nanofiber positive electrodes at room temperature for a variety of discharge rates ranging from C/20 to 6 C. FIG. 12 provides discharge profiles for $CF_{0.82}$, carbon nanofiber positive electrodes at room temperature for a variety of discharge rates ranging from C/20 to 4 C. The observed discharge profiles are consistent with a first discharge cell reaction of:

$CF_x+Li^++xe^- \rightarrow C+xLiF$ (3.2V-1.5V vs. Li).

Figure 13:
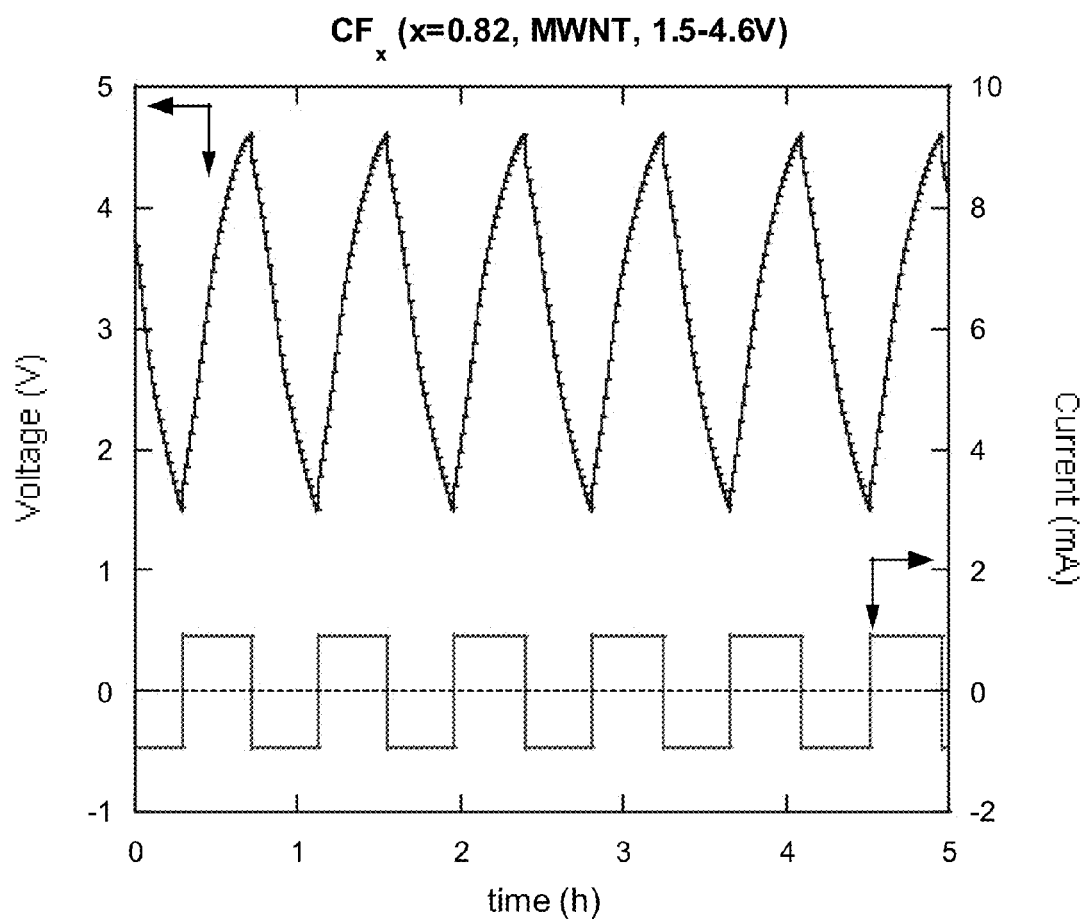
FIG. 13.
Figure 14:
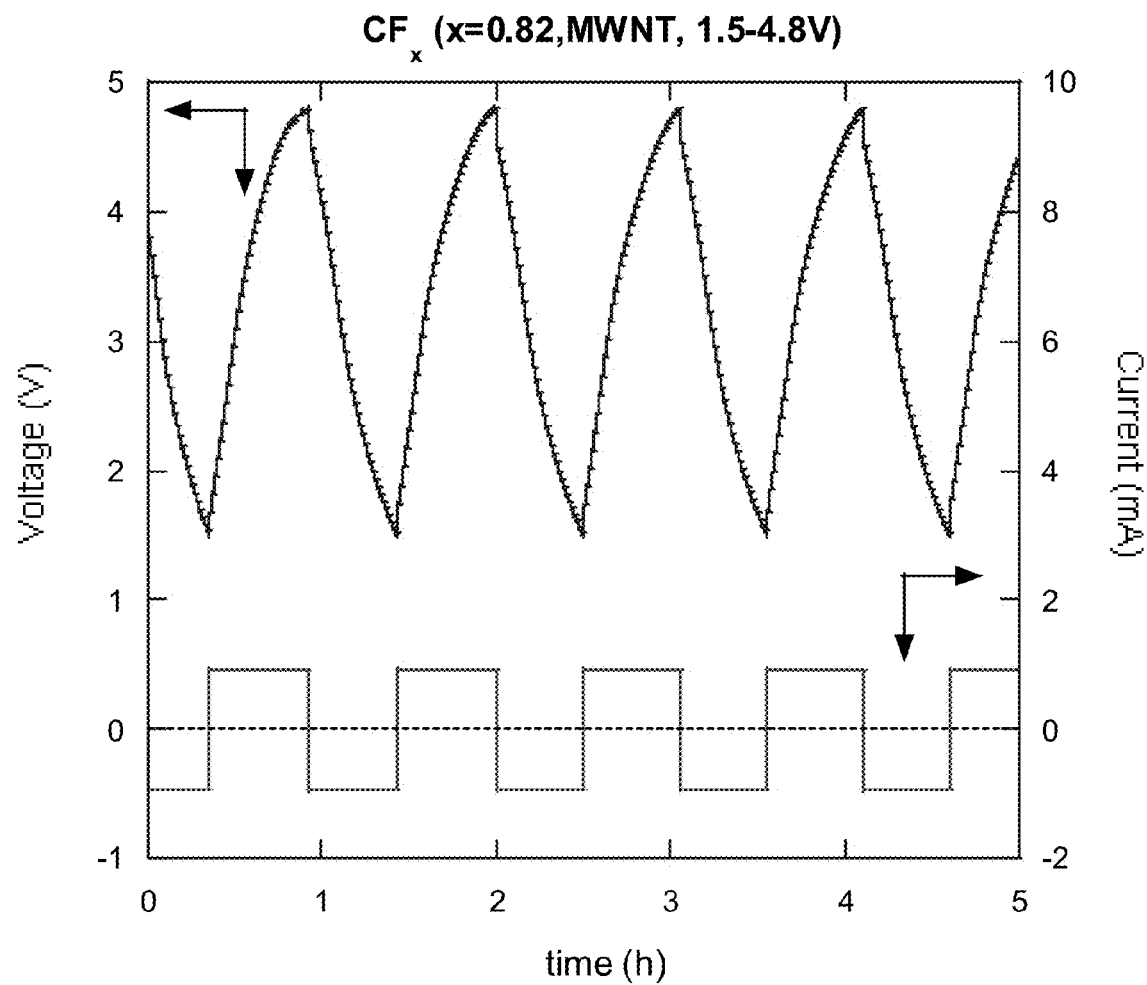
FIG. 14.
Figure 15:
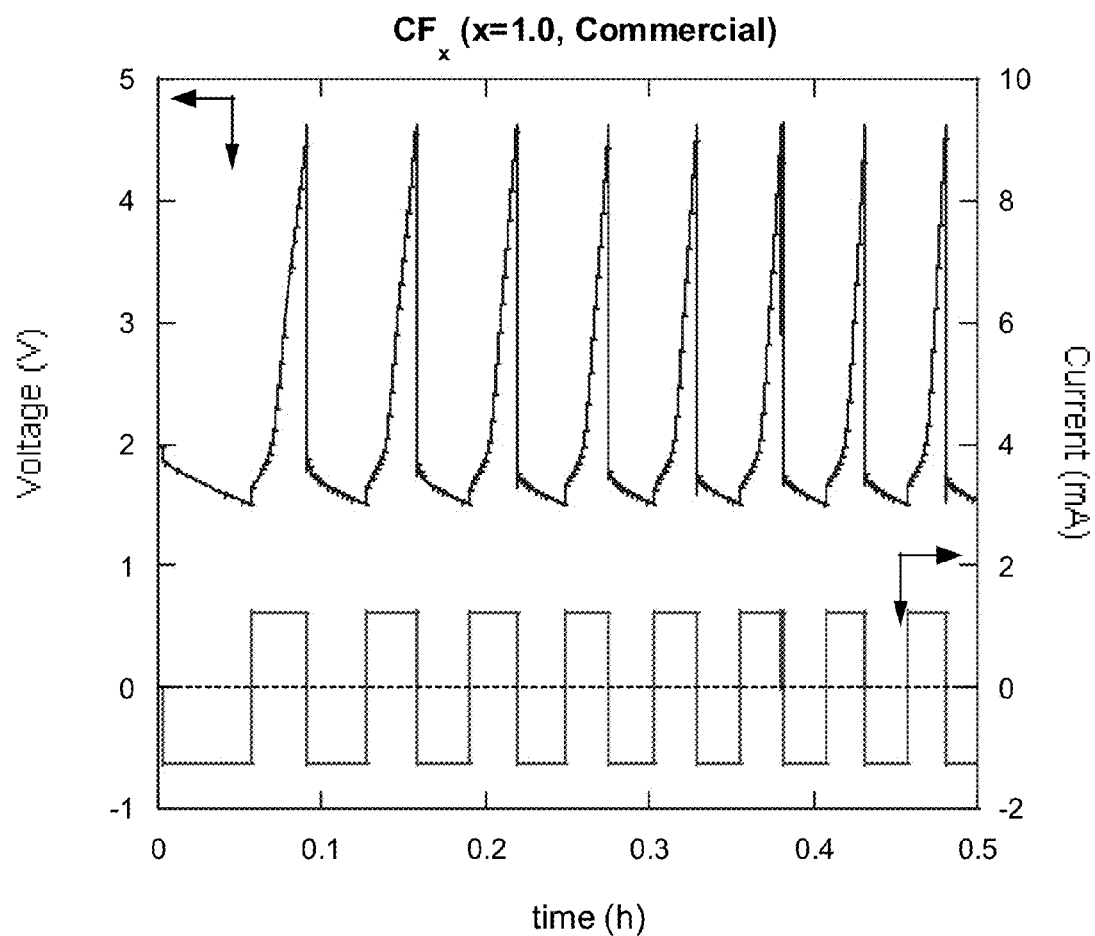
FIG. 15.
Figure 16:
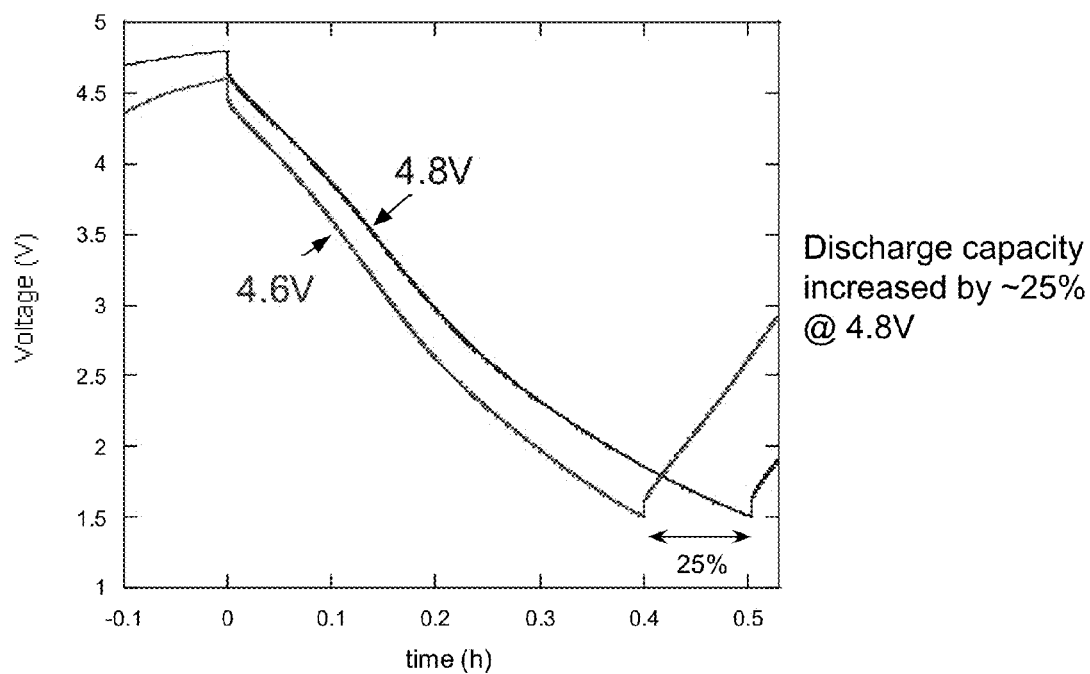
FIG. 16.
Figure 17:
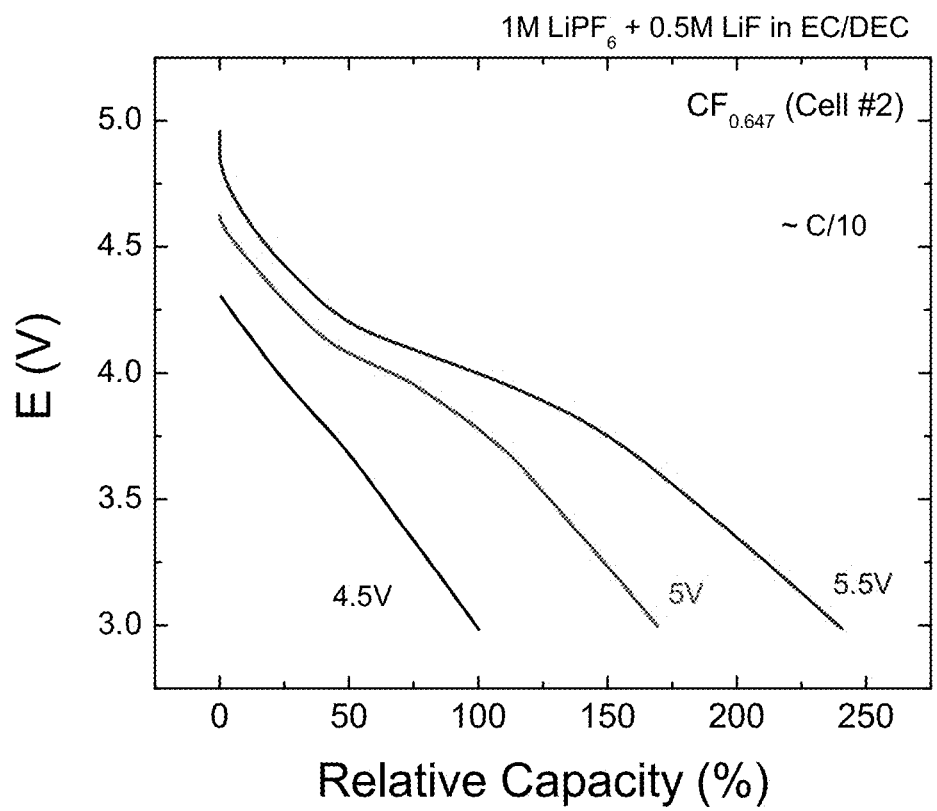
FIG. 17.

FIGS. 13-15 provide plots showing cycling tests for several positive electrode carbonaceous active materials. FIG. 13 provides charge-discharge profiles for $CF_{0.82}$, multiwalled nanotubes positive electrodes for a voltage range 1.5V to 4.6V. Voltage is plotted on the Y axis (left side), Current is plotted on the Y axis (right side) and time is plotted on the X axis. FIG. 14 provides charge-discharge profiles for $CF_{0.82}$, multiwalled nanotubes positive electrodes for a voltage range 1.5V to 4.8V. Voltage is plotted on the Y axis (left side), Current is plotted on the Y axis (right side) and time is plotted on the X axis. FIG. 15 provides charge-discharge profiles for $CF_1$ positive electrodes for a voltage range 1.5V to 4.8V. Voltage is plotted on the Y axis (left side), Current is plotted on the Y axis (right side) and time is plotted on the X axis. These figures show that the positive electrode materials examined, particularly $CF_x$; x=0.82, MWNT (see, FIGS. 13 and 14), have the ability to cycle and exhibit a stable cycle capacity. FIG. 16 provides plots of voltage (V) vs. time (hours) for a $Li/CF_x$ half cell configuration having a $CF_x$; x=0.82, MWNT positive electrode for 4.6V and 4.8V. An increase in discharge capacity of 0.25% is observed corresponding to an increase in charging voltage from 4.6V to 4.8V. FIG. 17 provides plots of voltage (V) vs relative capacity (%) for a $Li/CF_x$ half cell configuration having a $CF_{0.647}$ KS15 positive electrode for voltages ranging from 4.8V and 5.4V. As shown in FIG. 17, the $CF_{0.647}$ KS15 positive electrode capacity increased with higher charge cutoff voltage over the range of 4.8V to 5.4V. FIGS. 16 and 17 show a measurable increase in discharge capacity resulting from an increase in charge voltage for the CFx materials examined. The observed charge-discharge profiles shown in FIGS. 13-17 are consistent with a cycling cell reaction of: $C+yA^- \leftrightarrow CA_y+ye^-$ (1.5V-up to 4.8V vs. Li) ($A^-$=anion=$F^-$), and demonstrate that $Li^+$ is not participating in the cycling reactions.

Figure 18:
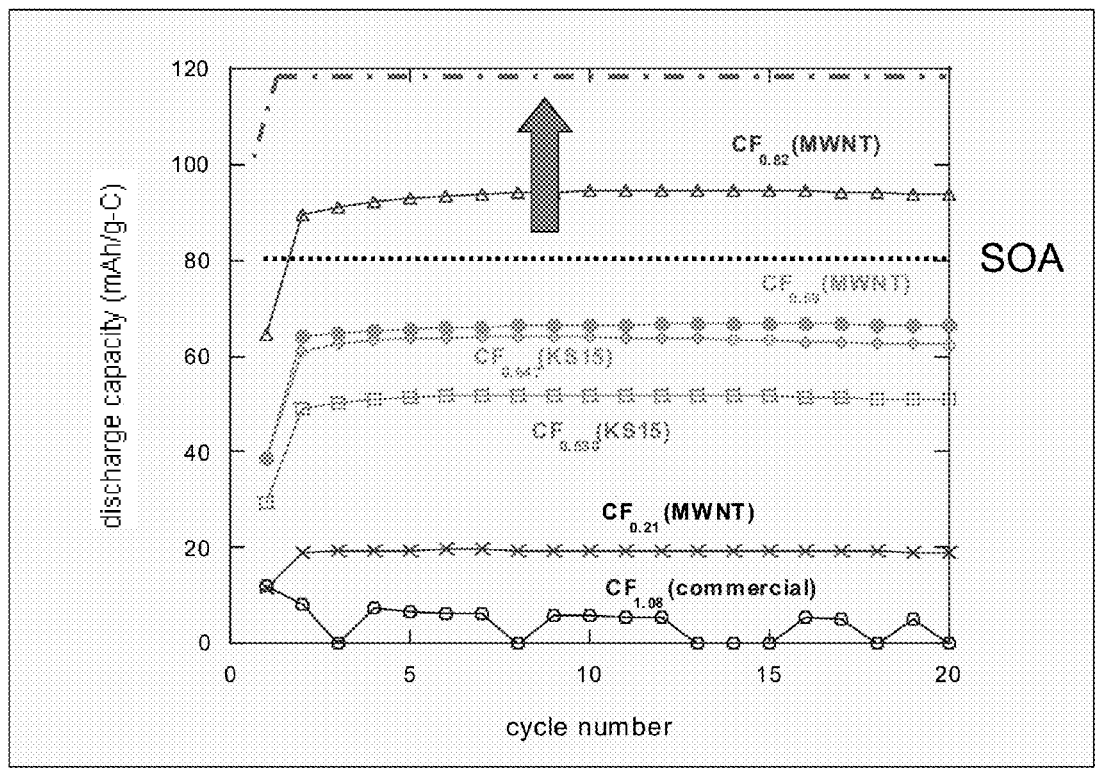
FIG. 18.

FIG. 18 provides cycle capacity curves of discharge capacity (mAh/g-C) verse cycle number for various positive electrode materials evaluated include commercial $CF_1$, subfluorinated KS15 graphite (CFx, x=0.53 & 0.647) and subfluorinated MWNTs (CFx; x=0.21, 0.59, 0.76 and 0.82). The charging voltage for these measurements was 4.6 V, with the exception of the top most plot (dotted and dashed line) which corresponds to a charge voltage of 4.8V and a positive electrode having an active material comprising subfluorinated MWNTs with CFx, X=0.82. Similar to the charge-discharge profiles shown in FIGS. 16 and 17, a significant increase in discharge capacity is observed for subfluorinated MWNTs with CFx, X=0.82 upon increasing the charging voltage from 4.6 V to 4.8V.

As shown in FIG. 18, the cell configuration having a commercial $CF_1$ active positive electrode material does not exhibit very good cycling, most likely due to significant degradation in the structural integrity of $CF_1$ occurring during the first discharge. It is likely that the porosity of this positive electrode active material contributed to its degradation, which may have been caused by exfoliation initiated by the reaction between fluoride ions and lithium ions. In contrast, the subfluorinated carbonaceous materials studied (e.g., graphite, MWNTs) exhibit very good cycling performance. This is likely due to the lower amount of fluorine and decreased porosity of these materials as compared to commercial CFx, x=1. It is important to note that the subfluorinated MWNTs provides the best cycling performance likely due to its greater mechanical integrity as compared to graphite and commercial $CF_1$.

Figure 20:
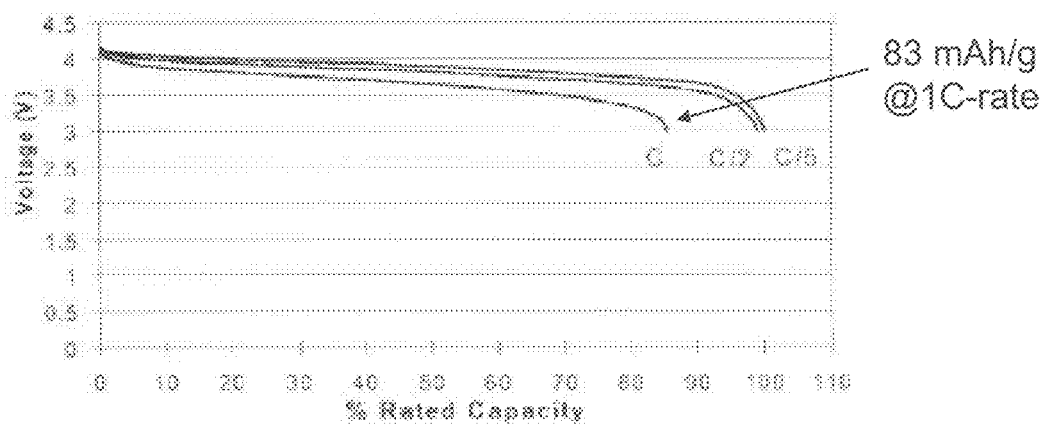
FIG. 20 provides a plot of the discharge rate capability for a $LiMn_2O_4$ positive electrode.

The data in FIG. 18 demonstrates that 120 mAh/g-C rechargeable capacity has been achieved in a Li/$CF_x$ half cell configuration with a positive electrode having an active material comprising subfluorinated MWNTs with CFx, X=0.82 and charged to 4.8 V at a 2 C-rate. For the purpose of comparison, FIG. 20 provides a plot of the discharge rate capability for a $LiMn_2O_4$ positive electrode. These measurements show that sub-fluorinated $CF_x$ materials made of Multi-walled Carbon Nanotubes outperform commercially available $LiMn_2O_4$ as positive electrodes in lithium rechargeable batteries.

Figure 19:
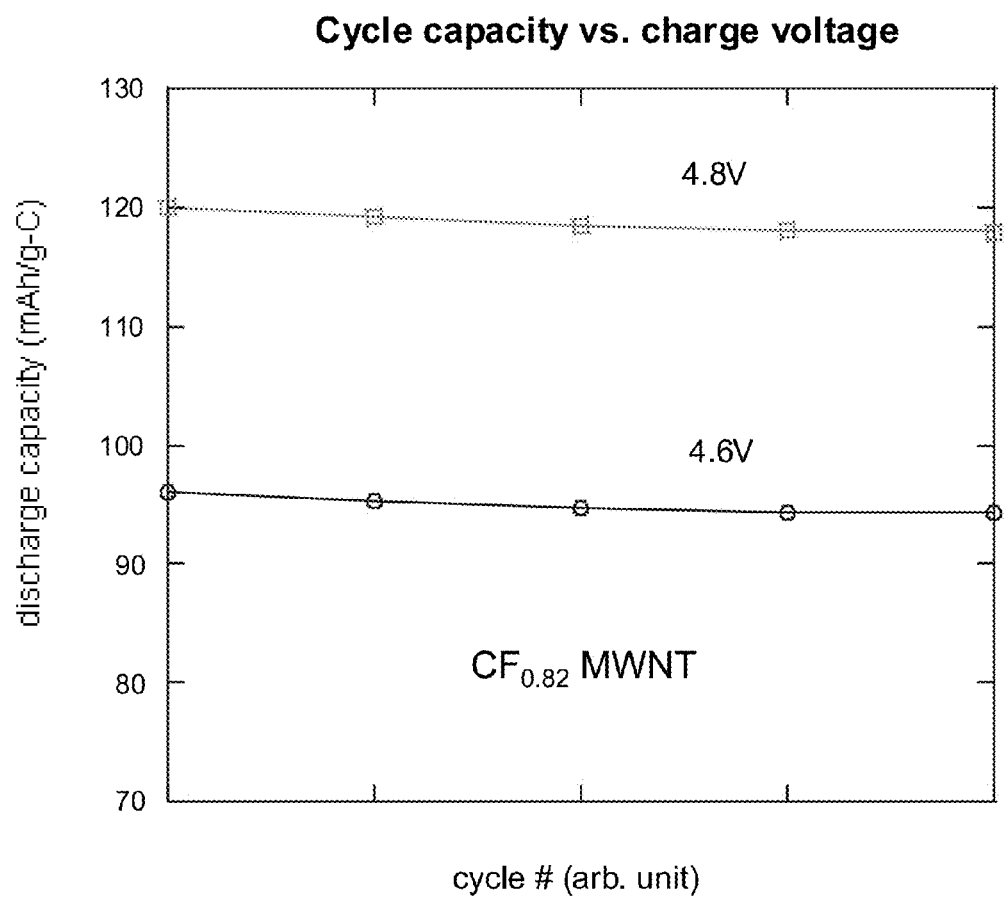
FIG. 19.

FIG. 19 provides plots of discharge cycle vs. cycle number for $CF_{0.82}$, multiwalled nanotubes positive electrodes for voltages equal to 4.6V to 4.8V. In these plots, discharge capacity (y-axis; mAh/g-C) is plots vs. cycle number in arbitrary units. FIG. 19 shows that stable discharge characteristics are observed for this positive electrode active material for at least approximately 50 cycles.

Figure 21:
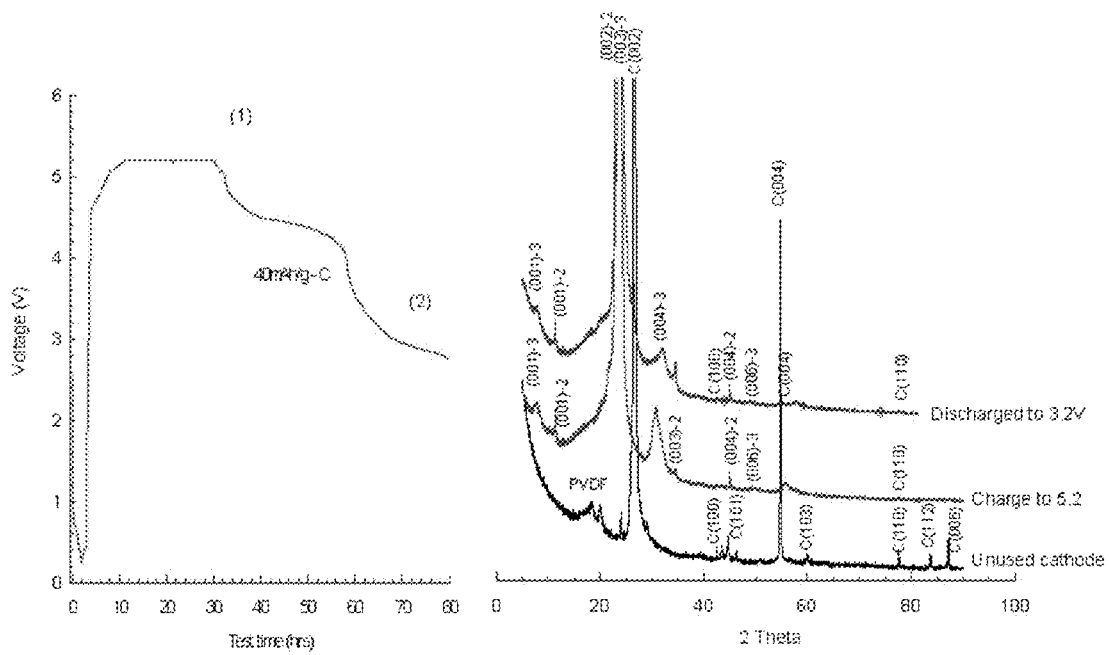
FIG. 21.
Figure 21C:
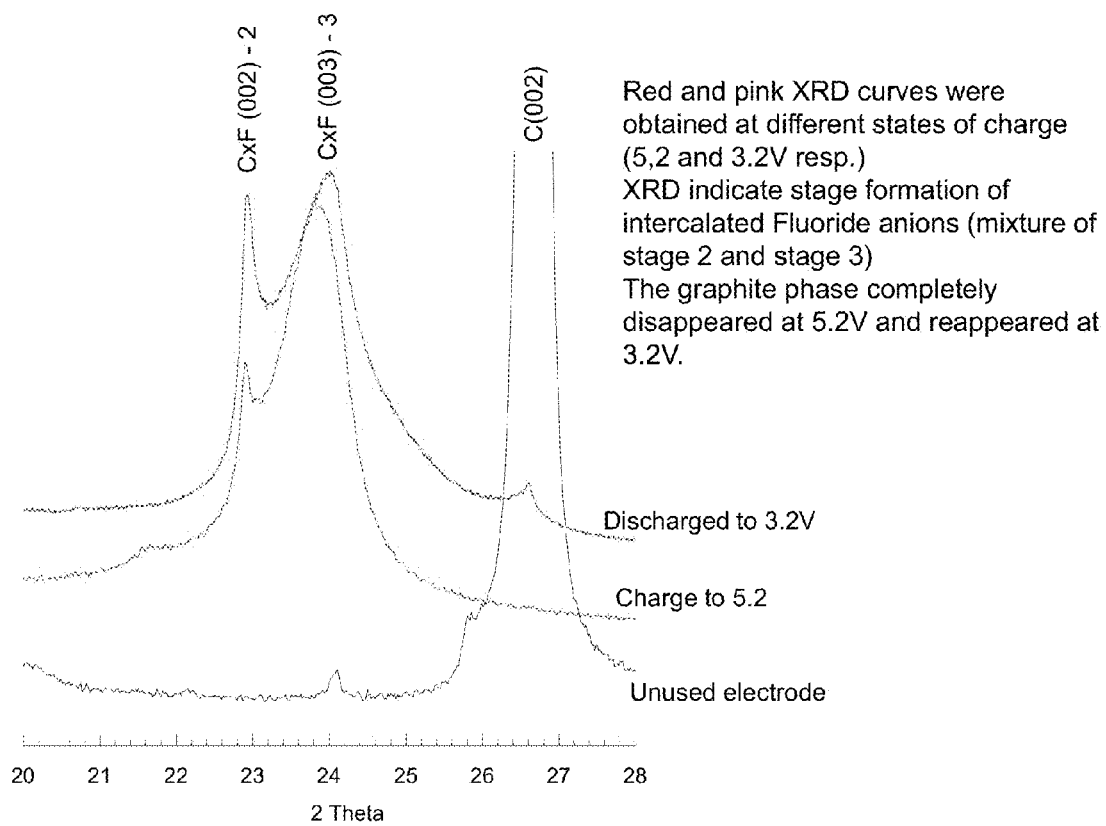
FIG. 21C shows x-ray diffraction patterns acquired at two time points (1) and (2) shown in FIG. 21A on an enlarge scale. The diffraction patterns in FIGS. 21B and 21C show stage formation of intercalated fluoride ions (a mixture of stage 2 and stage 3). Also shown in The diffraction patterns in FIGS. 21B and 21C is that the graphite phase completely disappeared at 5.2V and reappeared at 3.2V.

To verify that fluoride ion was participating in the oxidation and reduction reactions at the electrode, X-ray diffraction patterns of the positive electrode were acquired under different experimental conditions. FIG. 21A provides a plot of discharge voltage vs time indicating two time points (1) and (2) for which x-ray diffraction patterns were taken. X-ray diffraction patterns were also acquired for the unused positive electrode. Thin graphite electrodes were used (50 microns thick 3-4 mg). FIG. 21B shows x-ray diffraction patterns acquired at two time points (1) and (2) shown in FIG. 21A. FIG. 21C shows x-ray diffraction patterns acquired at two time points (1) and (2) shown in FIG. 21A on an enlarge scale.

The diffraction patterns in FIGS. 21B and 21C corresponding to charging to 5.2 V and subsequent discharge to 3.2 V show stage formation of intercalated fluoride ions (a mixture of stage 2 and stage 3). Particularly, the appearance of the (002)-2, (003)-3 and (004)-3 peaks indicate that intercalated fluoride anions are present upon charging and discharge. As shown by a comparison between the diffraction patterns corresponding to the unused positive electrode, the positive electrode at 5.2V and the positive electrode at 3.2V, the graphite phase completely disappears upon charging to 5.2V and subsequently reappears upon discharge to 3.2V. The C(002) graphite peak is present in the diffraction pattern corresponding to 3.2V shows that graphite is present upon de-intercalation of the fluoride ions. Further, the sharp peak width of the C(002) graphite peak in the 3.2 V diffraction pattern indicates that graphite maintains its structural integrity upon charging and discharge. This result demonstrates that the fluoride ion intercalation and de-intercalation process is reversible and does not result in a phase change from crystalline graphite to an amorphous carbon phase. These result are consistent with a cycling cell reaction of:

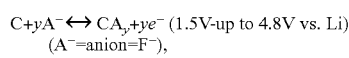
$C+yA^- \leftrightarrow CA_y+ye^-$ (1.5V-up to 4.8V vs. Li)
($A^-$=anion=$F^-$), and provide further evidence that that $Li^+$ is not participating in the cycling reactions.

Figure 22:
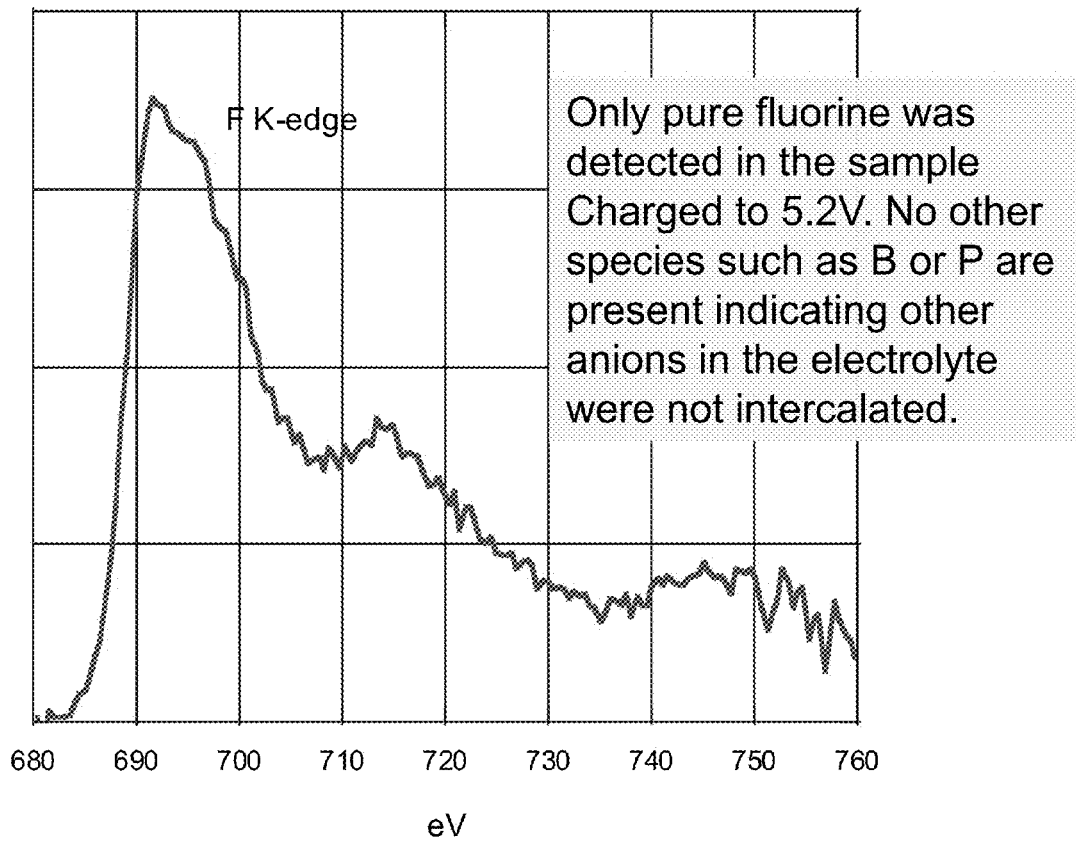
FIG. 22. Provides Electron Energy Loss Spectrum (EELS) of the positive electrode material charged to 5.2V. Only pure fluorine was detected in the sample, and no other species such as B or P are present indicating other anions in the electrolyte were not intercalated.

To further characterize the composition of the subfluorinated graphite active material for the positive electrode Electron Energy Loss Spectra (EELS) were acquired for conditions corresponding to charging the electrochemical cell to 5.2 V. EELS is a useful for technique for characterizing the elemental composition of materials as it is very sensitive to the presence of elements in a sample and can identify elements in a material very accurately. FIG. 22 provides an EELS spectrum of the positive electrode active material charged to 5.2V. Only two peaks are shown in FIG. 22, and both of these peaks can be assigned to the presence of fluorine in the positive electrode active material. Peaks corresponding to other non-carbon elements, such as B or P, are not present. This observation provides evidence that other anions in the electrolyte, such as $PF_6^-$ or $BF_4^-$, were not intercalated.

1.d. Conclusions

Sub-fluorinated carbons materials, $CF_x$, are excellent example of a positive electrode materials for fluorine anion rechargeable batteries. They show stable cycle life, high capacity, high discharge voltage and high rate capability. X-ray diffractometry coupled with electron energy loss spectrometry show that charge carrier fluoride anions do reversibly intercalate into the carbon matrix, whether the later consists of graphite, coke or multiwalled carbon nanotube. Staging occurs, which draws similarity of fluorine anion intercalation with lithium cation intercalation in $Li_xC_6$ negative electrodes. Fluorine anion storage capacity increases with charge cutoff voltage by about 150% between 4.5V and 5.5V.

Example 2

Anion and Cation Receptors for Fluoride Ion Electrochemical Cells

This example provides summary of anion and cation receptors useful in the present invention. A number of fluoride ion receptors are specifically exemplified that are capable of enhancing solubility of fluoride salts and capable of enhancing the ionic conductive of electroyles in electrochemical cells of the present invention.

In an embodiment, an electrolyte of the present invention comprises an anion receptor having the chemical structure AR1:

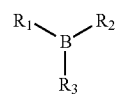

wherein $R_1$, $R_2$ and $R_3$ are independently selected from the group consisting of alkyl, aromatic, ether, thioether, heterocyclic, aryl or heteroaryl groups which are optionally substituted with one or more halogens, including F, alkyl, alkoxide, thiol, thioalkoxide, aromatic, ether or thioether.

In an embodiment, an electrolyte of the present invention comprises a borate-based anion receptor compound having the chemical structure AR2:

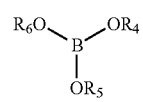

wherein $R_4$, $R_5$ and $R_6$ are selected from the group consisting of alkyl, aromatic, heterocyclic, aryl or heteroaryl groups which are optionally substituted with one or more halogens, including F, alkyl, alkoxide, thiol, thioalkoxide, aromatic, ether or thioether. In an embodiment $R_4$, $R_5$ and $R_6$ are identical. In an embodiment, each of $R_4$, $R_5$ and $R_6$ are F-bearing moieties.

In an embodiment, an electrolyte of the present invention comprises a phenyl boron-based anion receptor compound having the chemical structure AR3:

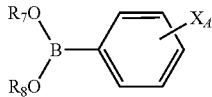

wherein $R_7$ and $R_8$ are selected from the group consisting of alkyl, aromatic, heterocyclic, aryl or heteroaryl groups which are optionally substituted with one or more halogens, including F, alkyl, alkoxide, thiol, thioalkoxide, aromatic, ether or thioether. In an embodiment $R_7$ and $R_8$ are identical. In an embodiment, each of $R_7$ and $R_8$ are F-bearing moieties. In an embodiment, $R_7$ and $R_8$ together from an aromatic, including a phenyl that is optionally substituted, including substituents that are F and substituents that are themselves F-bearing moieties, as shown by chemical formula AR4:

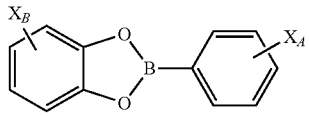

wherein $X_A$ and $X_B$ represent one or more hydrogens or non-hydrogen ring substituents independently selected from the group consisting of halogens, including F, alkyl, alkoxide, thiol, thioalkoxide, ether, thioether. In an embodiment, at least one of the substituents is a F-bearing moiety.

In an embodiment, an electrolyte of the present invention comprises a Tris (hexafluoroisopropyl) borate (THFIB; MW=511.9 AMU) anion receptor having the chemical structure AR5:

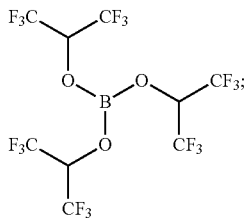

or a Tris (2,2,2-trifluoroethyl) borate (TTFEB; MW=307.9 AMU) anion receptor having the chemical structure AR6:

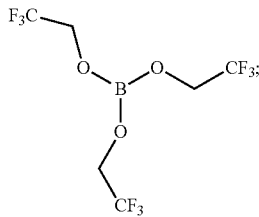

or a Tris (pentafluorophenyl) borate (TPFPB; MW=511.98 AMU) anion receptor having the chemical structure AR7:

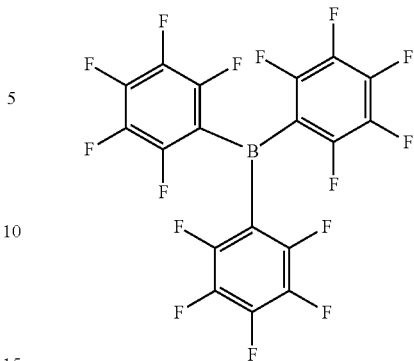

or a Bis (1,1,3,3,3-hexafluoroisopropyl) pentafluorophenyl boronate (BHFIPFPB; MW—480.8 AMU) anion receptor having the structure AR8:

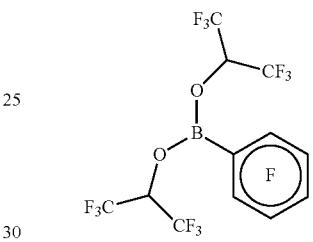

Anion receptors useful in electrolytes of present invention include, but are not limited to, those having the formula selected from the group consisting of: $(CH_3O)_3B$, $(CF_3CH_2O)_3B$, $(C_3F_7CH_2O)_3B$, $[(CF_3)_2CHO]_3B$, $[(CF_3)_2C(C_6H_5)O]_3B$, $((CF_3)CO)_3B$, $(C_6H_5O)_3B$, $(FC_6H_4O)_3B$, $(F_2C_6H_3O)_3B$, $(F_4C_6HO)_3B$, $(C_6F_5O)_3B$, $(CF_3C_6H_4O)_3B$, $[(CF_3)_2C_6H_3O]_3B$ and $(C_6F_5)_3B$.

Useful cation receptors in the present invention include, but are not limited to, crown ethers, lariat ethers, metallacrown ethers, calixcrowns (e.g., calyx(aza)crowns), tetrathiafulvalene crowns, calixarenes, calix[4]arenediquinoes, tetrathiafulvalenes, bis(calixcrown)tetrathiafulvalenes, and derivatives thereof.

The following references describe anion and/or cation receptors useful in embodiments of the present invention, and are hereby incorporated by reference to the extent not inconsistent with the present disclosure: (1) Evidence for Cryptand-like Behavior in Bibracchial Lariat Ether (BiBLE) Complexes Obtained from X-ray Crystallography and Solution Thermodynamic Studies, Kristin A. Arnold, Luis echeogoyen, Frank R. Fronczek, Richard D. Grandour, Vinicent J. Gatto, Banita D. White, George W. Gokel, J. Am. Chem. Soc., 109:3716-3721, 1987; (2) Bis(calixcrown) tetrathiafulvalene Receptors. Maria-Jesus Blesa, Bang-Tun Zhao, Magali Allain, Franck Le Derf, Marc Salle, Chem. Eur. J. 12:1906-1914, 2006; (3) Studies on Calix(aza)crowns, II. Synthesis of Novel Proximal Doubly Bridged Calix[4]arenes by Intramolecular ring Closure of syn 1,3- and 1,2- to ω-Chloraolkylamides, Istavan Bitter, Alajos Grun, Gabor Toth, Barbara Balazs, Gyula Horvath, Laszlo Toke, Tegrahedron 54:3857-3870, 1998; (4) Tetrathiafulvalene Crowns: Redox Switchable Ligands, Franck Le Derf, Miloud Mazari, Nicolas Mercier, Eric Levillain, Gaelle Trippe, Amedee Riou, Pascal Richomme, Jan Becher, Javier Garin, Jesus Orduna, Nuria Gallego-Planas, Alain Gorgues, Marc Salle, Chem.

Eur. J. 7, 2:447-455, 2001; (5) Electrochemical Behavior of Calix[4]arenediquinones and Their Cation Binding Properties, Taek Dong Chung, Dongsuk Choi, Sun Kil Kang, Sang Swon Lee, Suk-Kyu Chang, Hasuck Kim, Journal of Electroanalytical Chemistry, 396:431-439, 1995; (6) Experimental Evidence for Alkali Metal Cation—π Interactions, George W. Gokel, Stephen L. De Wall, Eric S. Meadows, Eur. J. Chem, 2967-2978, 2000; (7) π-Electron Properties of Large Condensed Polyaromatic Hydrocarbons, S. E. Stein, R. L. Brown, J. Am. Chem. Soc., 109:3721-3729, 1987; (8) Self-Assembled Organometallic [12]Metallacrown-3 Complexes, Holger Piotrowski, Gerhard Hilt, Axel Schulz, Peter Mayer, Kurt Polborn, Kay Severin, Chem. Eur. J., 7, 15:3197-3207, 2001; (9) First- and Second-sphere Coordination Chemistry of Alkali Metal Crown Ether Complexes, Jonathan W. Steed, Coordination Chemistry Reviews 215:171-221, 2001; (10) Alkali metal ion complexes of functionalized calixarenes—competition between pendent arm and anion bond to sodium; R. Abidi, L. Baklouti, J. Harrowfield, A. Sobolev; J. Vicens, and A. White, Org. Biomol. Chem., 2003, 1, 3144-3146; (11) Transition Metal and Organometallic Anion Complexation Agents, Paul D. Beer, Elizabeth J. Hayes, Coordination Chemistry Review, 240:167-189, 2003; (12) Versatile Self-Complexing Compounds Based on Covalently Linked Donor-Acceptor Cyclophanes, Yi Liu, Amar H. Flood, Ross M. Moskowitz, J. Fraser Stoddart, Chem. Eur. J. 11:369-385, 2005; (13) Study of Interactions of Various Ionic Species with Solvents Toward the Design of Receptors, N. Jiten singh, Adriana C. Olleta, Anupriya Kumar, Mina Park, Hai-Bo Yi, Indrajit Bandyopadhyay, Han Myoung Lee, P. Tarakeshwar, Kwang S. Kim, Theor. Chem. Acc. 115:127-135, 2006; (14) A Calixarene-amide-tetrathiafulvalene Assembly for the Electrochemical Detection of Anions, Bang-Tun Zhao, Maria-Jesus Blesa, Nicolas Mercier, Franck Le Derf, Marc Salle, New J. Chem. 29:1164-1167, 2005.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

When a group of substituents is disclosed herein, it is understood that all individual members of that group and all subgroups, including any isomers, enantiomers, and diastereomers of the group members, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

Many of the molecules disclosed herein contain one or more ionizable groups [groups from which a proton can be removed (e.g., —COOH) or added (e.g., amines) or which can be quaternized (e.g., amines)]. All possible ionic forms of such molecules and salts thereof are intended to be included individually in the disclosure herein. With regard to salts of the compounds herein, one of ordinary skill in the art can select from among a wide variety of available counterions those that are appropriate for preparation of salts of this invention for a given application. In specific applications, the selection of a given anion or cation for preparation of a salt may result in increased or decreased solubility of that salt.

Every formulation or combination of components described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

I claim:

1. An electrochemical cell comprising:
a positive electrode;
a negative electrode; and
an electrolyte provided between said positive electrode and said negative electrode; said electrolyte capable of conducting anion charge carriers; wherein said electrolyte comprises a solvent and a fluoride salt, wherein said fluoride salt is at least partially present in a dissolved state in said electrolyte, thereby generating fluoride ions in said electrolyte;
wherein said positive electrode and negative electrode reversibly exchange said anion charge carriers with said electrolyte during charging or discharging of said electrochemical cell; wherein said anion charge carriers are said fluoride ions ($F^-$).

2. The electrochemical cell of claim 1 wherein said fluoride salt has a formula $MF_n$, wherein M is a metal, and n is an integer greater than 0.

3. The electrochemical cell of claim 2 wherein M is an alkali metal or an alkaline earth metal.

4. The electrochemical cell of claim 2 wherein M is Na, K, or Rb.

5. The electrochemical cell of claim 1 wherein said electrolyte further comprises an anion receptor.

6. The electrochemical cell of claim 1 wherein said electrolyte further comprises a fluoride ion anion receptor capable of coordinating said fluoride ions from said fluoride salt.

7. The electrochemical cell of claim 1 wherein said electrolyte further comprises a cation receptor capable of coordinating metal ions from said fluoride salt.

8. The electrochemical cell of claim 1 wherein said electrolyte is an aqueous electrolyte.

9. The electrochemical cell of claim 1 wherein said electrolyte is a nonaqueous electrolyte.

10. The electrochemical cell of claim 1 wherein said negative electrode is a fluoride ion host material.

11. The electrochemical cell of claim 9 wherein said fluoride ion host material of said negative electrode is a fluoride compound.

12. The electrochemical cell of claim 9 wherein said fluoride ion host material of said negative electrode is selected from the group consisting of: $LaF_x$, $CaF_x$, $AlF_x$, $EuF_x$, $LiC_6$, $Li_xSi$, $Li_xGe$, $Li_x(CoTiSn)$, $SnF_x$, $InF_x$, $VF_x$, $CdF_x$, $CrF_x$, $FeF_x$, $ZnF_x$, $GaF_x$, $TiF_x$, $NbF_x$, $MnF_x$, $YbF_x$, $ZrF_x$, $SmF_x$, $LaF_x$, and $CeF_x$.

13. The electrochemical cell of claim 9 wherein said fluoride ion host material of said negative electrode is a polymer selected from the group consisting of: polyacetylene, polyaniline, polypyrrol, polythiophene and polyparaphenylene.

14. The electrochemical cell of claim 9 wherein said negative electrode has a standard electrode potential less than or equal to −1 V.

15. The electrochemical cell of claim 9 wherein said negative electrode has a standard electrode potential less than or equal to −2 V.

16. The electrochemical cell of claim 1 wherein said positive electrode comprises a fluorinated carbonaceous material having a formula $CF_x$, wherein x is an average atomic ratio of fluorine atoms to carbon atoms and is equal to or less than 1.0.

17. The electrochemical cell of claim 16 wherein said carbonaceous material is selected from the group consisting of graphite, coke, carbon nanotubes, carbon nanofibers, carbon nanoparticles, carbon nanowhiskers and carbon nanorods.

18. The electrochemical cell of claim 16 wherein said carbonaceous material is synthetic graphite or multiwalled carbon nanotubes.

19. The electrochemical cell of claim 16 wherein said positive electrode comprises $CF_1$.

20. The electrochemical cell of claim 16 wherein said positive electrode is subfluorinated CFx, wherein x is less than 1.

21. The electrochemical cell of claim 20 wherein $0.21 \leq x \leq 0.82$.

22. The electrochemical cell of claim 16 wherein said positive electrode further comprises Acetylene Black Graphite (ABG) and polyvinylidene fluoride (PVDF).

23. The electrochemical cell of claim 1 wherein said positive electrode has a standard electrode potential greater than or equal to 1 V.

24. The electrochemical cell of claim 1 wherein said positive electrode has a standard electrode potential greater than or equal to 2 V.

25. The electrochemical cell of claim 1 wherein during discharge of said electrochemical cell said fluoride ions are released from said positive electrode and accommodated by said negative electrode; and wherein during charging of said electrochemical cell said fluoride ions are released from said negative electrode and accommodated by said positive electrode.

26. The electrochemical cell of claim 25 wherein said fluoride ions are accommodated by said positive electrode via intercalation or insertion of said fluoride ions into said positive electrode comprising a fluorinated carbonaceous material.

27. An electrochemical cell comprising:
a positive electrode comprising a first fluoride ion host material, wherein said first fluoride ion host material of said positive electrode is a subfluorinated carbonaceous material having a formula $CF_x$, wherein x is an average atomic ratio of fluorine atoms to carbon atoms and is selected from the range of 0.3 to 1.0;

a negative electrode comprising a second fluoride ion host material; and an electrolyte provided between said positive electrode and said negative electrode; said electrolyte capable of conducting anion charge carriers; wherein said electrolyte comprises a solvent and a fluoride salt, wherein said fluoride salt is at least partially present in a dissolved state in said electrolyte, thereby generating fluoride ions in said electrolyte;

wherein said positive electrode and negative electrode reversibly exchange said anion charge carriers with said electrolyte during charging or discharging of said electrochemical cell; wherein said anion charge carriers are said fluoride ions ($F^-$).

28. The electrochemical cell of claim 27 wherein said carbonaceous material is selected from the group consisting of graphite, coke, multiwalled carbon nanotubes, multi-layered carbon nanofibers, multi-layered carbon nanoparticles, carbon nanowhiskers and carbon nanorods.

29. The electrochemical cell of claim 27 wherein said electrochemical cell is a secondary electrochemical cell.

\* \* \* \* \*